United States Patent [19]
Chan et al.

[11] Patent Number: 5,553,123
[45] Date of Patent: Sep. 3, 1996

[54] METHOD FOR DOWNLOADING SETUP DATA VIA TELEPHONE TO AN APPLIANCE CONTROLLER

[75] Inventors: Philip W. Chan, Arcadia, Calif.; Kwong S. Sin, Tai Po, Hong Kong

[73] Assignee: Gemstar Development Corporation, Pasadena, Calif.

[21] Appl. No.: 257,413

[22] Filed: Jun. 9, 1994

[51] Int. Cl.⁶ .................................................. H04M 11/00
[52] U.S. Cl. .................................... 379/102; 379/444
[58] Field of Search .................................. 379/102, 104, 379/105, 93, 96–99, 441–444, 90, 110; 375/222, 224, 272, 308, 275, 225, 231, 232, 308, 334; 455/59, 61, 62

[56] References Cited

U.S. PATENT DOCUMENTS

| | | | |
|---|---|---|---|
| 3,909,527 | 9/1975 | Ohta et al. | 375/275 |
| 4,028,493 | 6/1977 | Brennemann et al. | 379/99 |
| 4,252,996 | 2/1981 | D'Agostino | 379/443 |
| 4,481,412 | 11/1984 | Fields | 235/472 |
| 4,519,003 | 5/1985 | Scholz | 358/335 |
| 4,529,941 | 7/1985 | Lipoff | 375/328 |
| 4,606,044 | 8/1986 | Kudo | 375/231 |
| 4,623,887 | 11/1986 | Welles, II | 340/825.57 |
| 4,631,601 | 12/1986 | Brugliera et al. | 358/335 |
| 4,751,578 | 6/1988 | Reiter et al. | |
| 4,756,007 | 7/1988 | Qureshi et al. | 379/93 |
| 4,787,063 | 11/1988 | Muguet | |
| 4,956,851 | 9/1990 | Wolensky et al. | 375/231 |
| 4,972,183 | 11/1990 | Kuhlmann et al. | |
| 5,016,273 | 5/1991 | Hoff | |
| 5,127,027 | 6/1992 | Takahashi | 375/231 |
| 5,134,649 | 7/1992 | Gutzmer | 379/443 |
| 5,228,077 | 7/1993 | Darbee | 379/102 |
| 5,297,186 | 3/1994 | Dong | 375/237 |
| 5,414,756 | 5/1995 | Levine | 379/102 |

FOREIGN PATENT DOCUMENTS

| | | |
|---|---|---|
| 2256546 | 12/1992 | United Kingdom. |
| WO90/07844 | 7/1990 | WIPO. |
| WO91/07050 | 5/1991 | WIPO. |

OTHER PUBLICATIONS

Research Disclosure, No. 329, Sep. 1991, Havant GB, p. 657, XP226205, 'Installation of consumer apparatus'.

*Primary Examiner*—Wing F. Chan
*Attorney, Agent, or Firm*—Christie, Parker & Hale, LLP

[57] ABSTRACT

A method and system for downloading initial setup data to an apparatus for controlling at least one appliance. The method includes the steps of a user initiating a telephone call on a telephone to a remote site having a computer, the user communicating background information to the remote site, the remote site converting the background information into data for downloading, the remote site transmitting the download data at nominal frequencies to the telephone, the remote site transmitting test data at each of a plurality of test frequencies to the telephone, the apparatus for controlling at least one appliance receiving the transmitted download data at nominal frequencies and the test data at each of the plurality of test frequencies from the telephone via a microphone on the apparatus, the apparatus for controlling at least one appliance displaying an indication that the download data was properly received at the nominal frequencies, if the download data was properly received, or an indication of which one of the plurality of test frequencies on which the test data was received, if the test data was properly received on one of the plurality of test frequencies and the download data was not properly received on the nominal frequencies, or an indication that no data was received, if neither the download data nor the test data were properly received, and the user communicating the displayed indication to the remote site.

18 Claims, 69 Drawing Sheets

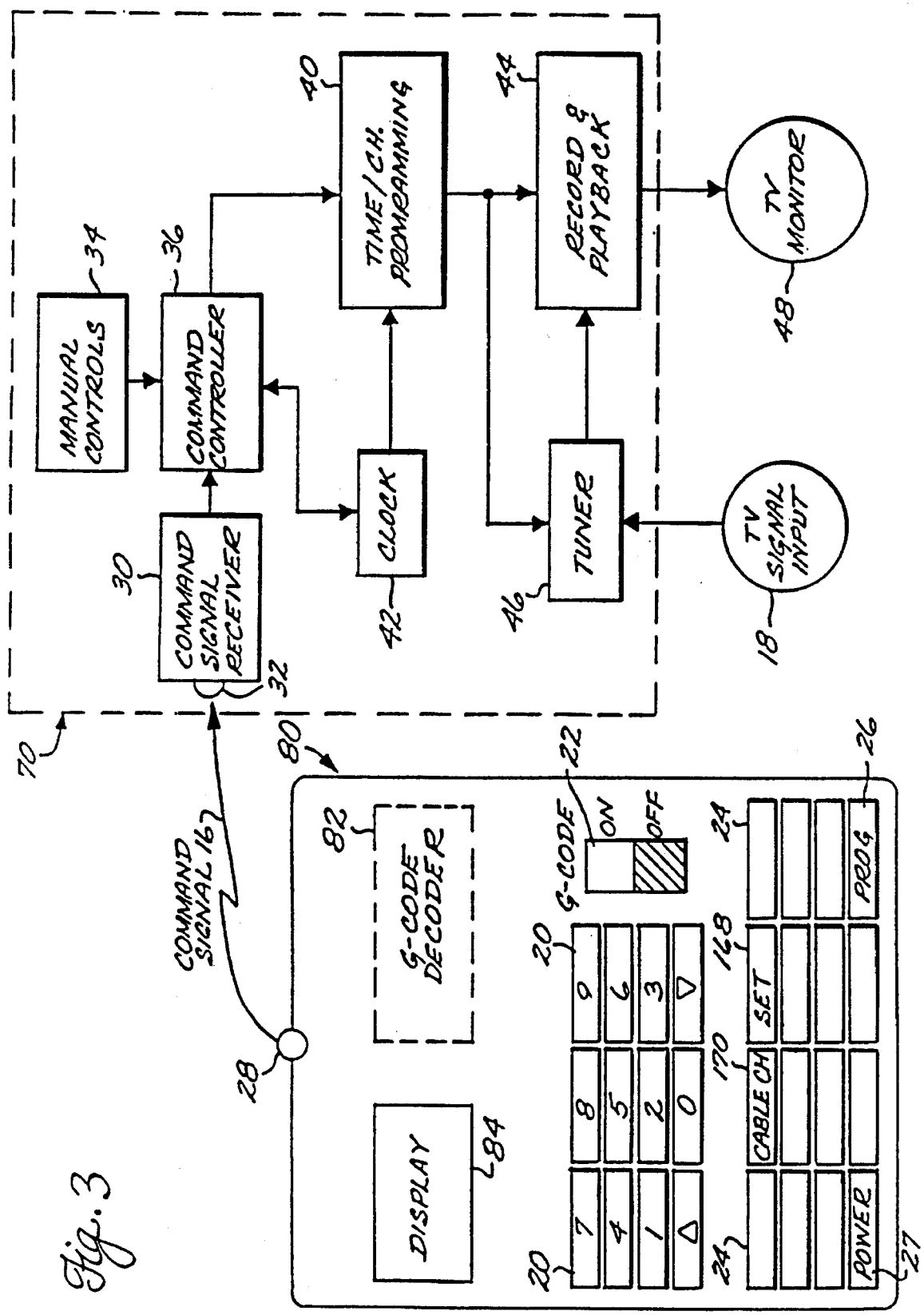

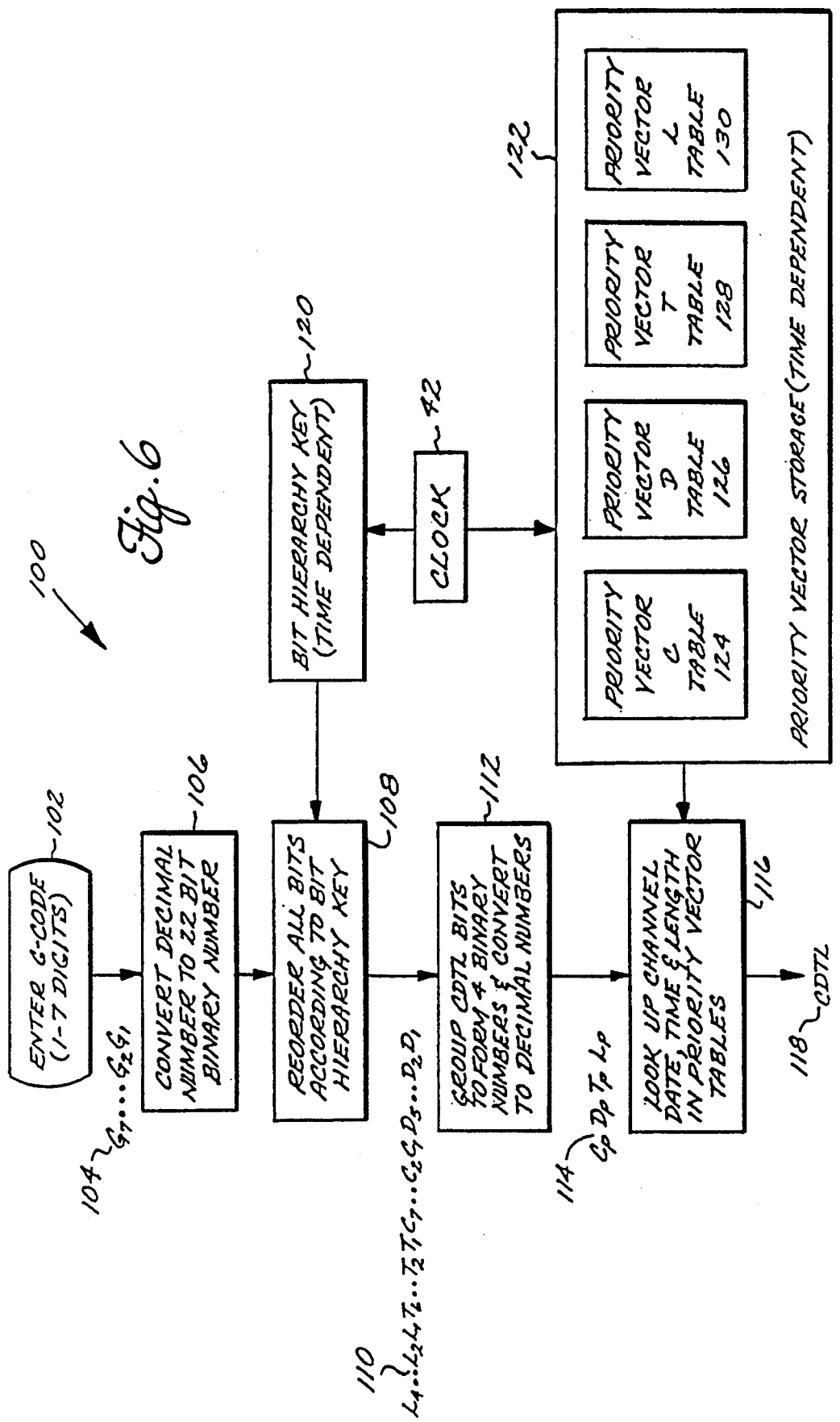

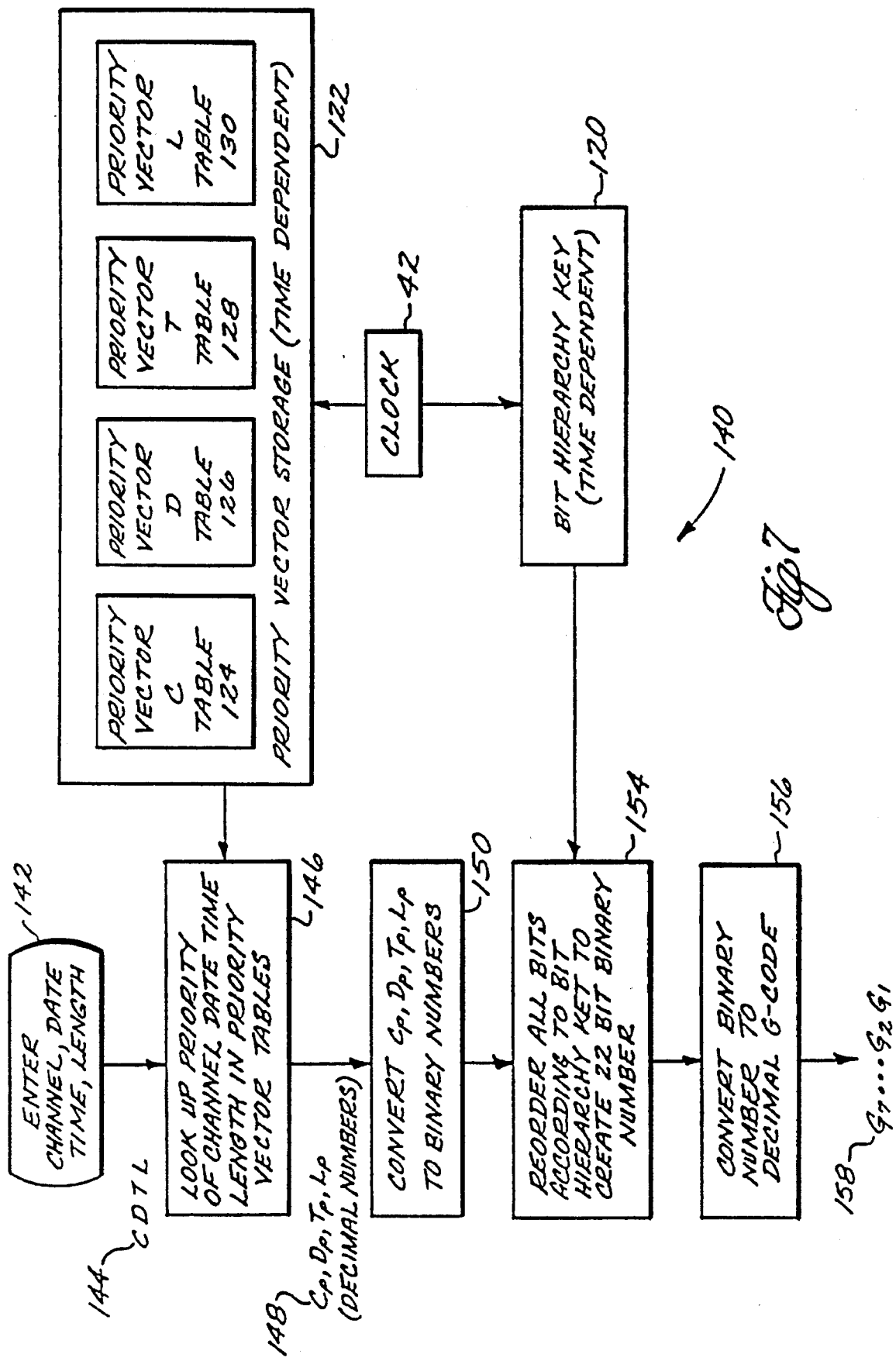

FIG. 8

THURSDAY — FEBRUARY 9, 1989

[18] SPORTS RETROSPECTIVE;60 MIN.[68713]
6P.M. 24 NATURESCENE[5321]
A VISIT TO THE COLORADO NATIONAL MONUMENT NEAR GRAND JUNCTION, WHERE WILD FLOWERS, INSECT AND BIRDS ARE OBSERVED
[34] 52 NOTICIAS[62921][496649]
[40] DWIGHT THOMPSON -- RELIGION;[68553]
[50] HUMANITIES THROUGH THE ARTS[493065]
[56] BEVERLY HILLBILLIES -- COMEDY[496777]

FRIDAY — FEBRUARY 10, 1989

[CB] [DIS] MOVIE -- DRAMA; 70 MIN.(23627113)
6:30 [11] FAMILY TIES (CC) -- COMEDY[15657]
MALLORY'S REUNION WITH HER COLLEGE BOY FRIEND (JOHN DUKAKIS) HAS HER WORRIED THAT SHE MAY NOT BE AS INTERESTING TO HIM AS SHE ONCE WAS.
[56] HOGAN'S HEROES -- COMEDY[510857]
CARTERS MASQUERADE AS A TRAITOR MAY BE KAPUT: A LOVELY FRAULEIN IS TRYING TO POISON HIM
[C14] [NIK] DOUBLE DARE-GAME(29225)
[C11] [TNN] VIDEOCOUNTRY(29129)
[C7] [USA] CARTOON EXPRESS(23561)
7P.M. [5] CHARLES IN CHARGE(CC) -- COMEDY[1065]
WHILE PLANNING A PIZZA-PARLOR PARTY, CHARLES ALIENATES THE POWELL CHILDREN BY DISMISSING THEIR SUGGESTIONS ABOUT ORGANIZING THE EVENT.

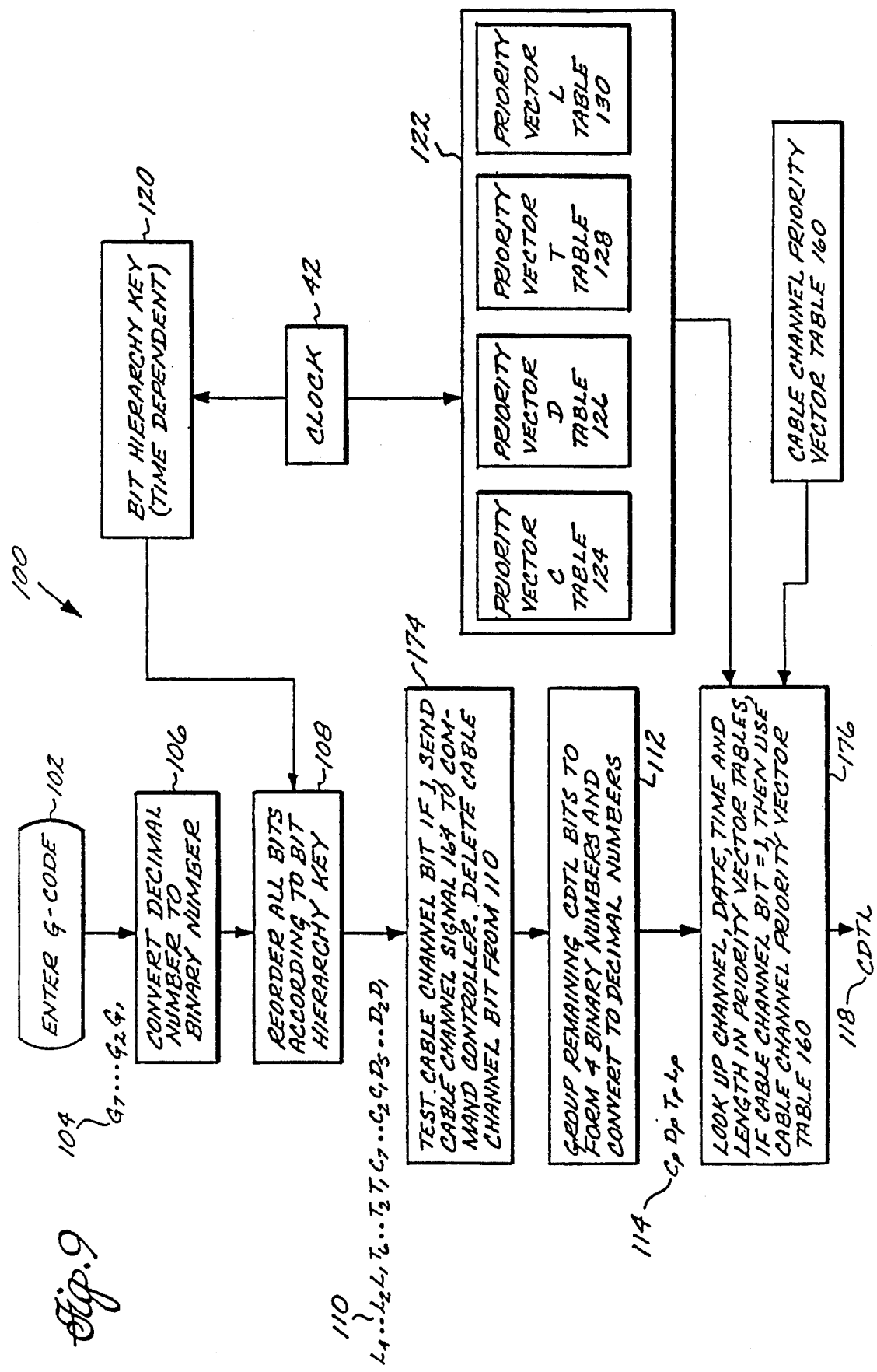

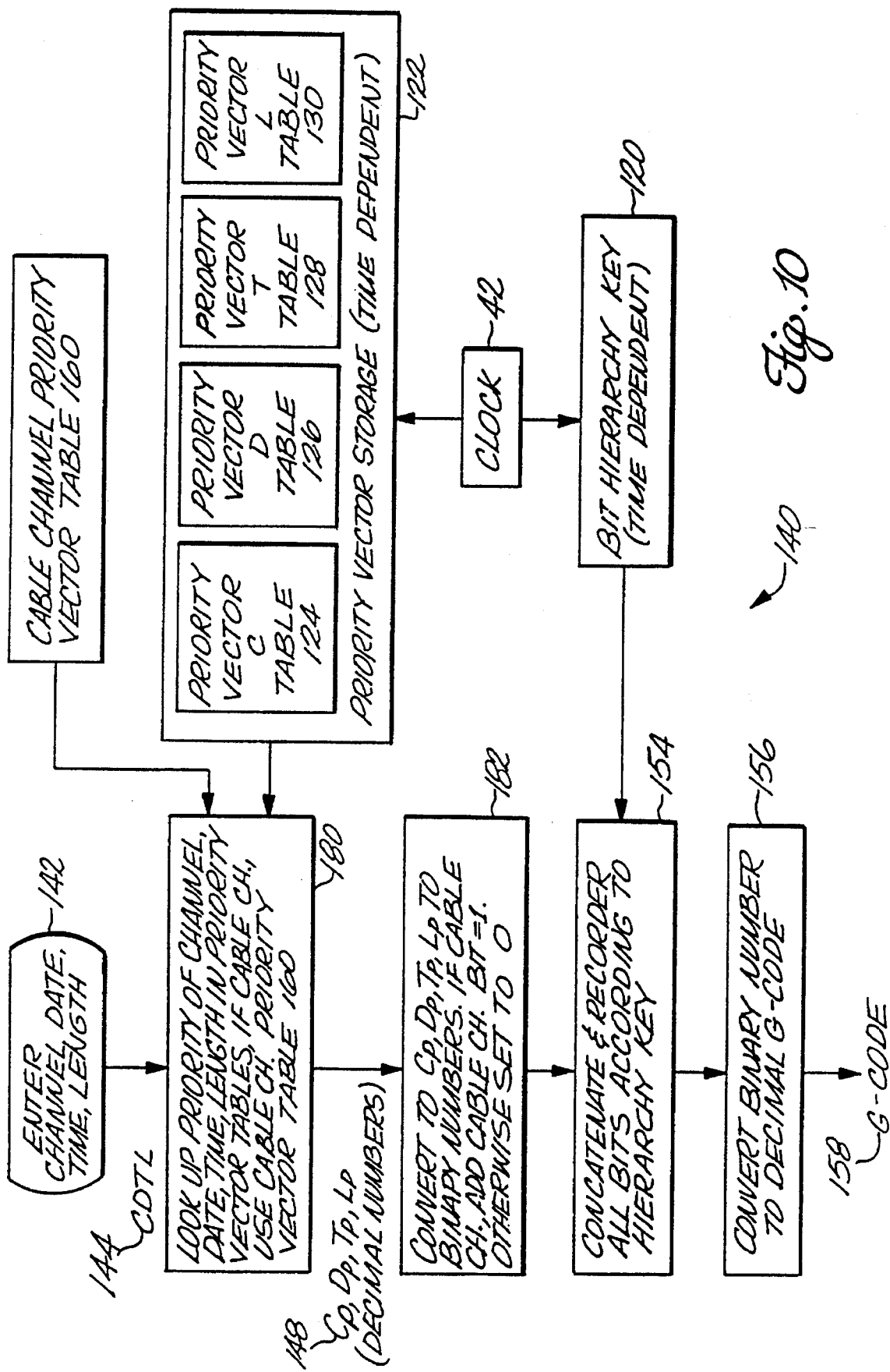

Fig. 28

|  | ASSIGNED CHANNEL NUMBERS | LOCAL CHANNEL NUMBERS |
|---|---|---|
|  | GUIDE CH. | TV CH. |
| BROADCAST CHANNELS |  |  |
| WBBM (CBS) | 2 | 2 |
| WMAQ (NBC) | 5 | 5 |
| WLS (ABC) | 7 | 7 |
| WGN | 9 | 9 |
| WTTW (PBS) | 11 | 16 |
| WPWR | 50 | 45 |
| WGBO | 66 | 48 |
| CABLE CHANNELS |  |  |
| A&E | 10 | 10 |
| AMC | 4 | 4 |
| BET | 25 | 8 |
| BRAV | 24 | 29 |
| CNCB | 36 | 36 |
| CNN | 13 | 35 |
| CSPAN | 27 | 30 |
| DIS | 23 | 25 |
| ESPN | 3 | 6 |

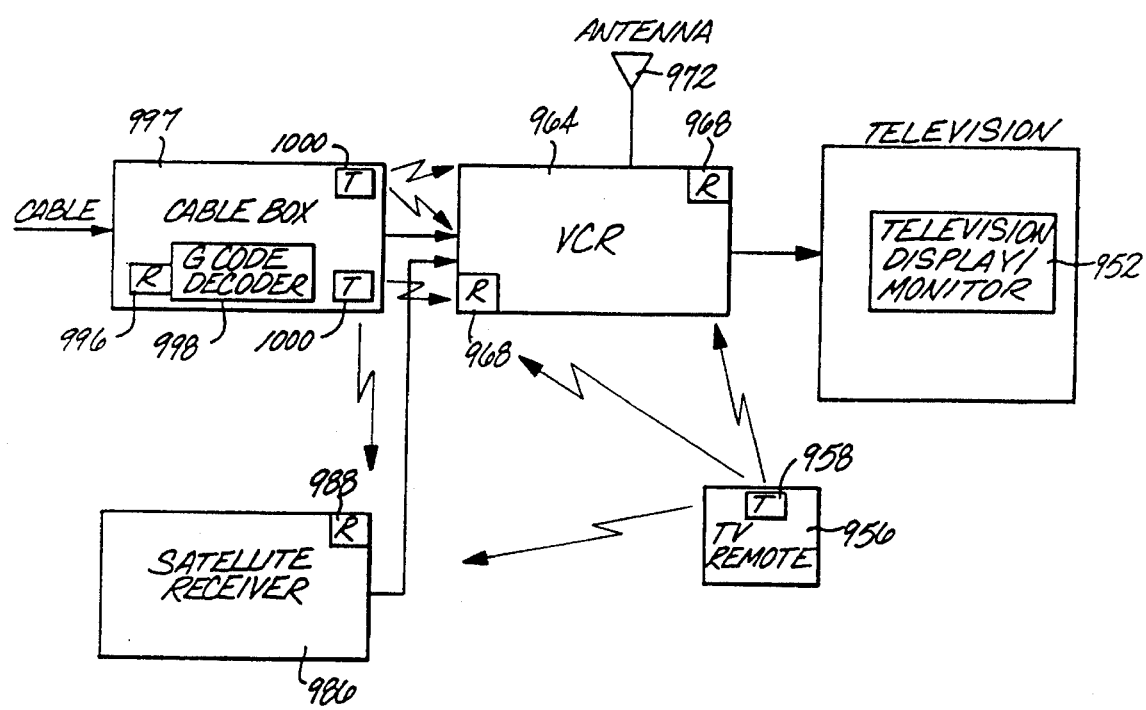

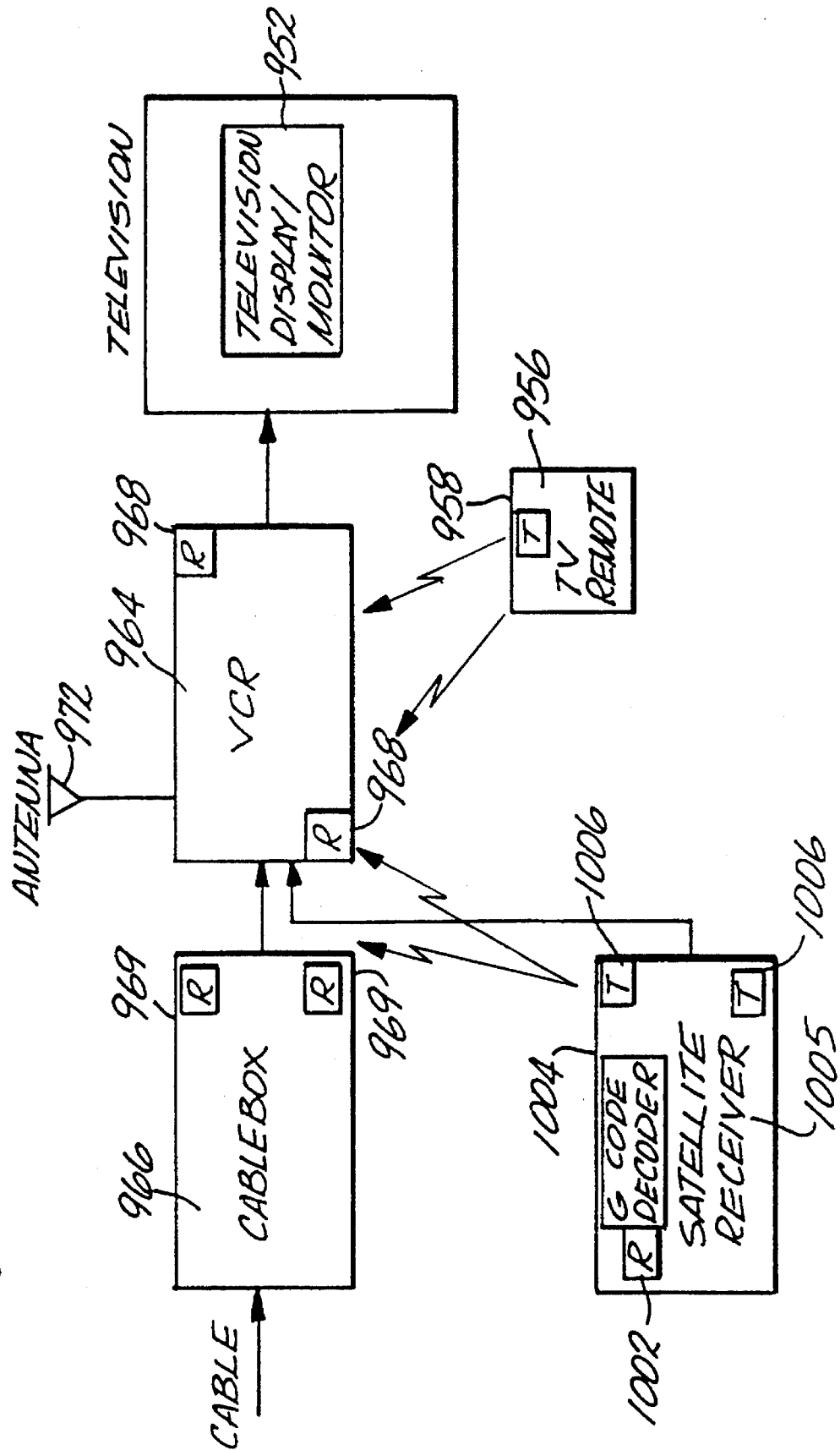

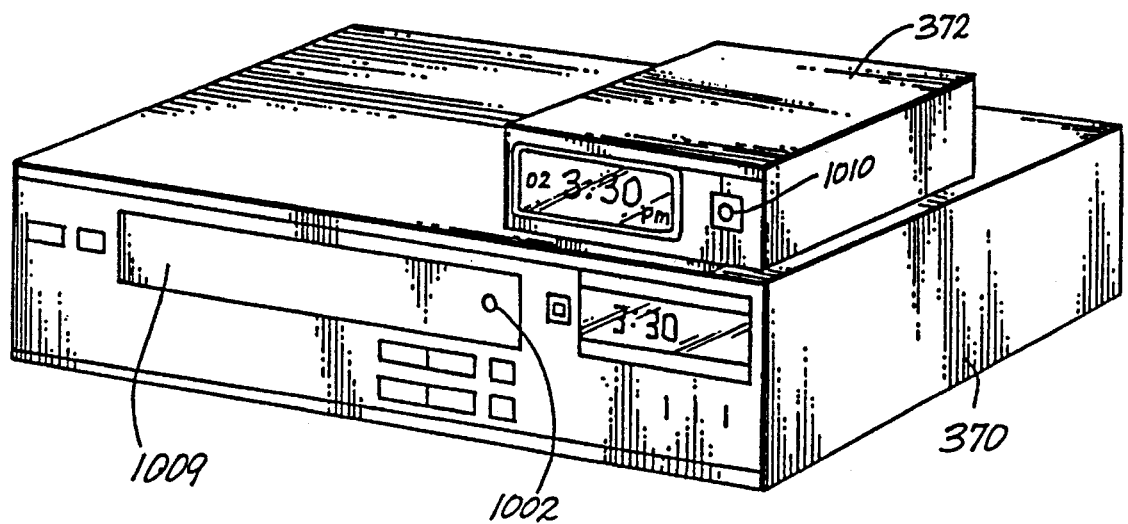
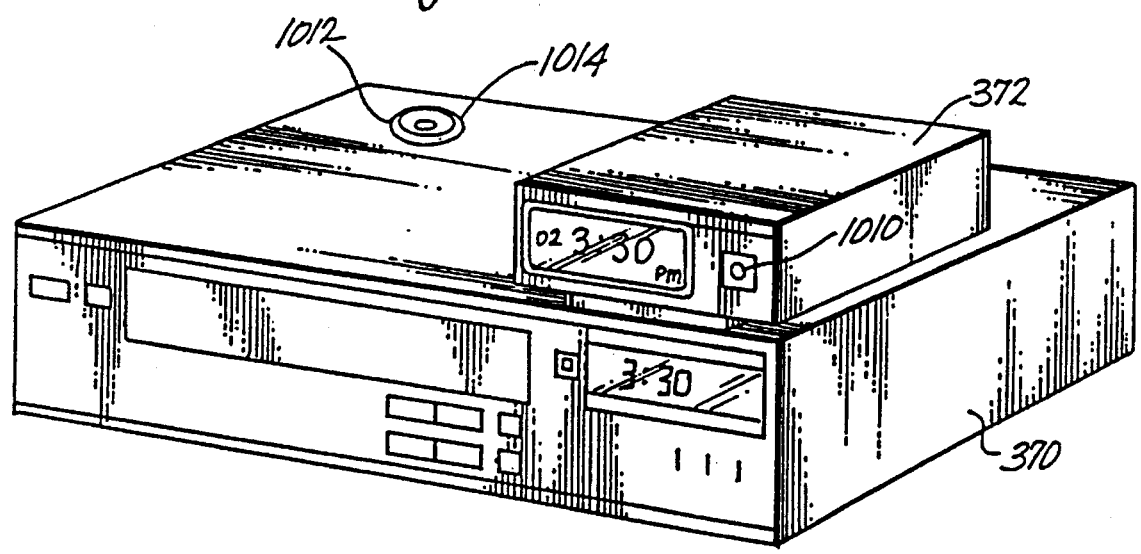

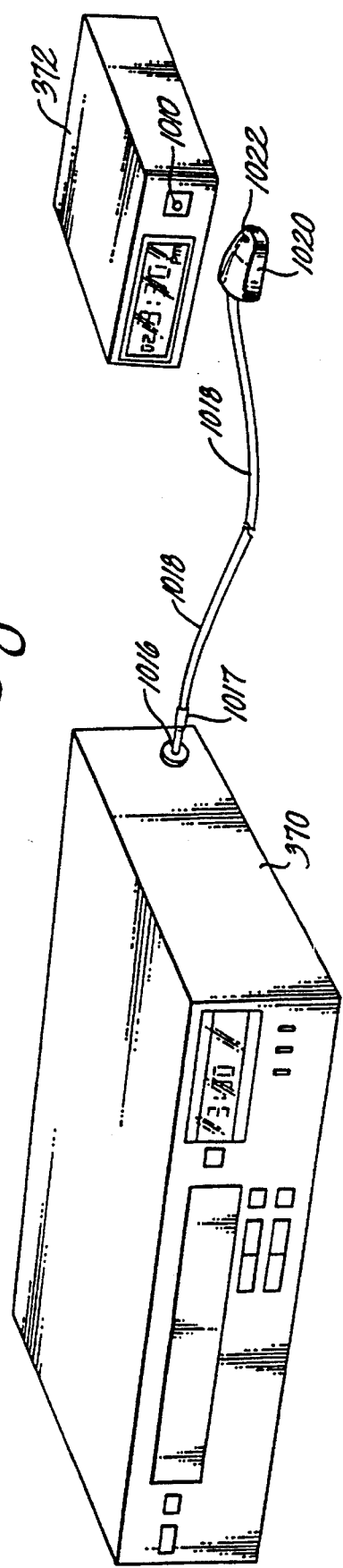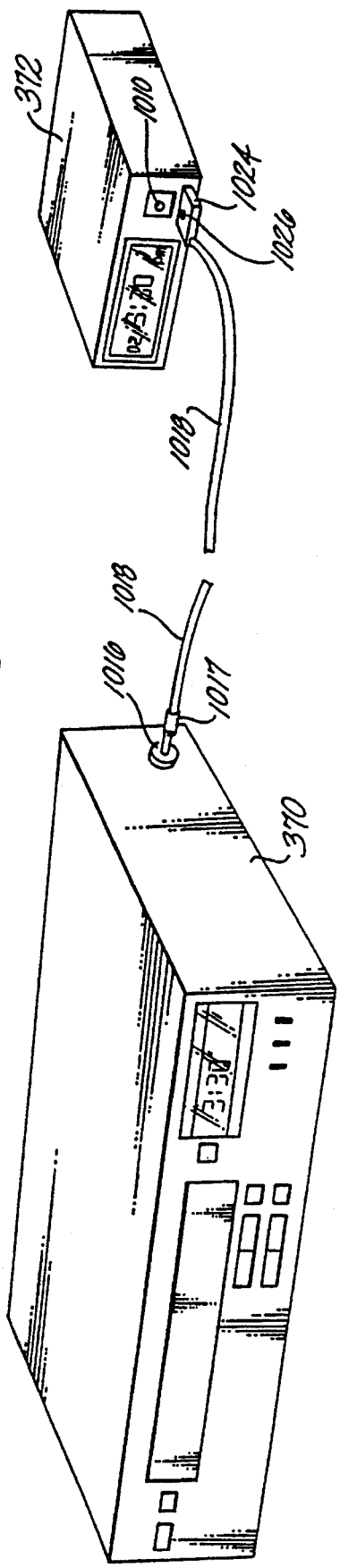

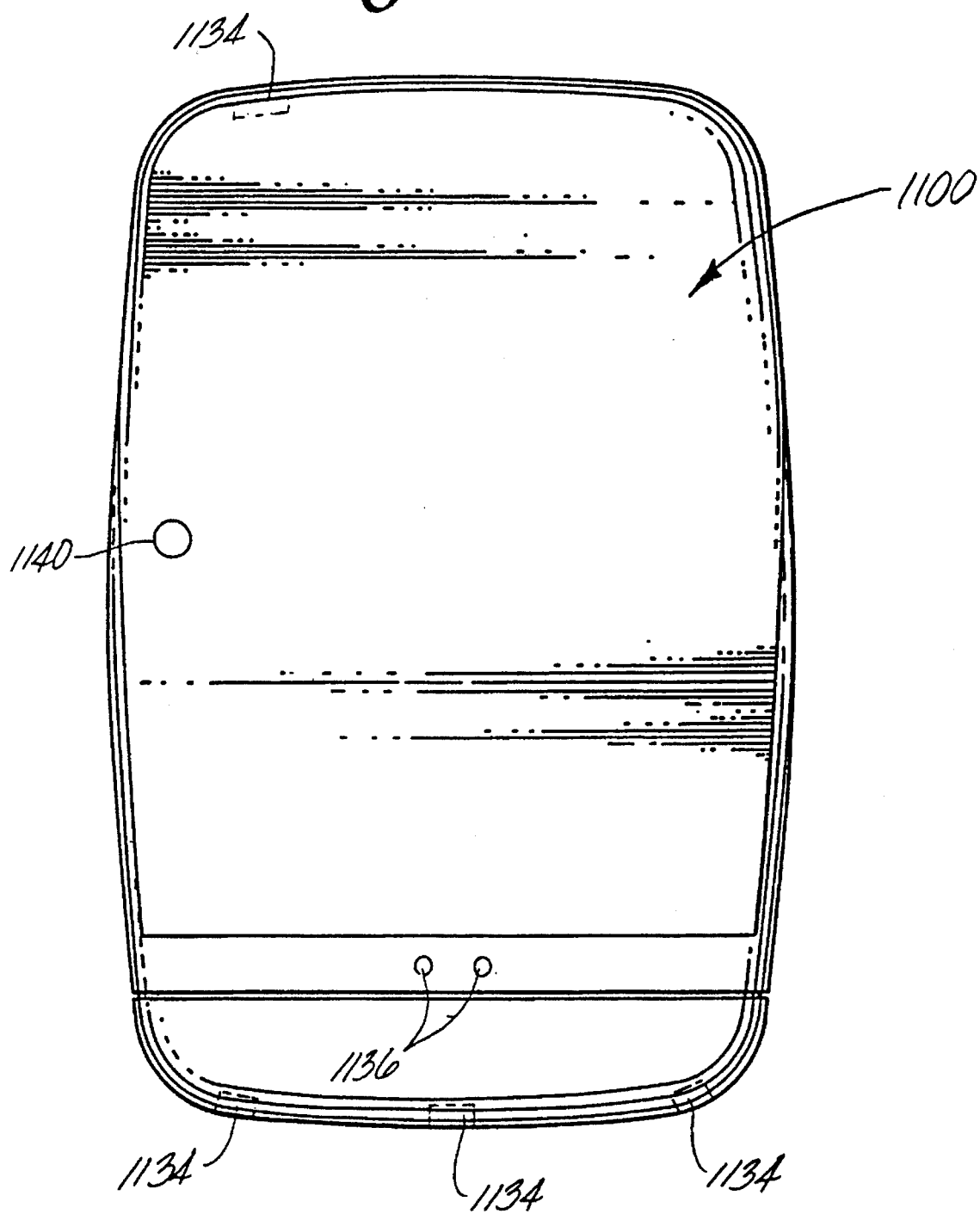

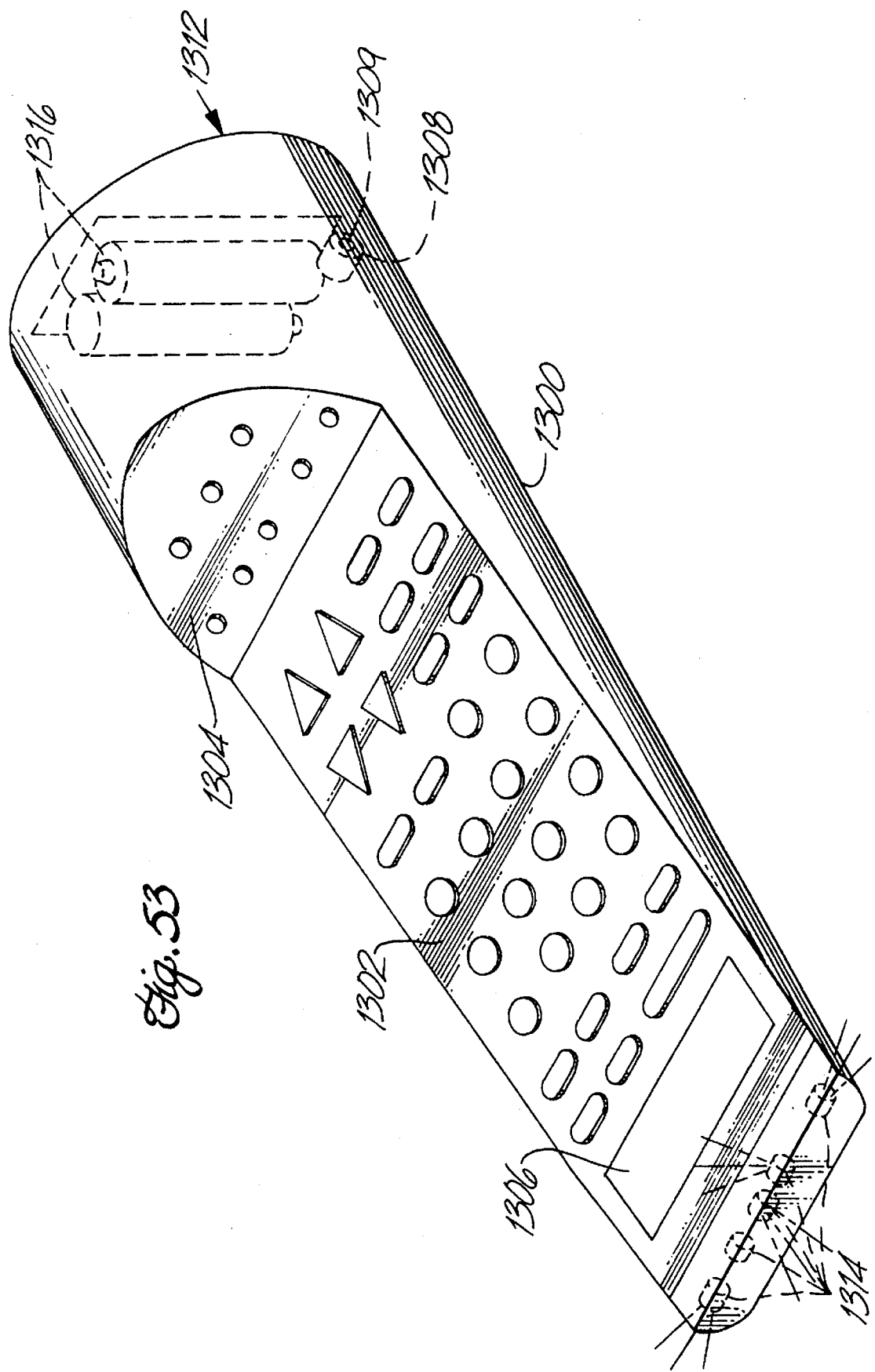

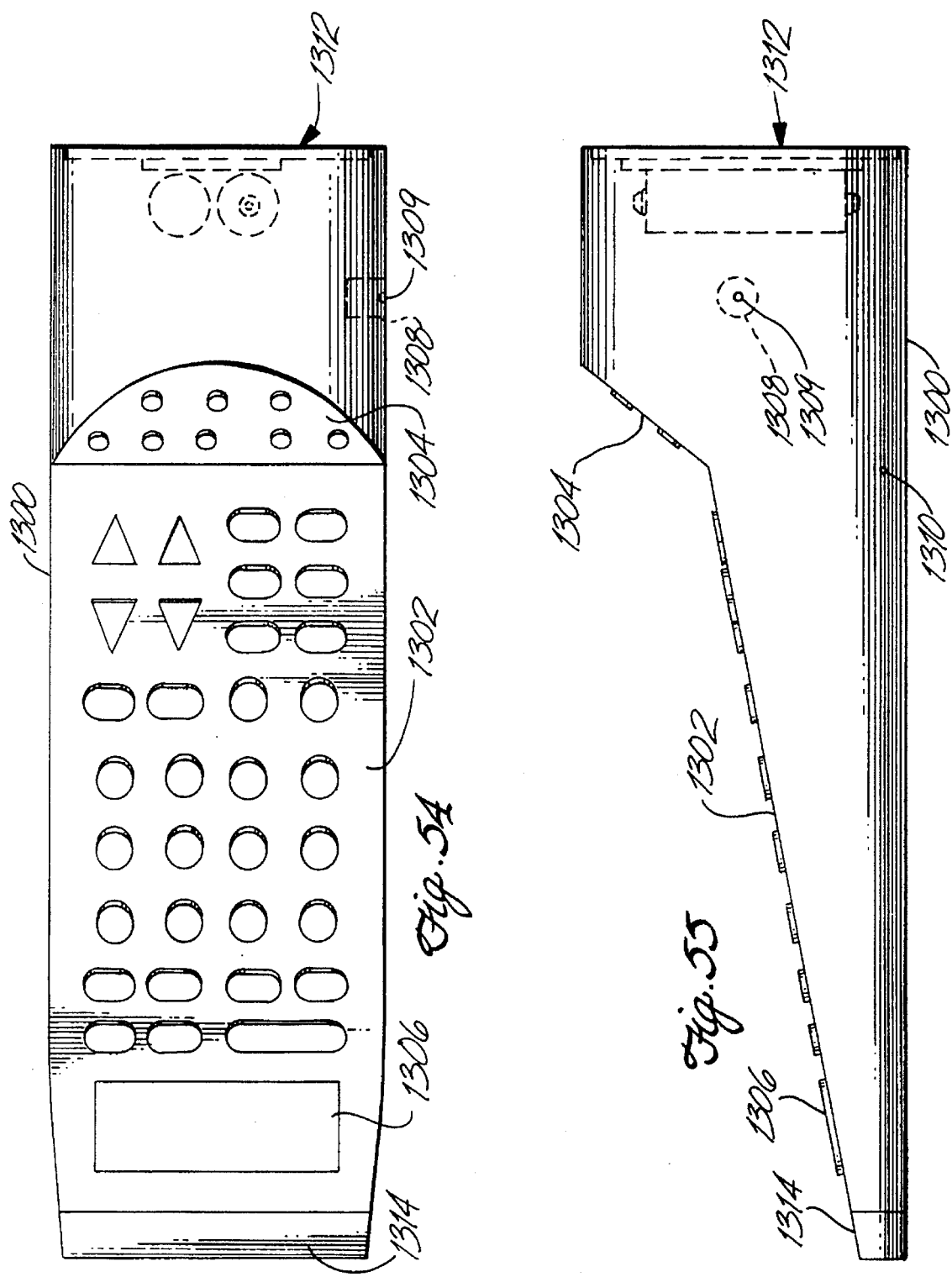

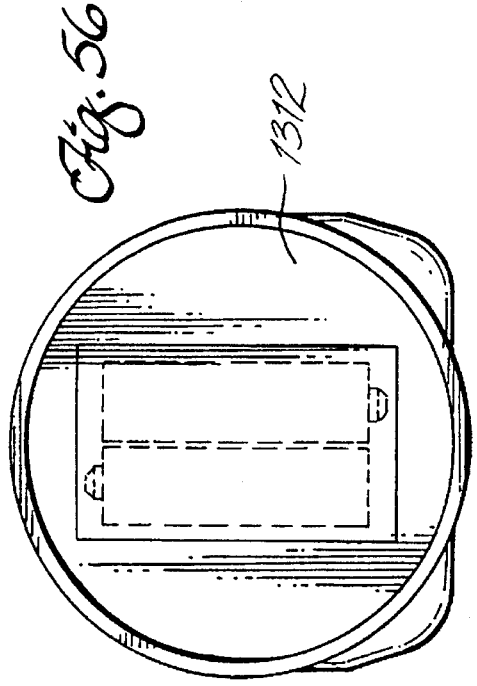
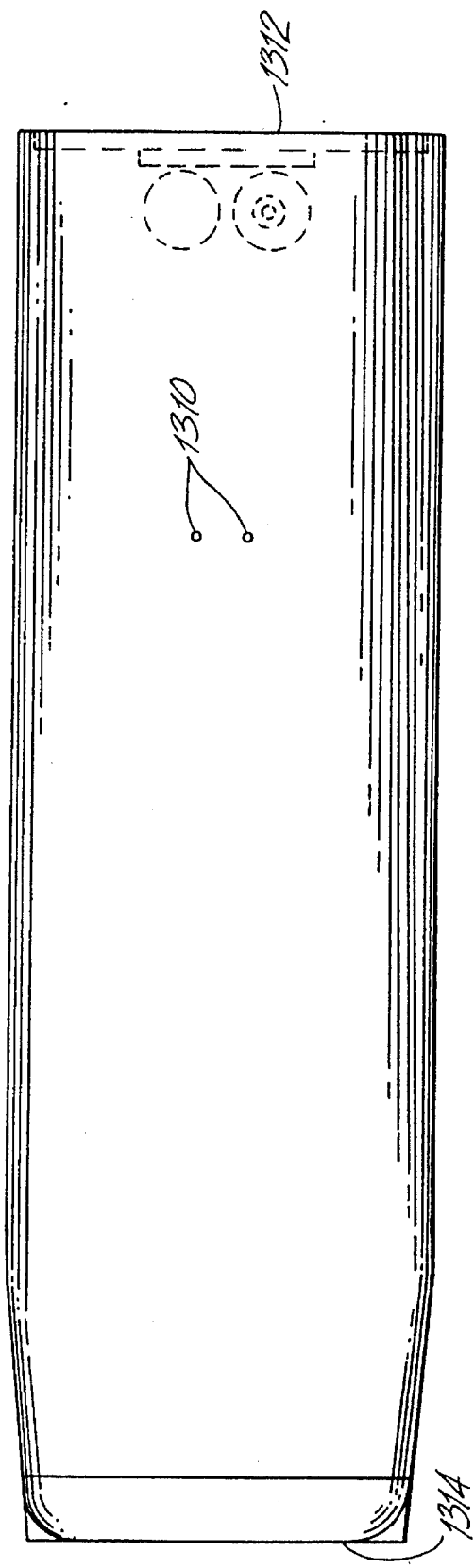

Fig. 87

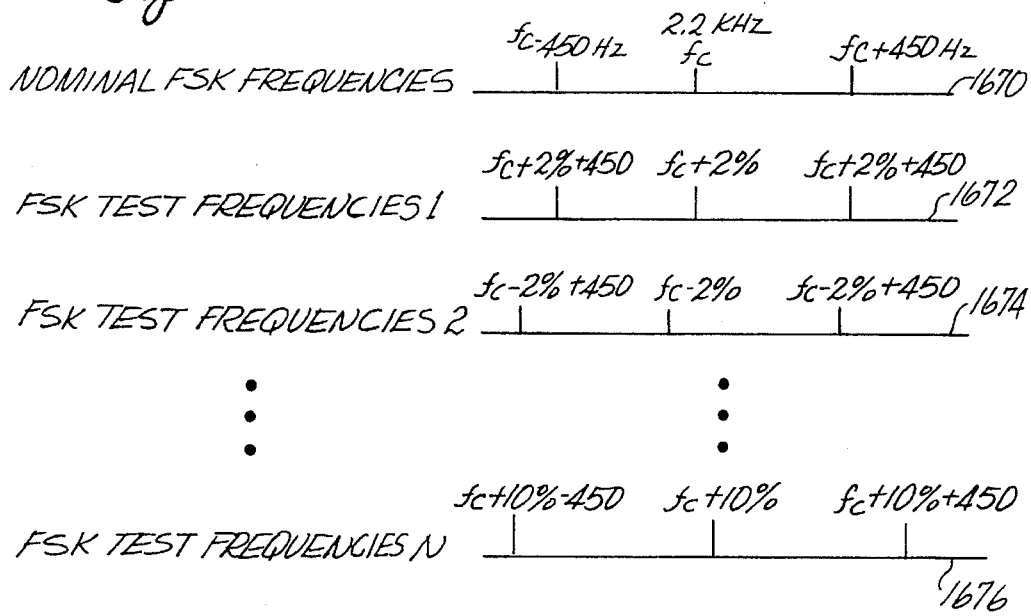

| NOMINAL FSK FREQUENCIES | $f_c - 450 Hz$ | $2.2 kHz$ $f_c$ | $f_c + 450 Hz$ | 1670 |
| FSK TEST FREQUENCIES 1 | $f_c + 2\% - 450$ | $f_c + 2\%$ | $f_c + 2\% + 450$ | 1672 |
| FSK TEST FREQUENCIES 2 | $f_c - 2\% + 450$ | $f_c - 2\%$ | $f_c - 2\% + 450$ | 1674 |
| ⋮ | | | | |
| FSK TEST FREQUENCIES N | $f_c + 10\% - 450$ | $f_c + 10\%$ | $f_c + 10\% + 450$ | 1676 |

Fig. 88

| FSK FREQUENCIES | HERTZ | | |
|---|---|---|---|
| | TRAINING FREQUENCY | "1" | "0" |
| NOMINAL | $f_c$ | $f_c + 450$ | $f_c - 450$ |
| TEST 1 | $f_c + 2\% f_c$ | $f_c + 2\% f_c + 450$ | $f_c + 2\% f_c - 450$ |
| TEST 2 | $f_c - 2\% f_c$ | $f_c - 2\% f_c + 450$ | $f_c - 2\% f_c - 450$ |
| TEST 3 | $f_c + 4\% f_c$ | $f_c + 4\% f_c + 450$ | $f_c + 4\% f_c - 450$ |
| TEST 4 | $f_c - 4\% f_c$ | $f_c - 4\% f_c + 450$ | $f_c - 4\% f_c - 450$ |
| TEST 5 | $f_c + 6\% f_c$ | $f_c + 6\% f_c + 450$ | $f_c + 6\% f_c - 450$ |
| TEST 6 | $f_c - 6\% f_c$ | $f_c - 6\% f_c + 450$ | $f_c - 6\% f_c - 450$ |
| TEST 7 | $f_c + 8\% f_c$ | $f_c + 8\% f_c + 450$ | $f_c + 8\% f_c - 450$ |
| TEST 8 | $f_c - 8\% f_c$ | $f_c - 8\% f_c + 450$ | $f_c - 8\% f_c - 450$ |
| TEST 9 | $f_c + 10\% f_c$ | $f_c + 10\% f_c + 450$ | $f_c + 10\% f_c - 450$ |
| ⋮ | ⋮ | ⋮ | ⋮ |

1680

METHOD FOR DOWNLOADING SETUP DATA VIA TELEPHONE TO AN APPLIANCE CONTROLLER

BACKGROUND OF THE INVENTION

1. Field of the Invention

This invention relates generally to video cassette recorder systems and particularly to an apparatus and method for using encoded information to shorten the time required to perform timer preprogramming and for easily performing an initial setup routine of such an apparatus via a telephone. This invention also relates to a system and method for adjusting the frequencies of communication over the telephone to ensure proper receipt of initial set up data.

2. Description of the Related Art

The video cassette recorder (VCR) has a number of uses, including playing back of tapes filmed by a video camera, playing back of pre-recorded tapes, and recording and playing back of broadcast and cable television programs.

To record a television program in advance of viewing it, a two-step process is often used: (1) obtain the correct channel, date, time and length (CDTL) information from a television program guide, and (2) program this CDTL information into the VCR. Depending on the model, year and type of the VCR, the CDTL information can be programmed in various ways including: (i) pushing an appropriate sequence of keys in the console according to instructions contained in the user's manual, (ii) pushing an appropriate sequence of keys in a remote hand-held control unit according to instructions contained in the user's manual (remote programming), and (iii) executing a series of keystrokes in the remote hand-held control unit in response to a menu displayed on the television screen (on-screen programming). Other techniques for timer preprogramming have been suggested including: (iv) reading in certain bar-code information using a light pen (light pen programming), and (v) entering instructions through a computer or telephone modem. These various methods differ only in the physical means of specifying the information while the contents, being CDTL and certain power/clock/timer on-off commands are generally common although the detailed protocol can vary with different model VCRs. Methods (i) and (ii) described above can require up to 100 keystrokes, which has inhibited the free use of the timer preprogramming feature of VCRs. To alleviate this, new VCR models have included an "On-Screen Programming" feature, which permits remote input of CDTL information in response to a menu displayed on the television screen. Generally on screen programming of CDTL information requires an average of about 18 keystrokes, which is less than some of the prior methods but still rather substantial. Some of the other techniques such as (iv) above, require the use of special equipment such as a bar code reader.

In general the present state of the art suffers from a number of drawbacks. First, the procedure for setting the VCR to record in advance can be quite complex and confusing and difficult to learn; in fact, because of this many VCR owners shun using the timer preprogramming record feature. Second, the transcription of the CDTL information to the VCR is hardly ever error-free; in fact, many users of VCR's timer preprogramming features express concern over the high incidence of programming errors. Third, even for experienced users, the process of entering a lengthy sequence of information on the channel, date, time and length of desired program can become tedious. Fourth, techniques such as reading in bar-code information or using a computer require special equipment. These drawbacks have created a serious impediment in the use of a VCR as a recording device for television programs. The effect is that time shifting of programs has not become as popular as it once was thought it would be. Accordingly, there is a need in the art for a simpler system for effecting VCR timer preprogramming which will enable a user to take advantage of the recording feature of a VCR more fully and freely.

SUMMARY OF THE INVENTION

An instant programmer, sold by Gemstar Development Corporation under the VCRPlus+® trademark, consists of a hand-held unit into which compressed codes (each 1 to 8 digits long) for television programs to be recorded are entered. The compressed codes are most commonly found in printed television listings. The instant programmer decodes the compressed codes into channel, date, time-of-day and length commands which are then stored in the programmer's memory. When date and time of the program in the memory that is scheduled the nearest to the current time coincides with the current time, as determined by an internal clock, the instant programmer, using an infrared transmitter and universal remote technology, sends infrared remote control signals to a cable box or a video recorder to change the channel to the correct channel and infrared remote control signals to a video recorder to turn the recorder on and begin recording. After the length for the program, stored in memory, has elapsed, an infrared remote control signal to stop recording is sent to the video recorder.

Before the VCRPlus+ programmer can be used, the user must perform an initial setup procedure. This procedure includes entering the brands and models of the user's video recorder and cable box into the programmer, setting the clock in the programmer, and entering a local channel map which maps "national" channel numbers for certain networks and cable channels into the actual channel numbers used for these channels by the user's cable system. The instant programmer is manufactured with the infrared codes necessary to remotely control a wide variety of cable boxes and video recorders stored in ROM. The model and brands of the cable box and video recorder must be entered so that the instant programmer will use the correct ones of the infrared codes stored in ROM for the user's particular video recorder and cable box In one design of the instant programmer, initial setup data is downloaded over telephone lines rather than being manually keyed in by the user. Instead, the user can call a customer service representative on the telephone and orally give the representative the information necessary to perform the initial setup. The representative then enters the necessary information into a computer which, in turn, downloads the data over the telephone line to the instant programmer.

A principal object of the present invention is to provide a system and method by which the download of the initial setup data over the telephone to an instant programmer is improved by testing the effectiveness of the communication path and adjusting the frequencies for transmitting the initial setup data. The information downloaded is initial setup data that otherwise would have to be manually keyed in by the user. The user calls a customer service representative on the telephone and orally gives the representative the information necessary to perform the initial setup. Alternatively, a computer may receive the information which would be keyed in if a representative is not present. The information is loaded into a computer which, in turn, downloads the data over the telephone line to the instant programmer via the telephone's earpiece which is held in proximity to a microphone built into the instant programmer. The instant programmer receives and stores the data, and can send portions of the data to appliances to be controlled by the instant programmer for programming or initially setting up the appliances. The data can be sent in a frequency shift key (FSK) format. Using the frequency shift key (FSK) format, binary data is sent over the telephone by representing a binary "one" with a first frequency and a binary "zero" with a second frequency.

In the present invention a system and method are provided for adjusting the frequencies of the (FSK) format to ensure proper receipt of the data. The nominal frequencies of FSK transmission include: a center frequency of 2.2 kHz, which is known as a "training frequency" and the frequencies of 1.75 kHz and 2.65 kHz representing a binary "zero" and "one," respectively. Different phone systems and telephone electrical designs have different preferred combinations of the three FSK frequencies to obtain the best reception. In particular the most important factor is the center frequency. It can be varied within a band of several hundred Hz to match the characteristics of a particular phone system and telephone electrical design. Based on this center frequency, the frequencies for "zero" and "one" can be set at −/+450 Hz, respectively, from the center frequency.

In the present invention the best center frequency is determined by transmitting a test pattern at a number of test frequencies. The instant programmer has a built in capability for determining whether the test data is properly received and for informing the user via a visual display of the test frequency on which the data was received properly. The user can then relay the information on the display to the representative, who can cause the center frequency and the frequencies for "zero" and "one" of the transmission to be adjusted. The initial setup data is then retransmitted at the adjusted frequencies. Of course, if the data is properly received on the nominal FSK frequencies, then no adjustment of the frequencies is required.

It is another object of the present invention to provide a system and method for counting and storing the number of error bits in the received test data, so that the number of errors can be displayed to the user who can relay this information to the representative. Based on the number of "one" or "zero" errors, the representative can either further adjust the high frequency component or the low frequency component of the FSK transmission to improve the chances of success in subsequent data downloads.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 3 is a schematic showing an alternative embodiment according to this invention with the code decoder means embedded in a remote controller;

FIG. 6 is a flow graph of the G-code decoding technique;

FIG. 7 is a flow graph of the G-code encoding technique;

FIG. 8 is an illustration of part of a television calendar according to this invention;

FIG. 9 is a flow chart for decoding for cable channels;

FIG. 10 is a flow chart for encoding for cable channels;

FIG. 28 is an embodiment of an assigned channel number/local channel number table;

FIG. 34 is a block diagram of a system including a cable box having a G-code decoder, a television, a VCR, and a satellite receiver;

FIG. 35 is a block diagram of a system including a satellite receiver having a G-code decoder, a television, a VCR, and a cable box;

FIG. 36 is a perspective view showing a cable box placed on top of a VCR having an infrared transmitter behind the front panel which communicates to the cable box infrared receiver via reflection;

FIG. 37 is a perspective view showing a cable box placed on top of a VCR having an infrared transmitter inside a infrared dome on the top of the VCR which communicates to the cable box infrared receiver;

FIG. 38 is a perspective view of a VCR having an infrared transmitter inside a mouse coupled via a cable to the VCR with the mouse placed near the cable box infrared receiver;

FIG. 39 is a perspective view of a VCR having an infrared transmitter inside a miniature mouse coupled via a cable to the VCR with the miniature mouse stuck onto the cable box near the infrared receiver;

FIG. 41 is a bottom view of the apparatus of FIG. 41 showing a microphone hole and two electrical contact holes;

FIG. 42 shows the apparatus of FIG. 40 being used in conjunction with a telephone;

FIG. 53 is a perspective view of a complete universal remote control capable of using compressed codes for recorder preprogramming according to a preferred embodiment of the invention;

FIG. 54 is a front view of the apparatus of FIG. 53;

FIG. 55 is a side view of the apparatus of FIG. 53 showing a microphone opening and an electrical contact access hole;

FIG. 56 is a bottom view of the apparatus of FIG. 53;

FIG. 57 is a back view of the apparatus of FIG. 53 showing electrical contact access holes;

FIG. 87 is a diagram illustrating the frequencies for the nominal FSK frequencies and the test FSK frequencies for the method of FIGS. 84A and 84B.

FIG. 88 is a table illustrating possible frequencies for the nominal FSK frequencies and the test FSK frequencies for the method of FIGS. 84A and 84B.

DETAILED DESCRIPTION

Figure 1:
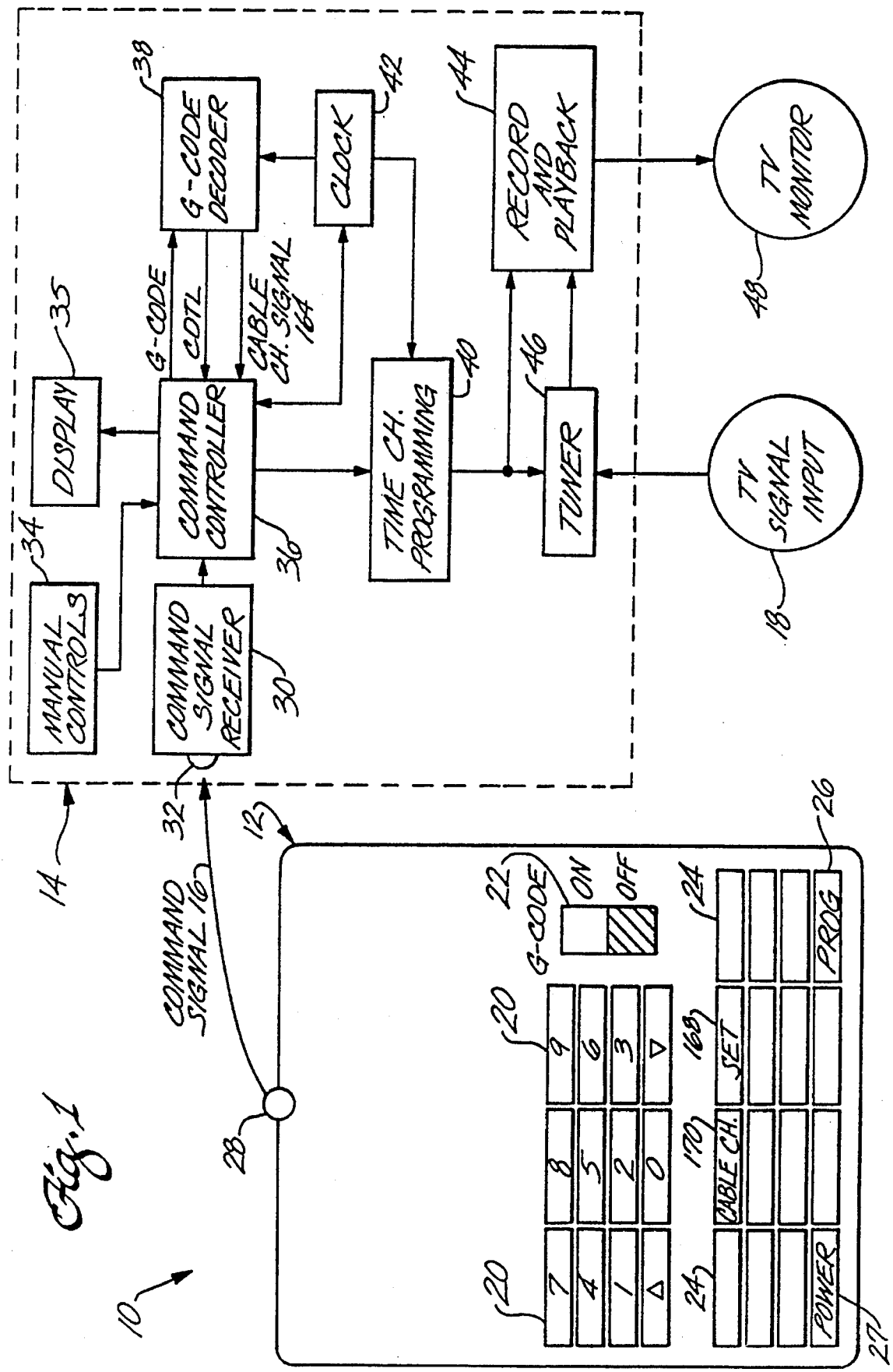
FIG. 1 is a schematic showing apparatus according to this invention with the code decoder means embedded in the video cassette recorder.

Referring now to the drawings, and more particularly, to FIG. 1, there is shown an apparatus for using encoded video recorder/player timer preprogramming information 10 according to this invention. The primary components include a remote controller 12 and a video cassette recorder/player with G-code decoder 14, which can be controlled by remote controller 12 via a command signal 16. The remote controller 12 can have a number of keys, which include numerical keys 20, G-code switch 22, function keys 24, program key 26 and power key 27. There are means in the remote controller 12 that interprets each key as it is pressed and sends the proper command signal 16 to the VCR via an infra-red light emitting diode 28. Except for the G-code switch 22 on the remote controller 12 in FIG. 1, the remote controller 12 is essentially the same as any other remote controller in function. The G-code switch 22 is provided just to allow the user to lock the remote controller 12 in the G-code mode while using a G-code, which is the name given to the compressed code which is the encoded CDTL information, to perform timer preprogramming.

A G-code consists of 1 to 7 digits, although more could be used, and is associated with a particular program. A user would look up the G-code in a program guide and just enter the G-code on the remote controller 12, instead of the present state of the art, which requires that the user enter the actual channel, date, time and length (CDTL) commands.

In order to understand the advantages of using a G-code, it is helpful to describe the best of the current state of the art, which is "on screen programming" with direct numerical entry. This technique involves about 18 keystrokes and the user has to keep switching his view back and forth between the TV screen and the remote controller while entering the CDTL information. This situation may be akin to a user having to dial an 18 digit telephone number while reading it from a phone book. The number of keys involved and the switching back and forth of the eye tend to induce errors. A typical keying sequence for timer recording using on-screen CDTL programming is as follows:

PROG 2 1 15 07 30 2 08 00 2 04 PROG

The first program (PROG) key 26 enters the programming mode. Then a sequence of numerical keys 20 are pushed. The 2 means it is timer recording rather than time setting. The 1 means the user is now entering the settings for program 1. The 15 is the date. The 07 is starting hour. The 30 is a starting minute. The 2 means pm. The next sequence 08 00 2 is the stopping time. The 04 is channel number. Finally, the PROG is hit again to exit the program mode.

By contrast, this command could have been "coded" and entered in a typical G-code sequence as follows: PROG 1138 PROG. To distinguish that the command is a coded G-code, the G-code switch 22 should be turned to the "ON" position. Instead of having a switch, a separate key "G" can be used. The G-code programming keystroke sequence would then be: G 1138 PROG.

The use of a G-code does not preclude "on-screen" confirmation of the program information that has been entered. When the keystrokes "PROG 1138 PROG" are entered with the G-code switch in the "ON" position, the G-code would be decoded and the television could display the following message:

| PROGRAM | DATE | START TIME | STOP TIME | CHANNEL |
|---------|------|------------|-----------|---------|
| 1138 | 15 | 7:30 PM | 8:00 PM | 4 |

In order for the G-code to be useful it must be decoded and apparatus for that purpose must be provided. Referring to FIG. 1, a video cassette recorder/player with G-code decoder 14 is provided to be used in conjunction with remote controller 12. The command signal 16 sent from the remote controller 12 is sensed by the photodiode 32 and converted to electrical signals by command signal receiver 30. The electrical signals are sent to a command controller 36, which interprets the commands and determines how to respond to the commands. As shown in FIG. 1, it is also possible for the command controller 36 to receive commands from the manual controls 34 that are normally built into a VCR. If the command controller 36 determines that a G-code was received then the G-code will be sent to the G-code decoder 38 for decoding. The G-code decoder 38 converts the G-code into CDTL information, which is used by the command controller 36 to set the time/channel programming 40. Built into the VCR is a clock 42. This is normally provided in a VCR and is used to keep track of the date and time. The clock 42 is used primarily by the time/channel programming 40 and the G-code decoder 38 functions. The time/channel programming 40 function is set up with CDTL information by the command controller 36. When the proper date and time is read from clock 42, then the time/channel programming 40 function turns the record/playback 44 function "ON" to record. At the same time the tuner 46 is tuned to the proper channel in the television signal 18. Later the user can command the record/playback 44 function to a playback mode to watch the program via the television monitor 48.

An alternate way to control the recorder is to have the command controller 36 keep all the CDTL information instead of sending it to the time/channel programming 40. The command controller would also keep track of the time by periodically reading clock 42. The command controller would then send commands to the time/channel programming 40 to turn on and off the recorder and to tuner 46 to cause it to tune to the right channel at the right time according to the CDTL information.

The clock 42 is also an input to G-code decoder 38, which allows the G-code decoding to be a function of the clock, which lends a measure of security to the decoding technique and makes it harder to copy. Of course this requires that the encoding technique must also be a function of the clock.

Figure 2:
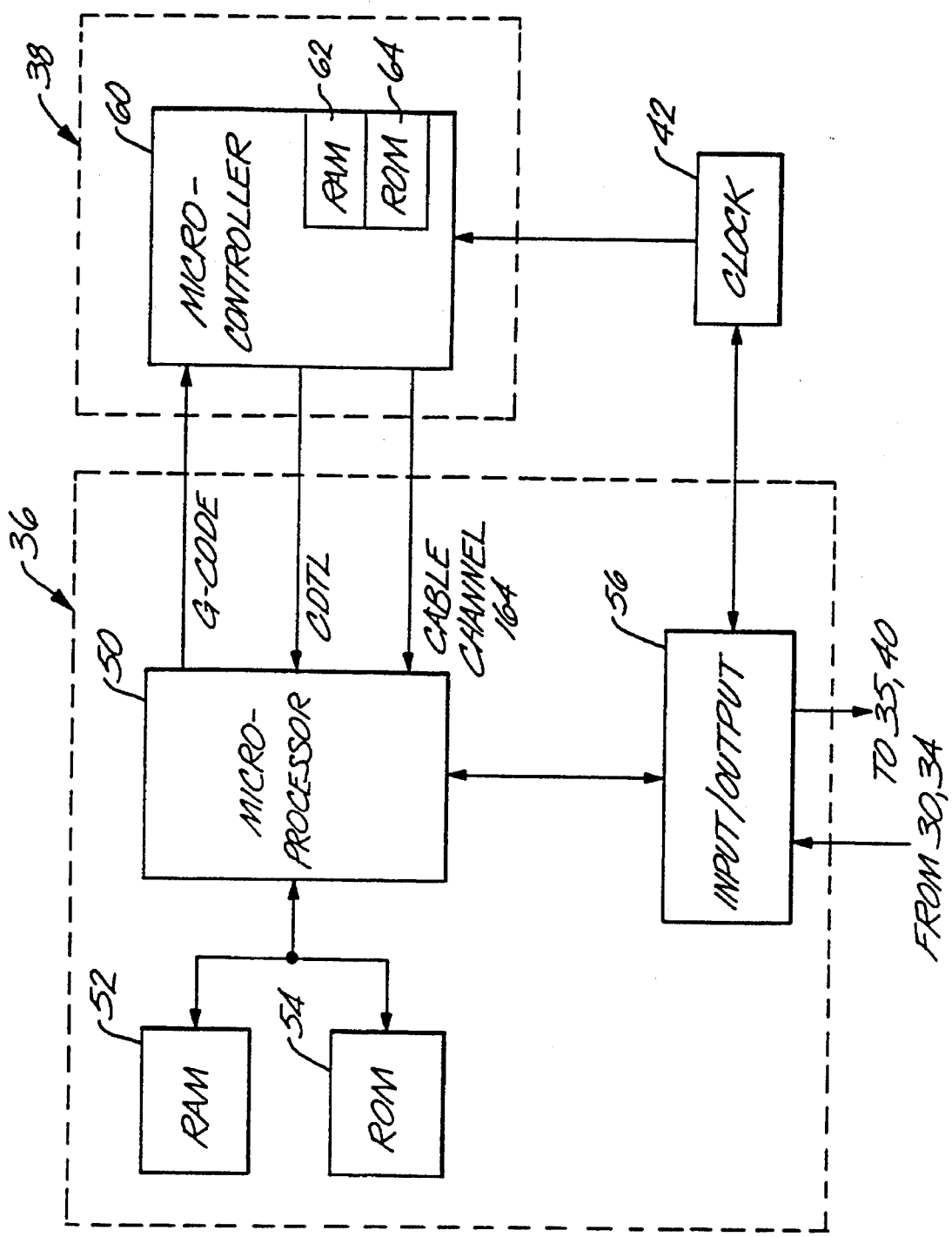
FIG. 2 is a schematic of the VCR embedded processors for command control and code decoding.

A possible realization of the command controller 36 and the G-code decoder 38 is shown in FIG. 2. The command controller 36 function can be realized with a microprocessor 50, a random access memory 52 and a read only memory 54, which is used for program storage. The input/output 56 function is adapted to receive commands from the command signal receiver 30, the manual controls 34 and the clock 42, and to output signals to a display 35, the clock 42, and the time/channel programming 40 function. If the microprocessor 50 interprets that a G-code has been received, then the G-code is sent to microcontroller 60 for decoding. The microcontroller 60 has an embedded random access memory 62 and an embedded read only memory 64 for program and table storage. The clock 42 can be read by both microprocessor 50 and microcontroller 60.

An alternative to having microcontroller 60 perform the G-code decoding is to build the G-code decoding directly into the program stored in read only memory 54. This would eliminate the need for microcontroller 60. Of course, other hardware to perform the G-code decoding can also be used. The choice of which implementation to use is primarily an economic one.

The blocks in FIGS. 1 and 2 are well known in the prior art and are present in the following patents: Fields, U.S. Pat. No. 4,481,412; Scholz, U.S. Pat. No. 4,519,003; and Brugliera, U.S. Pat. No. 4,631,601. For example, clock 42 is analogous to element 7 in Scholz and element 17 in Brugliera. Other analogous elements are: command signal receiver 30 and Scholz 14 and Brugliera 12; tuner 46 and Scholz 6 and Brugliera 10; time/channel programming 40 and Scholz 8, 11 and Brugliera 16; record & playback 44 and Scholz 1, 2, 4; command controller 36 and Scholz 11, 10 and Brugliera 12; microprocessor 50 and Fields 27; RAM 52 and Fields 34; ROM 54 and Fields 33; manual controls 34 and Scholz 15, 16; and remote controller 12 and Scholz 26 and Brugliera 18.

FIG. 3 illustrates an alternate preferred embodiment of this invention. In FIG. 3 a remote controller with embedded G-code decoder 80 is provided. The remote controller with embedded G-code decoder 80 is very similar to remote controller 12, except for the addition of the G-code decoder 82. Note that it is also possible in any remote controller to provide a display 84. The remote controller with embedded G-code decoder 80 would be used in conjunction with a normal video cassette recorder/player 70, which would not be required to have an embedded G-code decoder. The numerals for the subelements of video cassette recorder/player 70 are the same as described above for the video cassette recorder/player with G-code decoder 14 and have the same function, except for the absence of G-code decoder 38. This preferred embodiment has the advantage that it can be used in conjunction with VCRs that are presently being used. These do not have a G-code decoding capability. Replacing their remote controllers with ones that have this capability built-in can vastly improve the capability to do timer preprogramming for a modest cost.

Figure 4:
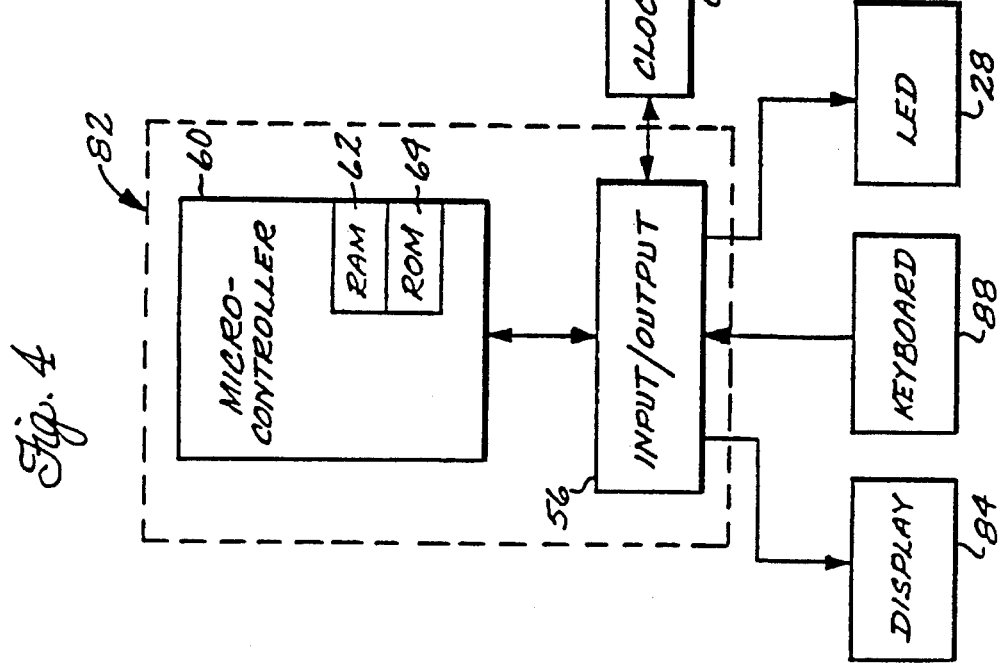
FIG. 4 is a schematic of the processor embedded in the remote controller.

FIG. 4 illustrates a possible realization of the G-code decoder 82 built into the remote controller with embedded G-code decoder 80. A microcontroller 60 can be used as before to decode the G-code, as well as interface with the display 84, a clock 85, the keypad 88 and the light emitting diode 28. Alternately, other hardware implementations can be used to perform the G-code decoding. The clock 85 is provided in the remote controller 80 so that the G-code decoder 82 can be made to have the clock 85 as one of its inputs. This allows the G-code decoding to be a function of the clock 85, which lends a measure of security to the decoding technique and makes it harder to copy.

The remote controller with embedded G-code decoder as described above would send channel, date, time and length information to the video cassette recorder/player 70, which would use the CDTL information for tuning into the correct channel and starting and stopping the recording function. The remote controller may have to be unique for each different video cassette recorder/player, because each brand or model may have different infrared pulses for each type of information sent such as the channel number keys and start record and stop record keys. The particular infrared pulses used for each key type can be called the vocabulary of the particular remote controller. Each model may also have a different protocol or order of keys that need to be pushed to accomplish a function such as timer preprogramming. The protocol or order of keys to accomplish a function can be called sentence structure. If there is a unique remote controller built for each model type, then the proper vocabulary and sentence structure can be built directly into the remote controller.

An alternate to having the remote controller with embedded G-code decoder send channel, date, time and length information to the video cassette recorder/player 70, is to have the remote controller with embedded G-code decoder perform more operations to simplify the interfacing problem with existing video cassette recorder/players. In particular, if the remote controller not only performs the G-code decoding to CDTL, but also keeps track of time via clock 85, then it is possible for the remote controller to send just channel, start record and stop commands to the video cassette recorder/player. The channel, start and stop are usually basic one or two key commands, which means there is no complicated protocol or sentence structure involved. Thus, to communicate with a diverse set of video cassette recorder/player models it is only necessary to have memory within the remote controller, such as ROM 64 of FIG. 4, for storing the protocol for all the models or at least a large subset. The G-code would be entered on the remote controller as before and decoded into channel, date, time and length information, which would be stored in the remote controller. Via clock 85, the time would be checked and when the correct time arrives the remote controller would automatically send out commands to the VCR unit for tuning to the correct channel and for starting and stopping the recording. It is estimated that only two (2) bytes per key for about 15 keys need to be stored for the vocabulary for each video cassette recorder/player model. Thus, to cover 50 models would only require about 30*50=1500 bytes of memory in the remote controller. It would be necessary to position the remote controller properly with respect to the VCR unit so that the infrared signals sent by the remote controller are received by the unit.

Figure 5:
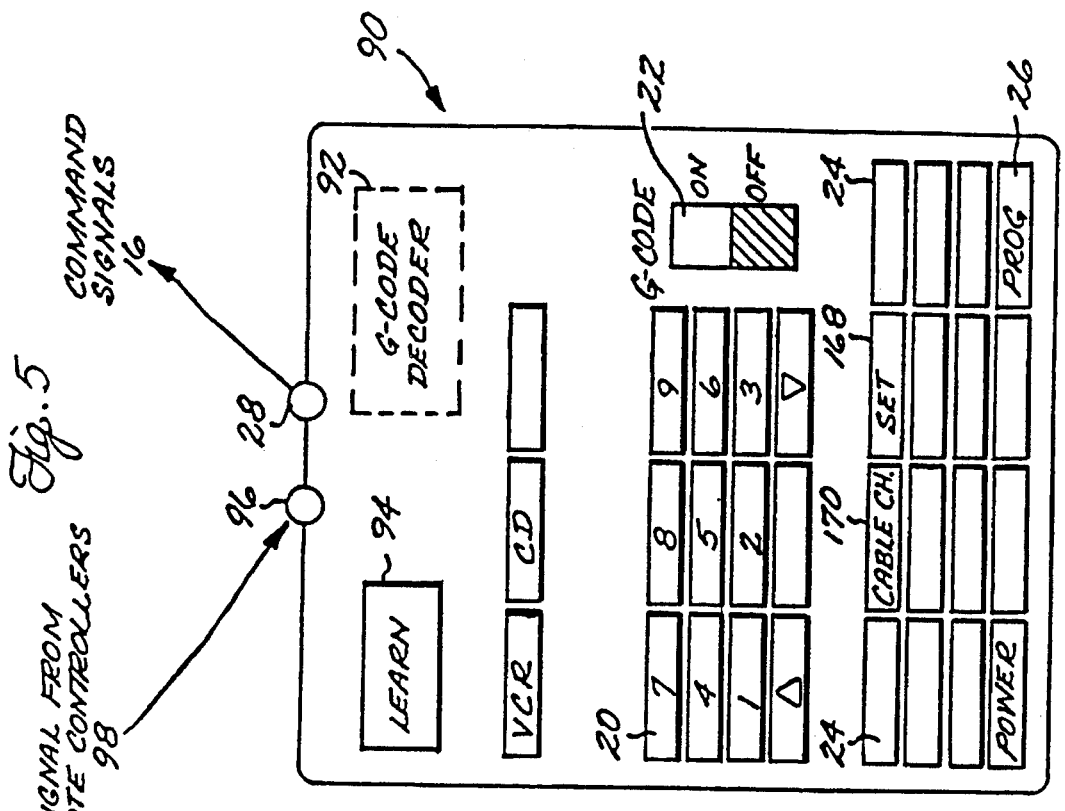
FIG. 5 is a schematic of a universal remote controller with the code decoder means embedded in the universal remote controller.

Another preferred embodiment is to provide a universal remote controller 90 with an embedded G-code decoder. Universal remote controllers provide the capability to mimic a number of different remote controllers. This reduces the number of remote controllers that a user needs to have. This is accomplished by having a learn function key 94 function on the universal remote controller, as shown in FIG. 5. If the learn function key 94 is pushed in conjunction with another key, the unit will enter into the learn mode. Incoming infra-red (IR) pulses from the remote controller to be learned are detected by the infra-red photodiode 96, filtered and wave-shaped into recognizable bit patterns before being recorded by a microcontroller into a battery-backed static RAM as the particular IR pulse pattern for that particular key. This is done for all the individual keys.

An example of more complex learning is the following. If the learn function key 94 in conjunction with the program key 26 are pushed when the G-code switch is "ON", the unit will recognize that it is about to record the keying sequence of a predetermined specific example of timer preprogramming of the particular VCR involved. The user will then enter the keying sequence from which the universal remote controller 90 can then deduce and record the protocol of the timer preprogramming sequence. This is necessary because different VCRs may have different timer preprogramming command formats.

If keys are pushed without the learn function key 94 involved, the microcontroller should recognize it is now in the execute mode. If the key is one of the direct command keys, the microcontroller will read back from its static RAM the stored pulse sequence and send out command words through the output parallel I/O to pulse the output light emitting diode 28. If the key is the PROG key and the G-code switch is "OFF", then the microcontroller should recognize the following keys up to the next PROG key as a timer preprogramming CDTL command and send it out through the light emitting diode 28. If the G-code switch 22 is set to "ON" and the program key 26 is pushed, the microcontroller should recognize the following keys up to the next PROG key as a G-code command for timer preprogramming. It will decode the G-code into channel, date, start time and length (CDTL) and the microcontroller will then look up in it's static RAM "dictionary" the associated infra-red pulse patterns and concatenate them together before sending them off through the output parallel I/O to pulse the light emitting diode 28 to send the whole message in one continuous stream to the VCR.

FIG. 4 illustrates a possible realization of the G-code decoder 92 that could be built into the universal remote controller with embedded G-code decoder 90. A microcontroller 60 can be used as before to decode the G-code, as well as for interfacing with the input/output functions including the photodiode 96. Alternately, the G-code decoding can be performed with other hardware implementations.

The universal remote controller can also be used in another manner to simplify the interfacing problem with existing video cassette recorder/players. In particular, if the universal remote controller performs not only the G-code decoding to CDTL, but also keeps track of time via clock 85 in FIG. 4, then it is possible for the universal remote controller to send just channel, start record and stop commands to the video cassette recorder/player, which as explained before, are usually basic one key commands, which means there is no complicated protocol or sentence structure involved. Thus, to communicate with a diverse set of video cassette recorder/player models it is only necessary for the universal remote controller to "learn" each key of the remote controller it is replacing. The G-code would be entered on the universal remote controller as before and decoded into channel, date, time and length information, which would be stored in the universal remote controller. Via clock 85, the time would be checked and when the correct time arrives the universal remote controller would automatically send out commands to the VCR unit for tuning to the correct channel and for starting and stopping the recording. It would be necessary to position the universal remote controller properly with respect to the VCR unit so that the signals sent by the universal remote are received by the VCR unit.

There are a number of ways that the G-code decoding can be performed. The most obvious way is to just have a large look up table. The G-code would be the index. Unfortunately, this would be very inefficient and result in a very expensive decoder due to the memory involved. The total storage involved is a function of the number of total combinations. If we allow for 128 channels, 31 days in a month, 48 on the hour and on the half hour start times in a twenty four hour day, and 16 length selections in half hour increments, then the total number of combinations is 128×31×48×16=3,047,424. This number of combinations can be represented by a 7 digit number. The address to the table would be the 7 digit number. In the worst case, this requires a look up table that has about 4,000,000 rows by 15 to 16 digital columns, depending on the particular protocol. These digital columns would correspond to the CDTL information required for "on screen programming". Each digit could be represented by a 4 bit binary number. Thus, the total storage number of bits required for the look up table would be about 4,000,000×16×4=256,000,000. The present state of the art has about 1 million bits per chip. Thus, G-code decoding using a straightforward table look up would require a prohibitively expensive number of chips.

Fortunately, there are much more clever ways of performing the G-code decoding. FIG. 6 is a flow diagram of a preferred G-code decoding technique. To understand G-code decoding, it is easiest to first explain the G-code encoding technique, for which FIG. 7 is the flow chart. Then the G-code decoding technique, which is the reverse of the G-code encoding will be explained.

The encoding of the G-codes can be done on any computer and is done prior to preparation of any program guide that would include G-codes. For each program that will be printed in the guide, a channel, date, time and length (CDTL) code 144 is entered in step 142. Step 146 separately reads the priority for the channel, date, time and length in the priority vector storage 122, which can be stored in read only memory 64. The priority vector storage 122 contains four tables: a priority vector C table 124, a priority vector D table 126, a priority vector T table 128 and a priority vector L table 130.

The channel priority table is ordered so that the most frequently used channels have a low priority number. An example of the data that is in priority vector C table 124 follows.

| channel  | 4 | 7 | 2 | 3 | 5 | 6 | 11 | 13 | ... |
|---|---|---|---|---|---|---|---|---|---|
| priority | 0 | 1 | 2 | 3 | 4 | 5 | 6  | 7  | ... |

Generally the dates of a month all have an equal priority, so the low number days in a month and the low number priorities would correspond in the priority vector D table as in the following example.

| date     | 1 | 2 | 3 | 4 | 5 | 6 | 7 | 8 | ... |
|---|---|---|---|---|---|---|---|---|---|
| priority | 0 | 1 | 2 | 3 | 4 | 5 | 6 | 7 | ... |

The priority of the start times would be arranged so that prime time would have a low priority number and programs in the dead of the night would have a high priority number. For example, the priority vector T table would contain:

| time     | 6:30pm | 7:00pm | 8:00pm | 7:30pm | ... |
|---|---|---|---|---|---|
| priority | 0      | 1      | 2      | 3      | ... |

An example of the data that is in the priority vector L table 130 is the following:

| length of program (hours) | 0.5 | 1.0 | 2.0 | 1.5 | 3.0 | ... |
|---|---|---|---|---|---|---|
| priority                  | 0   | 1   | 2   | 3   | 4   | ... |

Suppose the channel date time length (CDTL) 144 data is 5 10 19.00 1.5, which means channel 5, 10th day of the month, 7:00 PM, and 1.5 hours in length, then for the above example the $C_p, D_p, T_p, L_p$ data 148, which are the result of looking up the priorities for channel, date, time and length in priority tables 124, 126, 128 and 130 of FIG. 7, would be 4 9 1 3. Step 150 converts $C_p, D_p, T_p, L_p$ data to binary numbers. The number of binary bits in each conversion is determined by the number of combinations involved. Seven bits for $C_p$, which can be denoted as $C_7 \, C_6 \, C_5 \, C_4 \, C_3 \, C_2 \, C_1$, would provide for 128 channels. Five bits for $D_p$, which can be denoted as $D_5 \, D_4 \, D_3 \, D_2 \, D_1$, would provide for 31 days in a month. Six bits for $T_p$, which can be denoted as $T_6 \, T_5 \, T_4 \, T_3 \, T_2 \, T_1$, would provide for 48 start times on each half hour of a twenty four hour day. Four bits for length, which can be denoted as $L_4 \, L_3 \, L_2 \, L_1$, would provide for a program length of up to 8 hours in half hour steps. Together there are 7+5+6+4=22 bits of information, which correspond to 2**22=4,194,304 combinations.

The next step is to use bit hierarchy key 120, which can be stored in read only memory 64 to reorder the 22 bits. The bit hierarchy key 120 can be any ordering of the 22 bits. For example, the bit hierarchy key might be:

| $L_8$ | $C_3$ | ... | $T_2$ | $C_2$ | $T_1$ | $C_1$ | $L_1$ | $D_5$ | $D_4$ | $D_3$ | $D_2$ | $D_1$ |
|---|---|---|---|---|---|---|---|---|---|---|---|---|
| 22 | 21 | ... | 10 | 9 | 8 | 7 | 6 | 5 | 4 | 3 | 2 | 1 |

Ideally the bit hierarchy key is ordered so that programs most likely to be the subject of timer preprogramming would have a low value binary number, which would eliminate keystrokes for timer preprogramming the most popular programs. Since all the date information has equal priority, then the $D_5 \, D_4 \, D_3 \, D_2 \, D_1$ bits are first. Next $T_1 \, C_1 \, L_1$ are used, because for whatever date it is necessary to have a time channel and length and $T_1 \, C_1 \, L_1$ are the most probable in each case due to the ordering of the priority vectors in priority vector storage 122. The next bit in the hierarchy key is determined by the differential probabilities of the various combinations. One must know the probabilities of all the channels, times and lengths for this calculation to be performed.

For example, the probability for channels may be:

| channel | 4 | 7 | 2 | 3 | 5 | 6 | 11 | 13 | ... |
|---|---|---|---|---|---|---|---|---|---|
| priority | 0 | 1 | 2 | 3 | 4 | 5 | 6 | 7 | ... |
| probability (%) | 5 | 4.3 | 4 | 3 | 2.9 | 2.1 | 2 | 1.8 | ... |

The probabilities for times might be:

| time | 6:30pm | 7:00pm | 8:00pm | 7:30pm | ... |
|---|---|---|---|---|---|
| priority | 0 | 1 | 2 | 3 | ... |
| probability (%) | 8 | 7.8 | 6 | 5 | ... |

And, the probabilities for lengths might be:

| length of program (hours) | 0.5 | 1.0 | 2.0 | 1.5 | 3.0 | ... |
|---|---|---|---|---|---|---|
| priority | 0 | 1 | 2 | 3 | 4 | ... |
| probability (%) | 50 | 20 | 15 | 5 | 4 | ... |

The probabilities associated with each channel, time and length, as illustrated above, are used to determine the proper ordering. Since the priority vector tables are already ordered by the most popular channel, time, and length, the order in which to select between the various binary bits for one table, for example selecting between the $C_7 \, C_6 \, C_5 \, C_4 \, C_3 \, C_2 \, C_1$ bits, is already known. The $C_1$ bit would be selected first because as the lowest order binary bit it would select between the first two entries in the channel priority table. Then the $C_2$ bit would be selected and so on. Similarly, the $T_1$ and $L_1$ bits would be used before any of the other time and length bits. A combination of the $C_1, T_1, L_1$ and $D_5 \, D_4 \, D_3 \, D_2 \, D_1$ bits should be used first, so that all the information is available for a channel, date, time and length. The $D_5 \, D_4 \, D_3 \, D_2 \, D_1$ bits are all used because the date bits all have equal priority and all are needed to specify a date even if some of the bits are binary zero.

At this point the bit hierarchy key could be:

$$T_1 \; C_1 \; L_1 \; D_5 \; D_4 \; D_3 \; D_2 \; D_1$$

The first channel binary bit $C_1$ by itself can only select between $2^1=2$ channels, and the first two channels have a probability percent of 5 and 4.3, respectively. So the differential probability of $C_1$ is 9.3. Similarly, the differential probability of $T_1$ is 8+7.8=15.8, and the differential probability of $L_1$ is 50+20=70. If the rules for ordering the bit hierarchy key are strictly followed, then the first 8 bits of the bit hierarchy key should be ordered as:

$$C_1 \; T_1 \; L_1 \; D_5 \; D_4 \; D_3 \; D_2 \; D_1,$$

because $L_1$ has the highest differential priority so it should be next most significant bit after $D_5$, followed by $T_1$ as the next most significant bit, and then $C_1$ as the next most significant bit. Notice that the bit hierarchy key starts with the least significant bit $D_1$, and then is filled in with the highest differential probability bits. This is for the purpose of constructing the most compact codes for popular programs.

The question at this point in the encoding process is what should the next most significant bit in the hierarchy key be: $T_2, C_2$, or $L_2$. This is again determined by the differential probabilities, which can be calculated from the above tables for each bit. Since we are dealing with binary bits, the $C_2$ in combination with $C_1$ selects between $2^2=4$ channels or 2 more channels over $C_1$ alone. The differential probability for $C_2$ is then the additional probabilities of these two additional channels and for the example this is: 4+3=7. In a similar manner $C_3$ in combination with $C_1$ and $C_2$ selects between $2^3=8$ channels or $4=2^{(3-1)}$ more channels over the combination of $C_1$ and $C_2$. So the differential probability of $C_3$ is the additional probabilities of these four additional channels and for the example this is: 2.9+2.1+2+1.8=8.8. In a similar manner, the differential probabilities of $T_2$ and $L_2$ can be calculated to be 6+5=11 and 15+5=20, respectively. Once all the differential probabilities are calculated, the next step is determining which combinations of bits are more probable.

Now for the above example, which combination is more probable: $T_2$ with $C_1 \, L_1$, or $C_2$ with $T_1 \, L_1$, or $L_2$ with $T_1 \, C_1$. This will determine the next bit in the key. So, which is greater: 11×9.3×70=7161; 7×15.8×70=7742; or 20×15.8×9.3=2938.8? In this case the combination with the greatest probability is 7×15.8×70=7742, which corresponds to $C_2$ with $T_1 \, L_1$. So, $C_2$ is selected as the next bit in the bit hierarchy key.

The next bit is selected in the same way. Which combination is more probable: $C_3$ with $T_1 \, L_1$, or $T_2$ with $C_1$ or $C_2$ and $L_1$, or $L_2$ with $C_1$ or $C_2$ and $T_1$. For the example shown, which has the greatest probability: 8.8×15.8×70=9732.8; 11×(9.3+7)×70=12551; or 20×(9.3+7)×15.8=5150.8? In this case the combination with the greatest probability is 11×(9.3+7)×70=12551, which corresponds $T_2$ with $C_1$ or $C_2$ and $L_1$. So, $T_2$ is selected as the next bit in the bit hierarchy key. This procedure is repeated for all the differential probabilities until the entire key is found.

Alternately, the bit hierarchy key can be just some arbitrary sequence of the bits. It is also possible to make the priority vectors interdependent, such as making the length priority vector dependent on different groups of channels. Another technique is to make the bit hierarchy key 120 and the priority vector tables 122, a function of clock 42, as shown in FIG. 7. This makes it very difficult for the key and therefore the coding technique to be duplicated or copied.

For example it is possible to scramble the date bits in the bit hierarchy key 120 as a function of the clock. Changing the order of the bits as a function of the clock would not change the effectiveness of the bit hierarchy key in reducing the number of binary bits for the most popular programs, because the date bits all are of equal priority. This could be as simple as switching the $D_1$ and $D_5$ bits periodically, such as every day or week. Thus the bit hierarchy key 120 would switch between $C_1 \ T_1 \ L_1 \ D_5 \ D_4 \ D_3 \ D_2 \ D_1$ and $C_1 \ T_1 \ L_1 \ D_1 \ D_4 \ D_3 \ D_2 \ D_5$.

Clearly other permutations of the bit hierarchy key as a function of the clock are possible.

The priority vector tables could also be scrambled as a function of the clock. For example, the first two channels in the priority channel table could just be swapped periodically. If this technique is followed, then the $C_p$ of 148 in FIG. 7 would change as a function of the clock 42. For example,

| channel  | 4 | 7 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... | would change periodically to:

| channel  | 7 | 4 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... |

This would be a fairly subtle security technique, because a decoder that was otherwise correct would only fail if those first two channels were being used. Other clock dependencies are also possible to provide security for the coding technique.

However it is derived, the bit hierarchy key 120 is determined and stored. In step 154 the binary bits of $C_p, D_p, T_p, L_p$ are rearranged according to the bit hierarchy key 120 to create one 22 bit binary number. Then the resulting 22 bit binary number is converted to decimal in the convert binary number to decimal G-code step 156. The result is G-code 158.

If the priority vector and the bit hierarchy key are well matched to the viewing habits of the general population, then it is expected that the more popular programs would require no more than 3 or 4 digits for the G-code.

Now that the encoding technique has been explained the decoding technique is just reversing the coding technique. This is done according to the flow chart of FIG. 6. This is the preferred G-code decoding that can be built into G-code decoder 38 in VCR 14 or the remote controller G-code decoders 82 and 92 in FIGS. 3 and 5.

The first step 102 is to enter G-code 104. Next the G-code 104 is converted to a 22 bit binary number in step 106. Then the bits are reordered in step 108 according to the bit hierarchy key 120 to obtain the reordered bits 110. Then the bits are grouped together and converted to decimal form in step 112. As this point we obtain $C_p, D_p, T_p, L_p$ data 114, which are the indices to the priority vector tables. For the above example, we would have at this step the vector 4 9 13. This $C_p, D_p, T_p, L_p$ data 114 is then used in step 116 to look up channel, date, time, and length in priority vector storage 122. The CDTL 118 for the example above is 5 10 19.00 1.5, which means channel 5, 10th day of the month, 7:00 PM, and 1.5 hours in length.

If the coding technique is a function of the clock then it is also necessary to make the decoding technique a function of the clock. It is possible to make the bit hierarchy key 120 and the priority vector tables 122, a function of clock 42, as shown in FIG. 6. This again makes it very difficult for the key and therefore the coding technique to be duplicated or copied. It is also possible to have the decoding and encoding techniques dependent on any other predetermined or pre-programmable algorithm.

Although the above G-code encoding and decoding technique is a preferred embodiment, it should be understood that there are many ways to perform the intent of the invention which is to reduce the number of keystrokes required for timer preprogramming. To accomplish this goal there are many ways to perform the G-code encoding and decoding. There are also many ways to make the encoding and decoding technique more secure besides just making the encoding and decoding a function of the clock. This security can be the result of any predetermined or preprogrammed algorithm.

It is possible in the G-code coding and decoding techniques to use mixed radix number systems instead of binary numbers. For example, suppose that there are only 35 channels, which would require 6 binary bits to be represented; however, 6 binary bits can represent 64 channels, because $2^6=64$. The result is that in a binary number system there are 29 unnecessary positions. This can have the effect of possibly making a particular G-code longer than it really needs to be. A mixed radix number system can avoid this result. For example, for the case of 35 channels, a mixed radix number system with the factors of $7^1$ and $5^0$ can represent 35 combinations without any empty space in the code. The allowed numbers for the $7^1$ factor are 0, 1, 2, 3, and 4. The allowed numbers for the $5^0$ factor are 0, 1, 2, 3, 4, 5, and 6. For example, digital 0 is represented in the mixed radix number system as 00. The digital number 34 is represented in the mixed radix number system as 46, because $4*7^1+6*5^0=34$. The major advantage of a mixed radix number system is in prioritizing the hierarchy key. If the first 5 channels have about equal priority and the next 30 are also about equal, then the mixed radix number system allows the two tiers to be accurately represented. This is not to say that a mixed radix number system is necessarily preferable. Binary numbers are easier to represent in a computer and use of a fixed radix number system such as binary numbers allows a pyramid of prioritization to be easily represented in the hierarchy key.

Another feature that is desirable in all of the embodiments is the capability to key in the G-code once for a program and then have the resulting CDTL information used daily or weekly. Ordinarily the CDTL information is discarded once it is used. In the case of daily or weekly recording of the same program, the CDTL information is stored and used until it is cancelled. The desire to repeat the program daily or weekly can be performed by having a "WEEKLY" or "DAILY" button on the remote controller or built into the VCR manual controls. Another way is to use one key, such as the PROG key and push it multiple times within a certain period of time such as twice to specify daily or thrice to specify weekly. For example, if the G-code switch is "ON" and the G-code for the desired program is 99 then daily recording of the program can be selected by the following keystrokes:

"PROG 99 DAILY PROG"
or by:
"PROG 99 PROG PROG".
The G-code 99 would be converted to CDTL information, which would be stored and used daily in this case. The recording would begin on the date specified and continue daily after that using the same channel time and length information. A slight twist is that daily recording could be automatically suspended during the weekends, because most daily programs are different on Saturday and Sunday.

Once a daily or weekly program is set up, then it can be used indefinitely. If it is desired to cancel a program and if there is a "CANCEL" button on the remote controller or manual control for the VCR, then one way to cancel a program (whether it is a normal CDTL, daily or weekly entry) is to key in the following:

"PROG xx CANCEL", where xx is the G-code. Again as before there are alternate ways of accomplishing this.

If "on screen programming" is available, then the programs that have been selected for timer preprogramming could be reviewed on the screen. The daily and weekly programs would have an indication of their type. Also the G-codes could be displayed along with the corresponding CDTL information. This would make it quite easy to review the current "menu" and either add more programs or cancel programs as desired.

A television calendar 200 according to this invention is illustrated in FIG. 8. As shown, the television calendar has multiple day of year sections 202, multiple day sections 204, multiple time of day sections 206, channel identifiers 208, and descriptive program identifiers 210, including the name of the program, arranged in a manner that is common in television guide publications. Arranged in relation to each channel identifier is a compressed code indication 212 or G-code containing the channel, date, time and length information for that entry in the television calendar. FIG. 8 shows how easy it is to perform timer programming. All one needs to do is find the program one wants to watch and enter the compressed code shown in the compressed code indication. This is in contrast to having to deal with all the channel, date, time and length entries separately. At least the channel, date and time are explicitly stated in the television guide. The length is usually only available by searching the guide to find the time of day section 206 where a new program begins and then performing some arithmetic to find the length of the program. Using the compressed G-code avoids all these complications.

For cable television programs, there is an additional issue that needs to be addressed for the compressed G-code to be useful. In a normal television guide, CDTL information is available for all the normal broadcast channels in the form of numbers including the channel numbers, such as channel 4 or 7. However, for cable channels like HBO, ESPN etc., only the names of the channels are provided in most television listings. The reason for this is that in some metropolitan areas, such as Los Angeles, there may be only one (1) edition of television guide, but there may be quite a few cable carriers, each of which may assign HBO or ESPN to different cable channel numbers. In order for a compressed code such as the G-code to be applicable to the cable channels as published by a wide area television guide publication, the following approach can be used.

First, all the cable channels would be permanently assigned a unique number, which would be valid across the nation. For example, we could assign ESPN to cable channel 1, HBO as cable channel 2, SHO as cable channel 3, etc. This assignment would be published by the television guide publications.

The video cassette recorder apparatus, such as the remote controller, the VCR unit or both, could then be provided with two (2) extra modes: "set" and "cable channel". One way of providing the user interface to these modes would be to provide two (2) extra buttons: one called SET and one called CABLE CHANNEL. The buttons could be located on the video cassette recorder unit itself or located on a remote controller, as shown in FIGS. 1, 3 and 5, where SET is element 168 and CABLE CHANNEL is element 170. Of course, other user interfaces are possible.

Next, the television viewer would have to go through a one-time "setting" procedure of his VCR for all the cable channels that he would likely watch. This "setting" procedure would relate each of the assigned numbers for each cable channel to the channel number of the local cable carrier. For example, suppose that the local cable carrier uses channel 6 for ESPN, then cable channel number 1 could be assigned to ESPN, as shown in the following table.

| Cable Channel Name | Assigned Cable Chan. No. | Channel Number in the local cable carrier |
|---|---|---|
| ESPN | 1 | 6 |
| HBO | 2 | 24 |
| SHO | 3 | 23 |
| . | . | . |
| . | . | . |
| DIS | 8 | 25 |

The user could perform the "setting" procedure by pushing the buttons on his remote controller as follows:

SET 06 CABLE CHANNEL 1 PROGRAM

SET 24 CABLE CHANNEL 2 PROGRAM

SET 23 CABLE CHANNEL 3 PROGRAM

SET 25 CABLE CHANNEL 8 PROGRAM

The "setting" procedure would create a cable channel address table 162, which would be loaded into RAM 52 of command controller 36. For the above example, the cable channel address table 162 would have the following information.

| CABLE CHANNEL ADDRESS TABLE 162 | |
|---|---|
| 1 | 6 |
| 2 | 24 |
| 3 | 23 |
| . | |
| . | |
| 8 | 25 |

After the "setting" procedure is performed, the TV viewer can now select cable channels for viewing by the old way: e.g. pushing the key pad buttons 24 will select HBO. He can also do it the new way: e.g. by pushing CABLE CHANNEL 2, which will also select HBO. The advantage of the new way is that the television guide will publish [C2] next to the program description, so the viewer will just look up the assigned channel number identifier instead of having to remember that HBO is local cable channel 24. When the CABLE CHANNEL button is pushed, command controller 36 knows that it will look up the local cable channel number in cable channel address table 162 to tune the VCR to the correct channel.

For timer preprogramming and for using the compressed G-code, a way to differentiate between broadcast and cable channels is to add an eighth channel bit, which would be set to 0 for normal broadcast channels and 1 for cable channels such as HBO. This eighth channel bit could be one of the low order bits such as the third bit $C_3$ out of the eight channel bits, so that the number of bits to specify popular channels is minimized, whether they be normal broadcast or cable channels. For a normal broadcast channel, the 7 other bits can be decoded according to priority vector C table 124. For a cable channel, the 7 other bits can be decoded according to a separate cable channel priority vector table 160, which could be stored in ROM 54 of microcontroller 36. The cable channel priority vector table can be set ahead of time for the entire country or at least for an area covered by a particular wide area television guide publication.

A television guide that carries the compressed code known as the G-code will now print the cable channel information as follows:

|  | 6:30 pm | |
|---|---|---|
| [C2] | HBO xxxxxxxxxxxxxxxxxxxxxxxxxxxxxxxx<br>xxxxxx(program description)xxxxxxxxxx<br>xxxxxxxxxxxxxxxxxxxxxxxxxxxxxxxxxxxx | (4679) |

The [C2] in front of HBO reminds the viewer that he needs only to push CABLE CHANNEL 2 to select HBO. The (4679) is the G-code indication for this particular program.

FIG. 8 shows a section of a television guide. The cable channels all have an assigned cable channel number 188 in front of the cable channel mnemonic. Other than that the cable channel information is arranged the same as the broadcast channels with a compressed G-code 212 associated with the channel.

For timer preprogramming, the viewer need only enter the number 4679 according to the unit's G-code entry procedure, e.g. PROG 4679 PROG. The G-code decoder unit will decode this G-code into "cable channel 2" and will also signal the command controller 36 with a cable channel signal 164, as shown in FIGS. 1 and 2, because the extra channel bit will be "1" which distinguishes that the G-code is for a cable channel; then, since the association of "cable channel 2" with channel 24 has been established earlier in the "setting" procedure, the command controller, if it has received a cable channel signal, will immediately look up 2 in the cable channel address table 162 to translate it to cable channel 24, which will be used as the recording channel at the appropriate time. By associating the G-code with the assigned cable channel number rather than the local cable channel number, the G-code for that program will be valid in the whole local area, which may have many different cable carriers each of which may have different local cable channel numbers.

To include the cable channel compressed G-code feature, the decoding and encoding algorithms are as shown in FIGS. 9 and 10, respectively. The encoding should be explained first before the decoding. The primary change in FIG. 10 from FIG. 7 is that a cable channel priority vector table 160 has been added and is used in look up priority step 180 if a cable channel is being encoded. Also if a cable channel is being encoded then the cable channel bit is added in the correct bit position in the convert $C_p D_p T_p L_p$ to binary numbers step 182. This could be bit $C_3$, as discussed before. The bit hierarchy key could be determined as before to compress the number of bits in the most popular programs; however, it needs to be 23 bits long to accommodate the cable channel bit. The maximum compressed G-code length could still be 7 digits, because $2^{23}=8,388,608$.

The decoding is shown in FIG. 9 and is just the reverse of the encoding process. After step 108, test cable channel bit 174 is added and effectively tests the cable channel bit to determine if it is a "1". If so then the command controller 36 is signaled via cable channel signal 164 of FIGS. 1 and 2 that the CDTL 118 that will be sent to it from G-code decoder 38 is for a cable channel. Then the command controller knows to look up the local cable carrier channel number based on the assigned cable channel number. In step 176 of FIG. 9, the priority vector tables including the cable channel priority vector table 160 are used to look up the CDTL 118 information.

Figure 11:
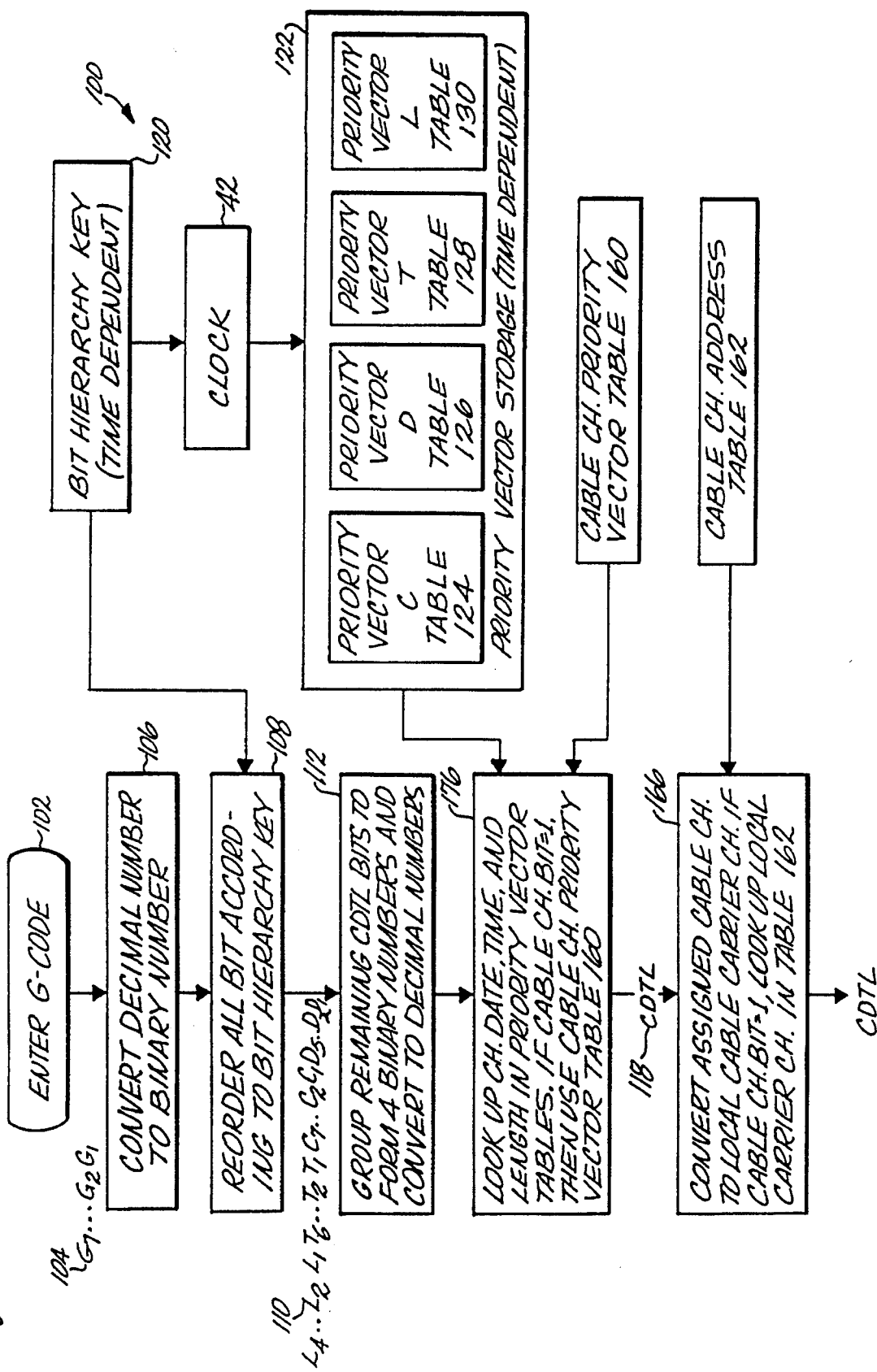
FIG. 11. is a flow graph of the G-code decoding for cable channels including conversion from assigned cable channel number to local cable carrier channel number.

An alternate to having the command controller receive a cable channel signal 164 is for the G-code decoder to perform all of the decoding including the conversion from assigned cable channel number to local cable carrier number. This would be the case for the remote controller implementation of FIG. 3. FIG. 11 shows the implementation of the entire decode algorithm if this step is included. All that needs to be added is convert assigned channel to local cable carrier channel step 166, which performs a look up in cable channel address table 162, if the cable channel bit indicates that a cable channel is involved. Step 166 effectively replaces step 174 in FIG. 9.

Another issue that needs addressing is the number of programs that can be preprogrammed. Since the G-code greatly simplifies the process of entering programs, it is likely that the user will quickly learn and want to enter a large number of programs; however, some existing VCRs can only store up to four (4) programs, while some can store as many as eight. Thus, the user may get easily frustrated by the programming limitations of the VCR.

Figure 12:
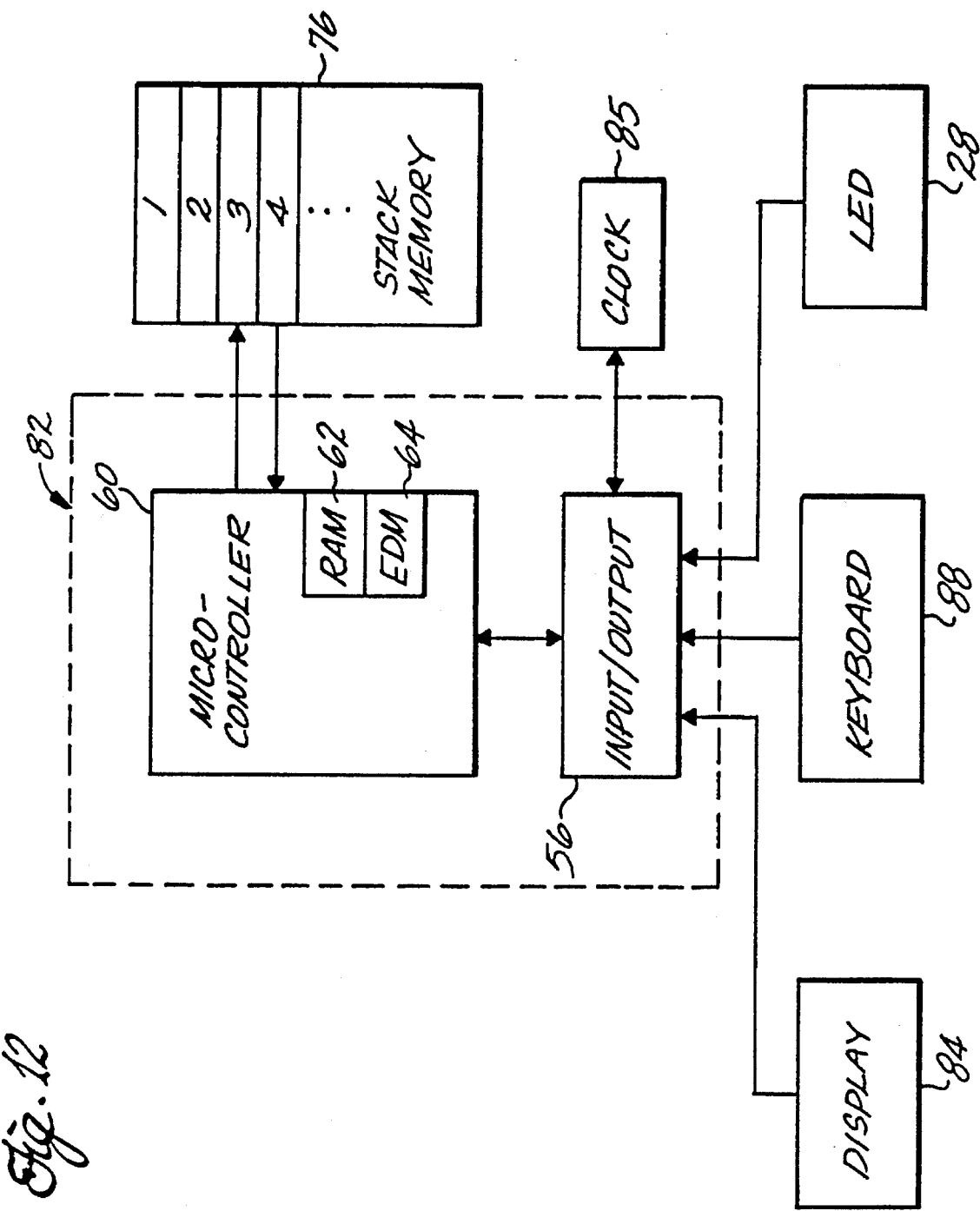
FIG. 12 is a means for decoding including a stack memory.

One approach to this problem, is to perform the compressed G-code decoding in the remote controller and provide enough memory there to store a large number of programs, e.g. 20 or 40. The remote controller would have the capability of transferring periodically several of these stored programs at a time to the VCR main unit. To provide this capability, extra memory called stack memory 76 is required inside the remote unit, as shown in FIG. 12, which other than that is identical to FIG. 4. Stack memory 76 can be implemented with a random access memory, which may in fact reside in the microcontroller itself, such as RAM 62.

The stack memory 76 is where new entry, insertion & deletion of timer preprogramming information is carried out. It is also where editing takes place. The top memory locations of the stack, for example the first 4 locations, correspond exactly to the available timer preprogramming memory in the VCR main unit. Whenever the top of the stack memory is changed, the new information will be sent over to the VCR main unit to update it.

Figure 13:
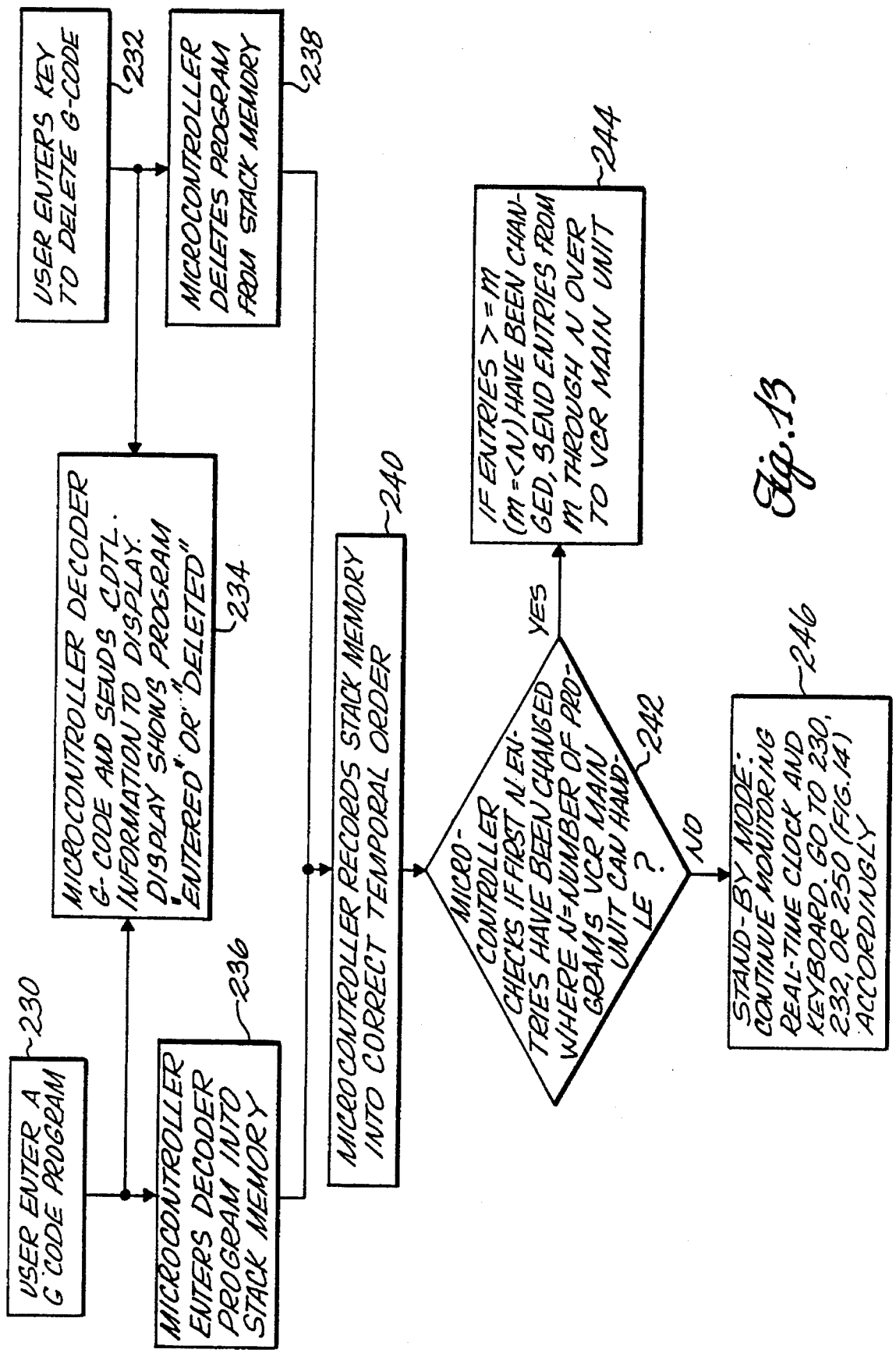
FIG. 13 is a flow chart for program entry into stack memory.

FIG. 13 shows the sequence of events when the user enters a G-code program on the keypad of the remote controller. For illustration purposes, suppose the VCR main unit can only handle four (4) programs. Suppose also that the stack memory capacity is 20 timer preprograms. Referring to the flow chart in FIG. 13, when the user enters a G-code in step 230, the microcontroller 60 first decodes it into the CDTL information in step 234 and displays it on the display unit with the additional word "entered" also displayed. The microcontroller then enters the decoded program into the stack memory in step 236.

If this is the first program entered, it is placed at the top location of the stack memory. If there are already programs in the stack memory, the newly entered program will first be provisionally placed at the bottom of the stack memory. The stack memory will then be sorted into the correct temporal order in step 240, so that the earliest program in time will appear in the top location and the last program in time will be at the bottom. Notice that the nature of the temporally sorted stack memory is such that if stack memory location n is altered, then all the locations below it will be altered.

For example, suppose the stack memory has six (6) entries already temporally ordered, and a new entry is entered whose temporal ordering places it in location 3 (1 being the top location). If this entry is placed into location 3, information which was in location 3, 4, 5, 6 will be shifted to locations 4, 5, 6, and 7. Locations 1 and 2 will remain unchanged.

The microcontroller 60, after doing the temporal ordering, checks in step 242 whether the first n entries have changed from before, where for the current example n equals 4. In this case, since a new program has been entered into location 3, what used to be in location 3 now moves to location 4. Since the VCR's main unit program menu of 4 entries should correspond exactly to location 1 through 4 of the stack memory, entries 3 and 4 on the VCR main unit must now be revised. The microcontroller therefore sends out the new entries 3 & 4 to the main unit, in step 244 of FIG. 13. If the newly entered program, after temporal ordering, gets entered into location 5, then entries 1 through 4 have not changed from before and the microcontroller will not send any message to the VCR main unit and the microcontroller will just resume monitoring the clock 85 and the keyboard 88 as per step 246. It is assumed that when the user enters the G-code in step 230, the remote controller is pointed at the VCR main unit. The other steps of FIG. 13 happen so fast that the changes are sent in step 244 while the remote controller is still being pointed at the VCR main unit.

If the user decides to delete a program in step 232, the deletion is first carried out in the stack memory. If the first 4 entries are affected, the microcontroller will send the revised information over to the VCR main unit. If the first 4 entries are not affected, then again the remote controller unit will not send anything. The deletion will only change the lower part of the stack (lower meaning location 5 to 20). This new information will be sent over to the VCR main unit at the appropriate time.

In the meantime, the VCR main unit will be carrying out its timer programming function, completing its timing preprogramming entries one by one. By the time all 4 recording entries have been completed, the stack in the remote must send some new entries over to "replenish" the VCR main unit (if the stack has more than 4 entries).

Figure 14:
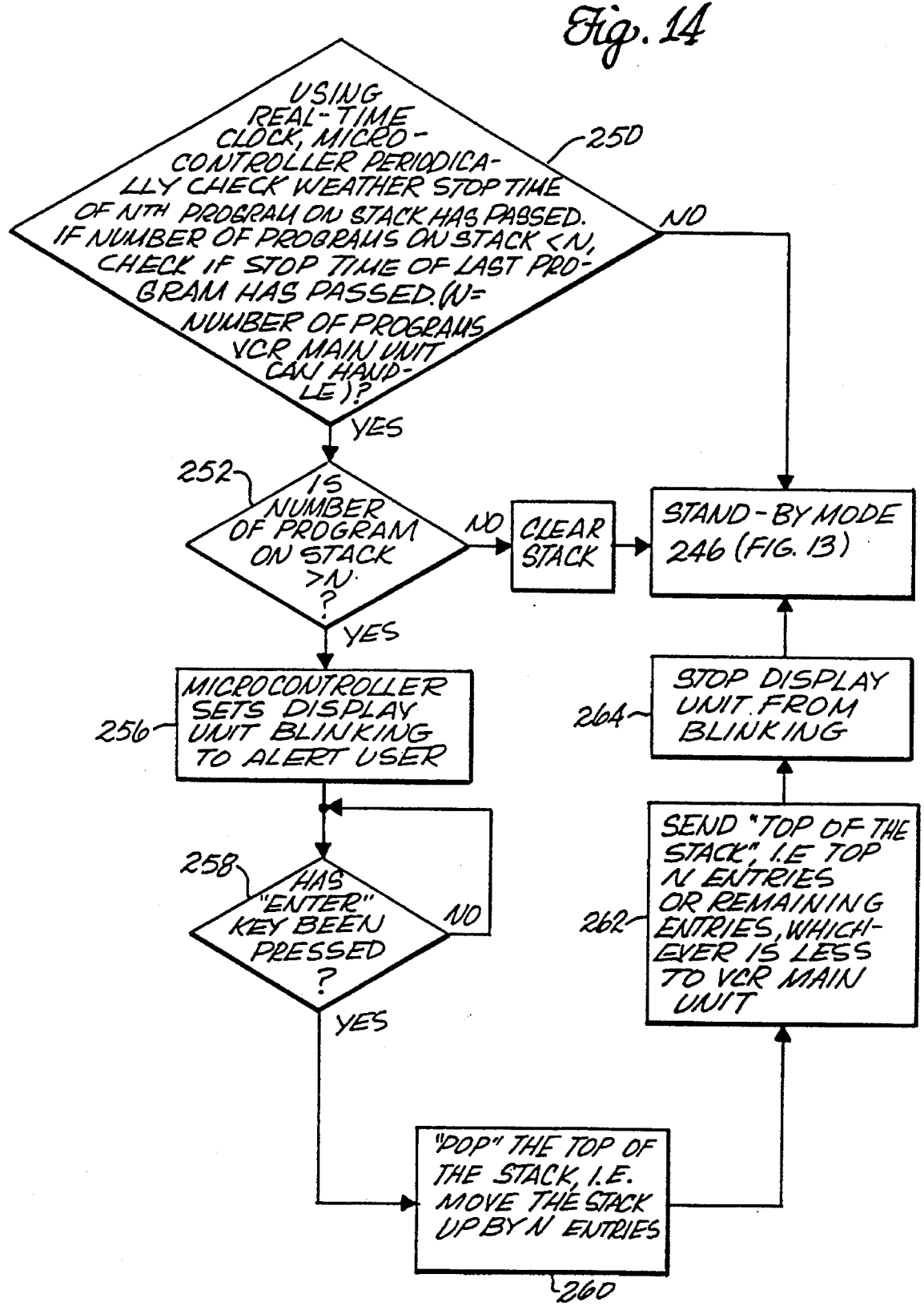
FIG. 14 is an operation flow chart for sending programs from remote control to main unit VCR.

The real time clock 85 in the remote controller unit is monitored by the microcontroller to determine when the programs in the main unit have been used up. Referring to the flow chart in FIG. 14, the microcontroller periodically checks the clock and the times for the programs at the top of the stack in step 250 (say the first 4 entries), which are identical to the VCR's main unit's menu. If on one of the periodic checks, it is determined that the recording of the main unit's menu is complete, then if there are more entries in the stack, which is tested in step 252, the display unit will be set to a blinking mode or display a blinking message in step 258 to alert the user to send more programs. Next time the user picks up the remote unit, the blinking will remind him that the VCR main unit's program menu has been completed and it is time to replenish the VCR main unit with program entries stored in the remote. The user simply picks up the remote and points it towards the VCR main unit and presses "ENTER". This will "pop" the top of the stack memory in step 260, i.e. pop all the entries in the stack up by four locations. The microcontroller will then send the new "top of the stack" (i.e. top 4 entries) over to the VCR main unit in step 262. This process will repeat until the whole stack has been emptied.

Figure 15:
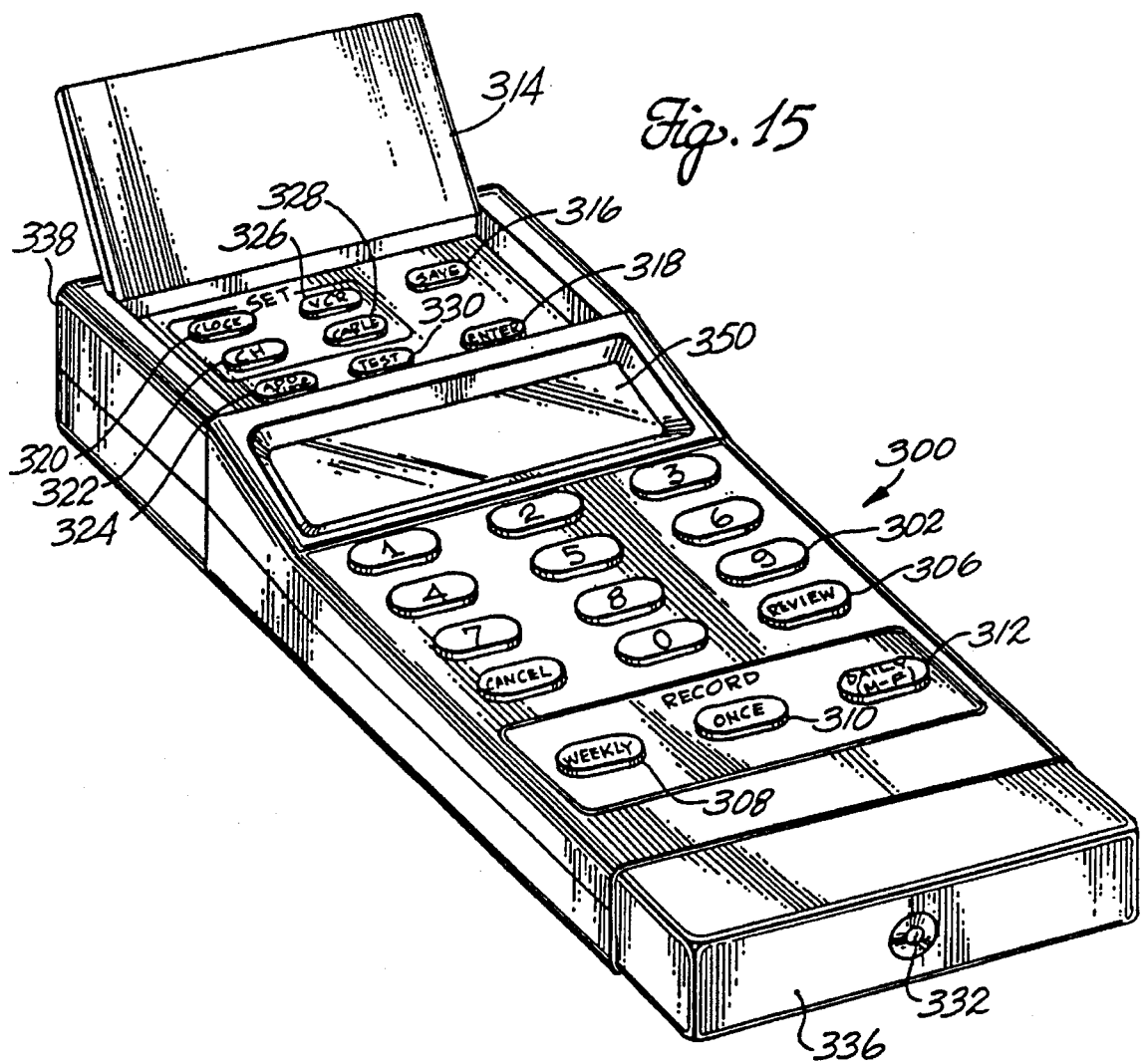
FIG. 15 is a perspective view of an apparatus for using compressed codes for recorder preprogramming according to a preferred embodiment of the invention.
Figure 16:
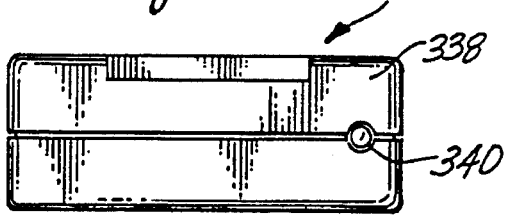
FIG. 16 is a front view of the apparatus of FIG. 15 showing a forward facing light emitting diode.
Figure 19:
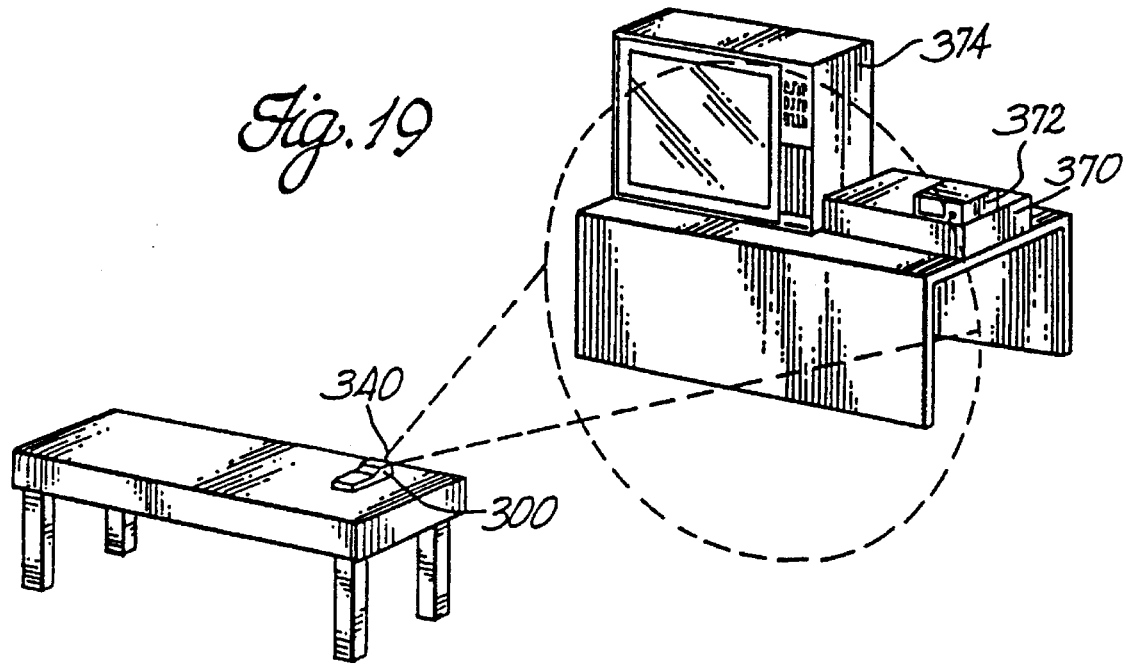
FIG. 19 is a perspective view showing a manner of placing the apparatus of FIG. 15 relative to a cable box and a VCR.

Another preferred embodiment of an apparatus for using compressed codes for recorder preprogramming is the instant programmer 300 of FIG. 15. The instant programmer 300 has number keys 302, which are numbered 0 through 9, a CANCEL key 304, a REVIEW key 306, a WEEKLY key 308, a ONCE key 310 and a DAILY (M–F) key 312, which are used to program the instant programmer 300. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. Other features of instant programmer 300 shown on FIG. 15 are: liquid crystal display 350 and red warning light emitting diode 332. The front elevation view FIG. 16 of instant programmer 300 shows front infrared (IR) diode 340 mounted on the front side 338. By placing instant programmer 300 in front of the equipment to be programmed such as video cassette recorder 370, cable box 372, and television 374, as shown in FIG. 19, the front infrared (IR) diode 340 can transmit signals to control program recording. An IR transparent cover 336 covers additional IR transmission diodes, which are explained below.

Figure 18:
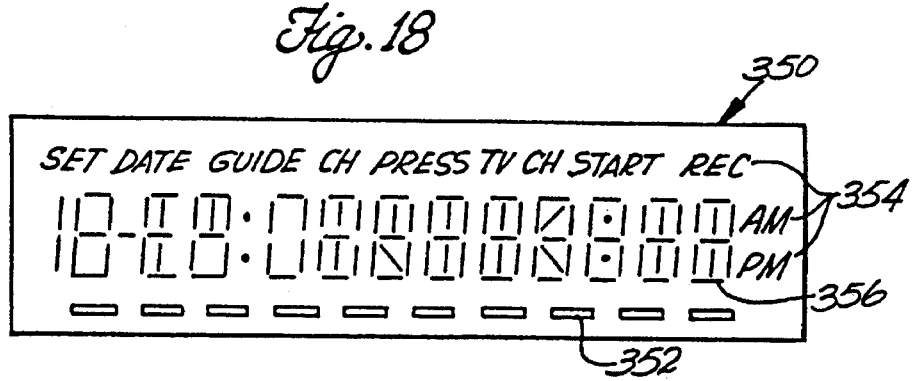
FIG. 18 is a detail of the LCD display of the apparatus of FIG. 15.

FIG. 18 shows a detail of the liquid crystal display 350. Certain text 354 is at various times visible on the display and there is an entry area 356. Time bars 352 are displayed at the bottom of the display and their function is described below.

Figure 17:
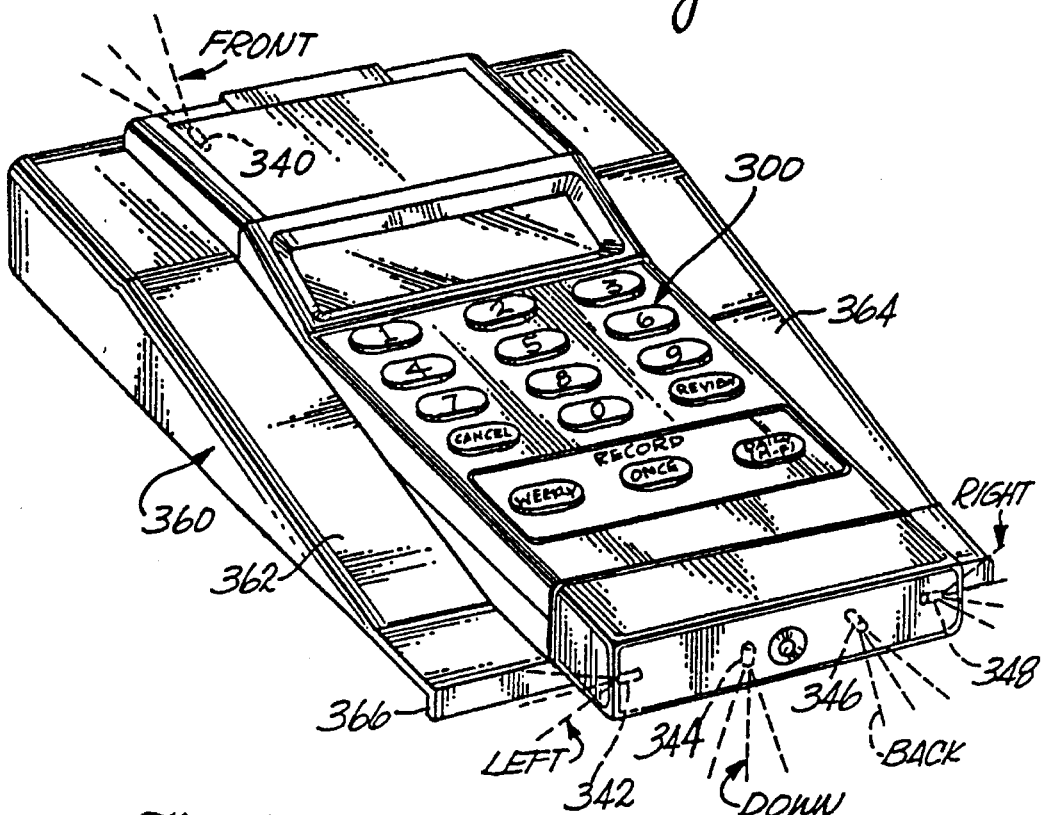
FIG. 17 is a perspective view of the apparatus of FIG. 15 placed in a mounting stand.
Figure 17A:
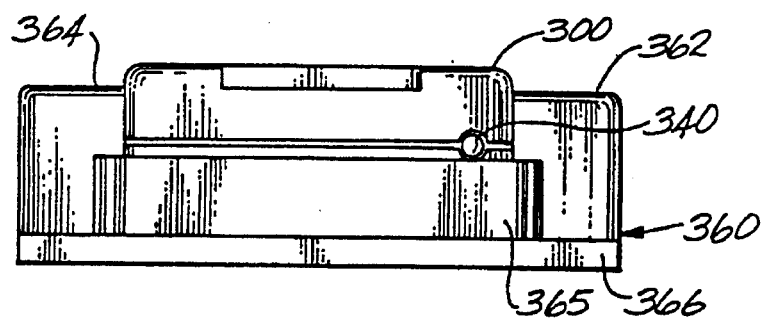
FIG. 17A is a front elevational view of the apparatus of FIG. 15 placed in the mounting stand as shown in FIG. 17.
Figure 20:
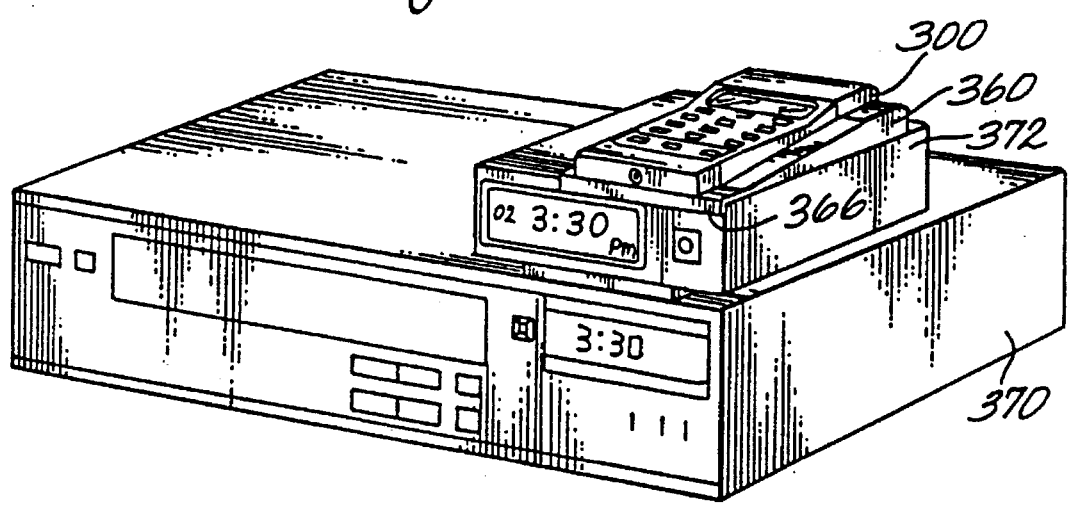
FIG. 20 is a perspective view showing a manner of placing the mounting stand with the apparatus of FIG. 15 mounted thereon near a cable box and VCR.

A companion element to the instant programmer 300 is the mounting stand 360, shown in FIG. 17, which is designed to hold instant programmer 300 between left raised side 362 and right raised side 364. The instant programmer 300 is slid between left raised side 362 and right raised side 364 until coming to a stop at front alignment flange 365, which is at the front of mounting stand 360 and connected across left raised side 362 and right raised side 364, as shown in FIG. 17A. Together elements 362, 364 and 365 provide alignment for instant programmer 300 so that IR transparent cover 336 and the IR diodes 342, 344, 346 and 348, shown in FIG. 17 are properly aligned for transmission, when the instant programmer is used as shown in FIG. 20. The mounting stand 360 has an alignment flange 366, which has the purpose of aligning the back edge of mounting stand 360, which is defined as the edge along which alignment flange 366 is located, along the front side of a cable box or VCR, or similar unit as shown in FIG. 20. When aligned as shown in FIG. 20, the mounting stand 360 aligns the instant programmer 300 so that the left IR diode 342, down IR diode 344, two back IR diodes 346 and right IR diode 348, as shown in FIG. 17, are in position to transmit signals to video cassette recorder 370 and cable box 372, as necessary. If the VCR and/or cable box functions are located within the television 374 itself, then the instant programmer 300 could be positioned to transmit to the television 374, either in the manner of FIG. 19 or by placing the mounting stand on top of the television in the manner of FIG. 20.

By using mounting stand 360, the user only need to align the mounting stand 360, and the instant programmer 300 once with the equipment to be programmed rather than having the user remember to keep the instant programmer 300 in the correct location to transmit via front infrared (IR) diode 340, as shown in FIG. 19. Current experience with various remote controllers shows that it is difficult at best to keep a remote controller in a fixed location, for example, on a coffee table. The mounting stand 360 solves this problem by locating the instant programmer 300 with the equipment to be controlled. The left IR diode 342, down IR diode 344, two back IR diodes 346 and right IR diode 348 are positioned to transmit to the left, downward, backward, and to the right. The downward transmitter assumes that mounting stand 360 will be placed on top of the unit to be programmed. The left and right transmission allows units to the left or right to be programmed. The backward transmission back IR diodes 346 are provided so that signals can bounce off walls and other objects in the room. The front IR diode 340, the left IR diode 342, the right IR diode 348 and the down IR diode 344 are implemented with 25 degree emitting angle diodes. Two back IR diodes are provided for greater energy in that direction and are implemented with 5 degree emitting angle diodes, which focus the energy and provide for greater reflection of the IR energy off of walls or objects in the room.

Most VCR's and cable boxes can be controlled by an infrared remote controller; however, different VCR's and cable boxes have different IR codes. Although there are literally hundreds of different models of VCR's and cable boxes, there are fortunately only tens of sets of IR codes. Each set may have a few tens of "words" that represent the different keys required, e.g. "power", "record", "channel up", "channel down", "stop", "0", "1", "2" etc. For the purpose of controlling the VCR and cable box to do recording, only the following "words" are required: "0", "1", "2", "3", "4", "5", "6", "7", "8", "9", "power", "record", "stop". The IR codes for these words for all the sets are stored in the memory of the instant programmer 300, which is located in microcomputer 380 of FIGS. 21 and 22. During setup of the instant programmer 300, the user interactively inputs to the instant programmer 300 the type and model of his VCR and cable box. The correct set of IR codes will be recalled from memory during the actual control process. In the case where the user only has a VCR, the infrared (IR) codes for that particular VCR will be recalled to control the VCR. In the case where the user has a VCR and a cable box, the IR codes "power", "record", "stop" will be recalled from the set that corresponds to the VCR whereas the IR codes for "0" through "9" will be recalled from the set that corresponds to the cable box. The reason is that in this case, the cable box controls the channel switching. Hence the channel switching signals "0" through "9" must be sent to the cable box instead of the VCR.

Initially, the user performs a setup sequence. First, the user looks up the number corresponding to the model/brand of VCR to be programmed in a table, which lists the VCR brand name and a two digit code. Then with the VCR tuned to Channel 3 or Channel 4, whichever is normally used, the user turns the VCR "OFF". Then the user presses the VCR key 326. When the display shows VCR, the user presses the two-digit code looked up in the VCR model/brand table (for example 01 for RCA). The user points the instant programmer 300 at the VCR and then presses ENTER key 318. The red warning light emitting diode 332 will flash while it is sending a test signal to the VCR. If the VCR turned "ON" and changed to Channel 09, the user presses the SAVE key 316 and proceeds to the set clock step. If the VCR did not turn "ON" or turned "ON" but did not change to Channel 09 the user presses ENTER key 318 again and waits until red warning light emitting diode 332 stops flashing. The instant programmer 300 sends the next possible VCR code, while the red warning light emitting diode 332 is flashing. If the VCR turns "ON" and changed to Channel 09 the user presses SAVE key 316, otherwise the user presses ENTER key 318 again until the VCR code is found that works for the VCR. The display shows "END" if all possible VCR codes for that brand are tried. If so, the user presses VCR key 326 code 00 and then ENTER key 318 to try all possible codes, for all brands, one at a time.

Once the proper VCR code has been found and saved, the next setup step is to set the clock on instant programmer 300. First, the user presses the CLOCK key 320. When the display shows: "YR:", the user presses the year (for example 90), then presses ENTER key 318. Then the display shows "MO:", and the user presses the month (for example 07 is July), and then presses ENTER key 318. This is repeated for "DA:" date (for example 01 for the 1st), "Hr:" hour (for example 02 for 2 o'clock), "Mn:" minute (for example 05 for 5 minutes), and "AM/PM:" 1 for AM or 2 for PM. After this sequence, the display will show "SAVE" for a few seconds and then the display will show the current time and date that have been entered. It is no longer necessary for the user to set the clock on his/her VCR.

Next, if the instant programmer 300 is also to be used as a cable box controller, then the setup steps are as follows. First, the number corresponding to the model/brand of cable box (converter) to be controlled is looked up in a cable box model brand table, that lists cable box brands and corresponding two digit codes. The VCR is tuned to Channel 03 or 04 and turned "OFF". Then the cable box is tuned to Channel 02 or 03, whichever is normal, and left "ON". Then the CABLE key 328 is pressed. When the display shows: "CA B-:" the user enters the two digit code looked up in cable box model brand table, points the instant programmer 300 at the cable box (converter) and presses ENTER key 318. The red warning light emitting diode 332 will flash while it is sending a test signal to the cable box. If the cable box changed to Channel 09: then the user presses SAVE key 316; however, if the cable box did not change to Channel 09 the user presses ENTER key 318 again and waits until red warning light emitting diode 332 stops flashing, while the next possible code is sent. This is repeated until the cable box changes to Channel 09 and when it does the user presses SAVE key 316. If the display shows "END" then the user has tried all possible cable box codes for that brand. If so, the user presses cable code 00 and then ENTER key 318 to try all possible brand's codes, one at a time.

For some people (probably because they have cable or satellite), the channels listed in their television guide or calendar are different from the channels on their television or cable. If they are different, the user proceeds as follows. First, the user presses the CH key 322. The display will look like this: "Guide CH TV CH". Then the user presses the channel printed in the television guide or calendar (for example, press 02 for channel 2), and then the user presses the channel number that the printed channel is received on through his/her local cable company. Then the user presses ENTER key 318. This is repeated for each channel listing that is on a different channel than the printed channel. When this procedure is finished the user presses SAVE key 316.

Typically the television guide or calendar in the area will have a chart indicating the channel number that has been assigned to each Cable and broadcast channel, for example: HBO, CNN, ABC, CBS, NBC, etc. This chart would correspond, for example, to the left two columns of FIG. 28. For example, suppose the television guide or calendar has assigned channel 14 to HBO but the user's cable company delivers HBO on channel 18. Since the channel numbers are different, the user needs to use the CH key 322. The user will press the CH button (the two blank spaces under the display "Guide CH" will flash). The user then presses 14. (now the two blank spaces under the display "TV CH" will flash). The user then presses 18 and then ENTER key 318. This is repeated for each channel that is different. When finished, the user presses SAVE key 316.

After the channel settings have been saved, the user may review the settings by pressing CH key 322 and then REVIEW key 306. By repeated pressing of the REVIEW key 306 each of the set channels will scroll onto the display, one at a time.

Then the user can test to make sure that the location of the instant programmer 300 is a good one. First, the user makes sure that the VCR is turned "OFF" but plugged in and makes sure that the cable box (if there is one) is left "ON". Then the user can press the TEST key 330. If there is only a VCR, then if the VCR turned "ON", changed to channel 09 and started recording, and then turned "OFF", then the VCR controller is located in a good place.

If there is also a cable box, then if the VCR turned "ON", the cable box turned to channel 09 and the VCR started recording, and then the VCR stopped and turned "OFF", then the instant programmer 300 is located in a good place.

To operate the instant programmer 300, the VCR should be left OFF and the cable box ON. The user looks up in the television guide the compressed code for the program, which he/she wishes to record. The compressed code 212 is listed in the television guide, as shown in FIG. 8. The television guide/calendar that would be used with this embodiment would have the same elements as shown on FIG. 8 except that element 188 of FIG. 8 is not required. The compressed code 212 for the program selected by the user is entered into the instant programmer 300 by using the number keys 302 and then the user selects how often to record the program. The user presses the ONCE key 310 to record the program once at the scheduled time, or the user presses the WEEKLY key 308 to record the program every week at the same scheduled time until cancelled or the user presses the DAILY (M–F) key 312 to record the program each day Monday through Friday at the same scheduled time until cancelled. This is most useful for programs such as soapbox operas that air daily, but not on the weekend. To confirm the entry, the instant programmer 300 will immediately decode the compressed code and display the date, channel and start time of the program entered by the user. The length of the entered program is also displayed by time bars 352 that run across the bottom of the display. Each bar represents one hour (or less) of program.

Then the user just needs to leave the instant programmer 300 near the VCR and cable box so that commands can be transmitted, and at the right time, the instant programmer 300 will turn "ON" the VCR, change to the correct channel and record the program and then turn the VCR "OFF". The user must just make sure to insert a blank tape.

The REVIEW key 306 allows the user to step through the entered programs. These are displayed in chronological order, by date and time. Each time the REVIEW key 306 is pressed, the next program is displayed, until "END" is displayed, when all the entered programs have been displayed. If the REVIEW key 306 is pressed again the display will return to the current date and time.

If the user wishes to cancel a program, then the user presses REVIEW key 306 until the program to cancel is displayed, then the user presses CANCEL key 304. The display will say "CANCELLED". Also, any time the user presses a wrong number, pressing the CANCEL key 304 will allow the user to start over.

Certain television programs, such as live sports, may run over the scheduled time slot. To ensure that the entire program is recorded, the user may press the ADD TIME key 324 to increase the recording length, even while the program is being recorded. The user presses the REVIEW key 306 to display the program, then presses ADD TIME key 324. Each time ADD TIME key 324 is pressed, 15 minutes is added to the recording length.

When the current time and date is displayed, the amount of blank tape needed for the next 24 hours is also displayed by the time bars 352 that run across the bottom of the display. Each bar represents one hour (or less) of tape. The user should check this before leaving the VCR unattended to ensure that there is enough blank tape.

Each time a program code is entered, the instant programmer 300 automatically checks through all the entries to ensure that there is no overlap in time between the program entries. If the user attempts to enter a program that overlaps in time with a program previously entered, then the message "CLASH" appears. Then, as summarized by step 432 of FIG. 23, the user has the following options: 1) if the user wishes to leave the program previously entered and forget about the new one, the user does nothing and after a short time delay, the display will return to show the current time and date; 2) if the user wishes the program which starts first to be recorded to its end, and then to record the remainder of the second program, then the user presses ONCE key 310, DAILY (M–F) key 312, or WEEKLY key 308 again (whichever one the user pushed to enter the code). If the programs have the same starting time, then the program most recently entered will be recorded first. If on being notified of the "CLASH", the user decides the new program is more important than the previously entered program, then the user can cancel the previously entered program and then re-enter the new one.

In some locations, such as in some parts of Colorado, the cable system airs some channels three (3) hours later/earlier than the times listed in the local television guide. This is due to time differences depending on whether the channel is received on a east or west satellite feed. For the user to record the program 3 hours later than the time listed in the television guide the procedure is as follows. First the user enters the code for the program and then presses SAVE key 316 (for +) and then presses ONCE key 310, DAILY (M–F) key 312, or WEEKLY key 308, as desired. For the user to record the program 3 hours earlier than the time listed in the television guide the procedure is as follows. First the user enters the code for the program and then presses ENTER key 318 (for −) and then presses ONCE key 310, DAILY (M–F) key 312, or WEEKLY key 308, as desired. The instant programmer 300 will display the time that the program will be recorded, not the time shown in the television guide.

There are certain display messages to make the instant programmer 300 more user friendly. The display "LO BATT" indicates that the batteries need replacement. "Err: ENTRY" indicates an invalid entry during setup. "Err: CODE" indicates that the program code number entered is not a valid number. If this is displayed the user should check the television guide and reenter the number. "Err: DATE" indicates the user may have: tried to select a daily recording (Monday to Friday) for a Saturday or Sunday program; tried to select weekly or daily recording for a show more than 7 days ahead, because the instant programmer 300 only allows the weekly or daily recording option to be used for the current weeks' programs (±7 days); or tried to enter a program that has already ended. "FULL" indicates that the stack storage of the programs to be recorded, which is implemented in random access memory (RAM) inside the instant programmer 300 has been filled. The user could then cancel one or more programs before entering new programs.

"EMPTY" indicates there are no programs entered to be recorded. The number of programs to be recorded that can be stored in the instant programmer 300 varies depending on the density of RAM available and can vary from 10 to more.

Figure 21:
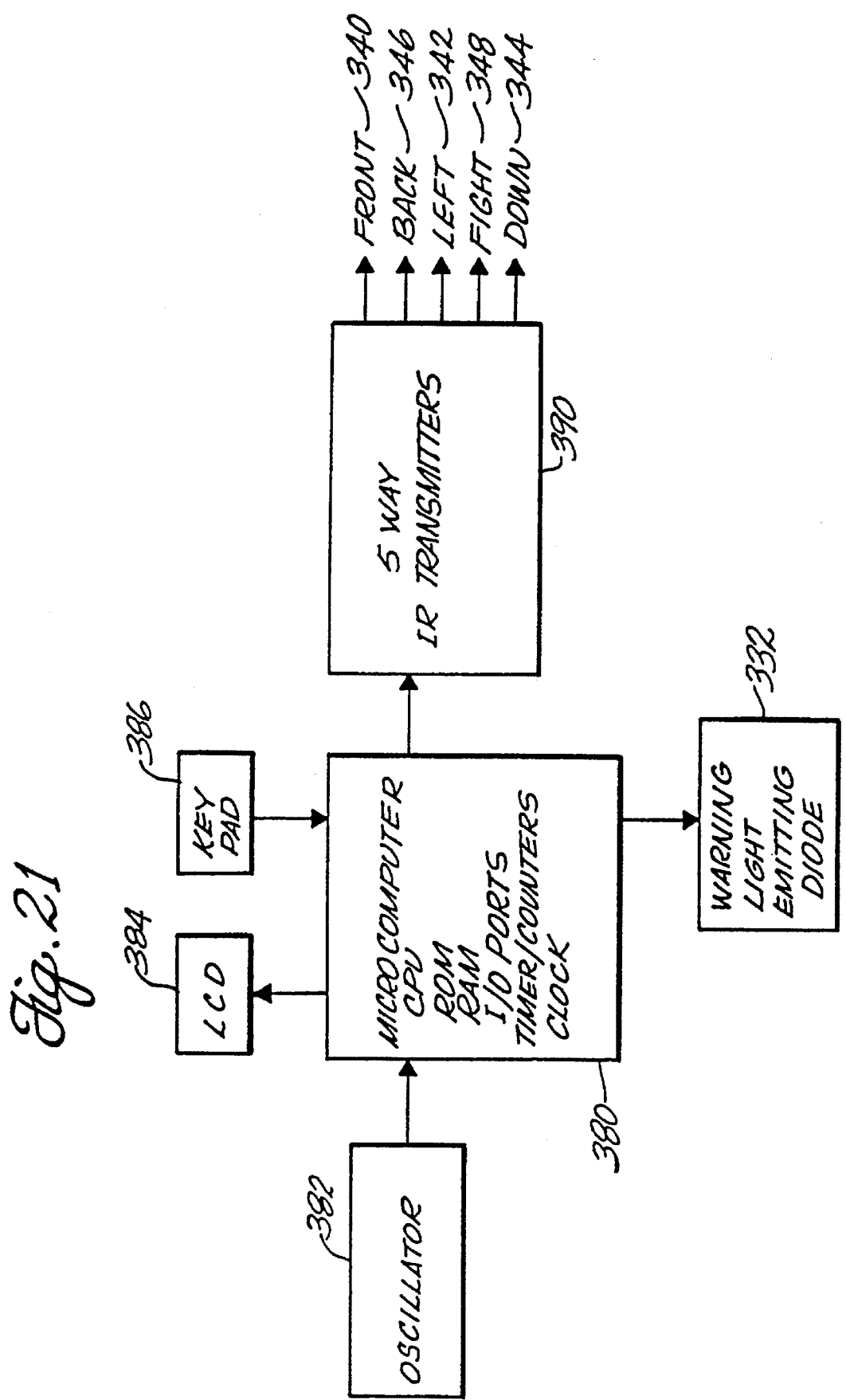
FIG. 21 is a schematic showing apparatus for using compressed codes for recorder preprogramming according to a preferred embodiment of the invention.
Figure 22:
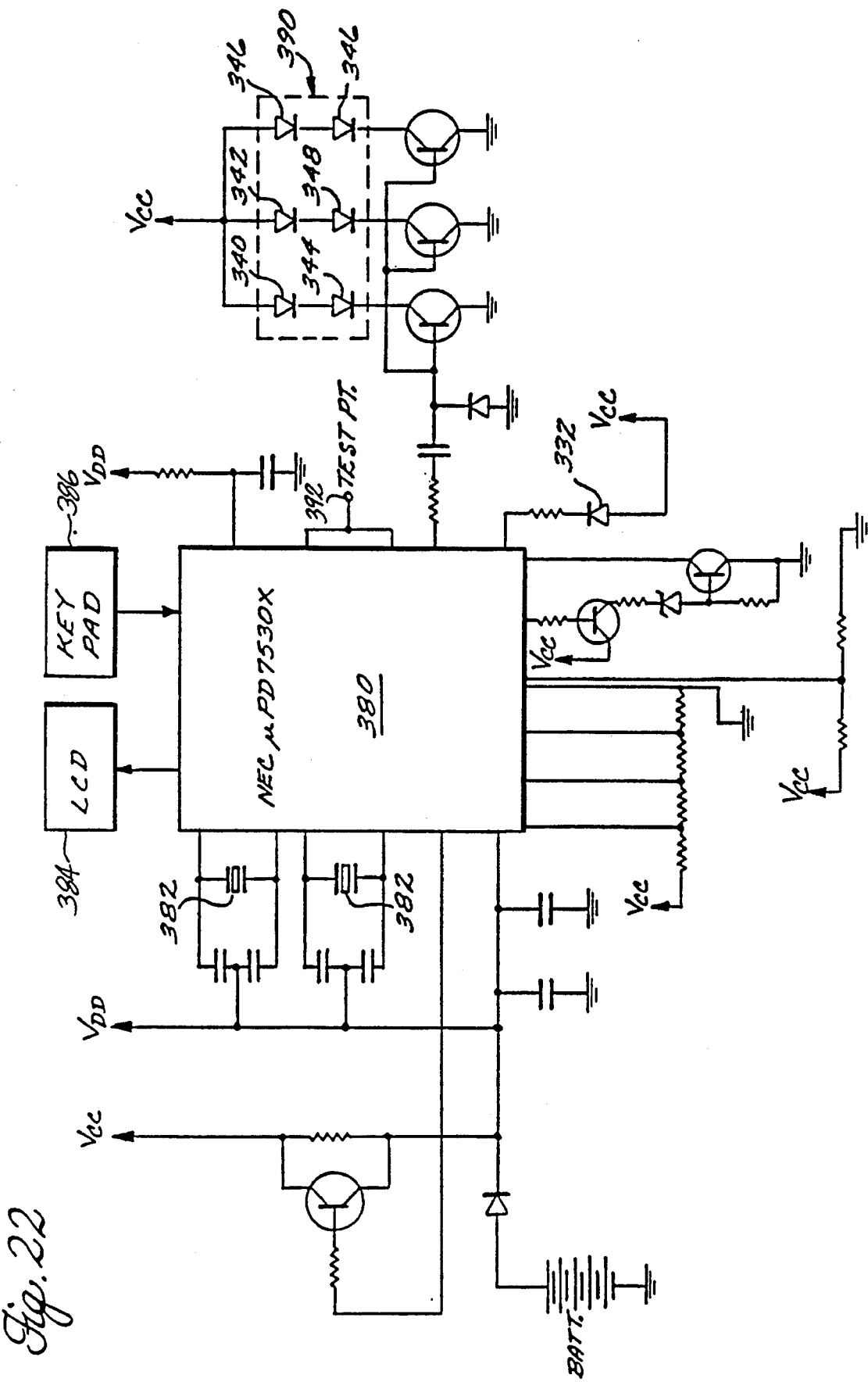
FIG. 22 is a detailed schematic showing a preferred embodiment of apparatus implementing the schematic of FIG. 21.

FIG. 21 is a schematic of the circuitry needed to implement the instant programmer 300. The circuity consists of microcomputer 380, oscillator 382, liquid crystal display 384, key pad 386, five way IR transmitters 390 and red warning light emitting diode 332. The microcomputer 380 consists of a CPU, ROM, RAM, I/O ports, timers, counters and clock. The ROM is used for program storage and the RAM is used among other purposes for stack storage of the programs to be recorded. The liquid crystal display 384 is display 350 of FIGS. 15 and 18. The key pad 386 implements all the previously discussed keys. The five way IR transmitters 390 consists of front infrared (IR) diode 340, left IR diode 342, down IR diode 344, two back IR diodes 346 and right IR diode 348. FIG. 22 shows the detailed schematic of the instant programmer 300 circuitry and previously identified elements are identified by the same numbers. The microcomputer can be implemented with a NEC μPD7530x part, which can interface directly with the display, the keypad, the light emitting diodes and the oscillator. The 25 degree IR diodes can be implemented with NEC 313AC parts and the 5 degree IR diodes can be implement with Litton 2871C IR diodes.

Figure 23:
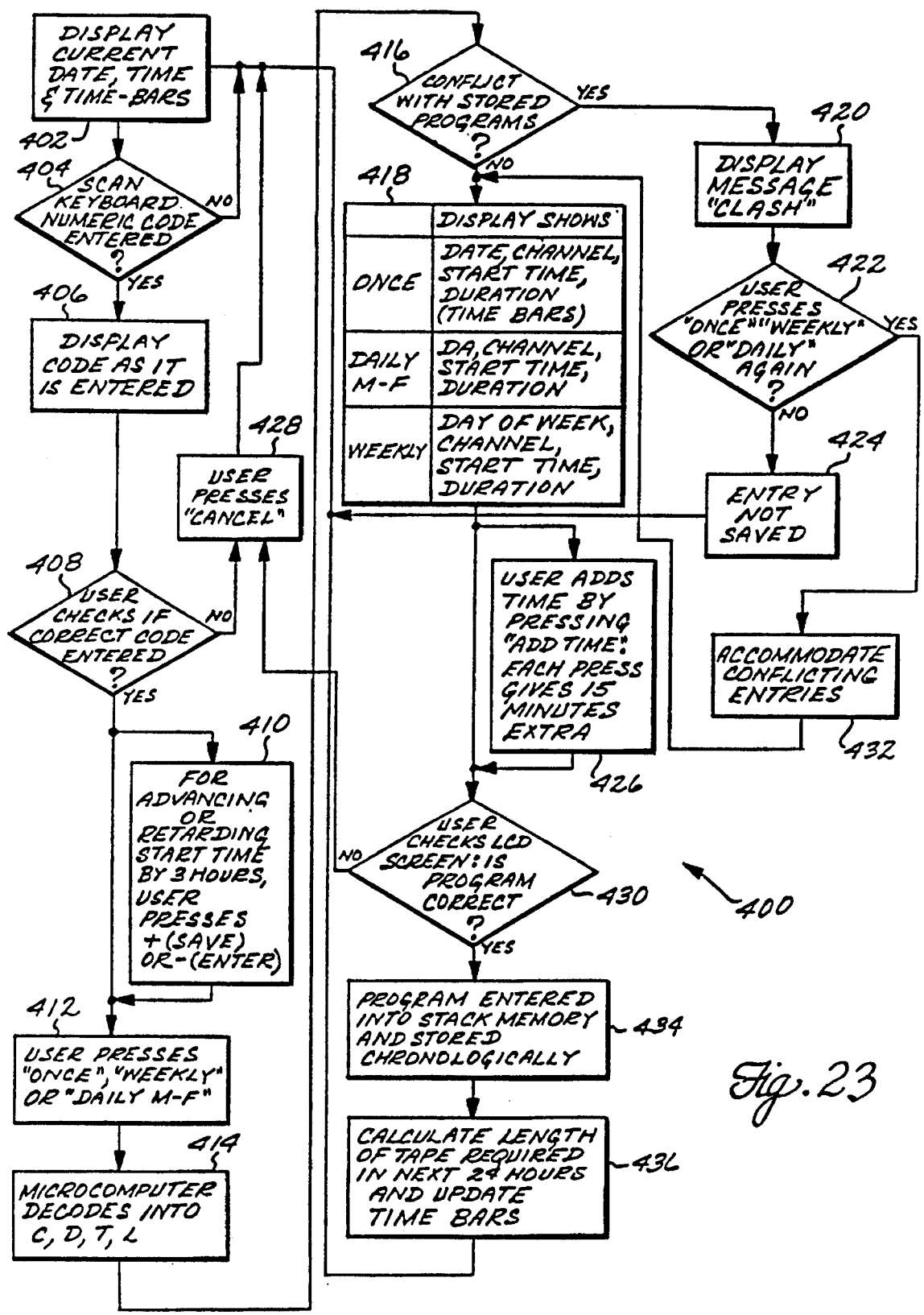
FIG. 23 is a flow graph for program entry into the apparatus of FIG. 15.
Figure 24:
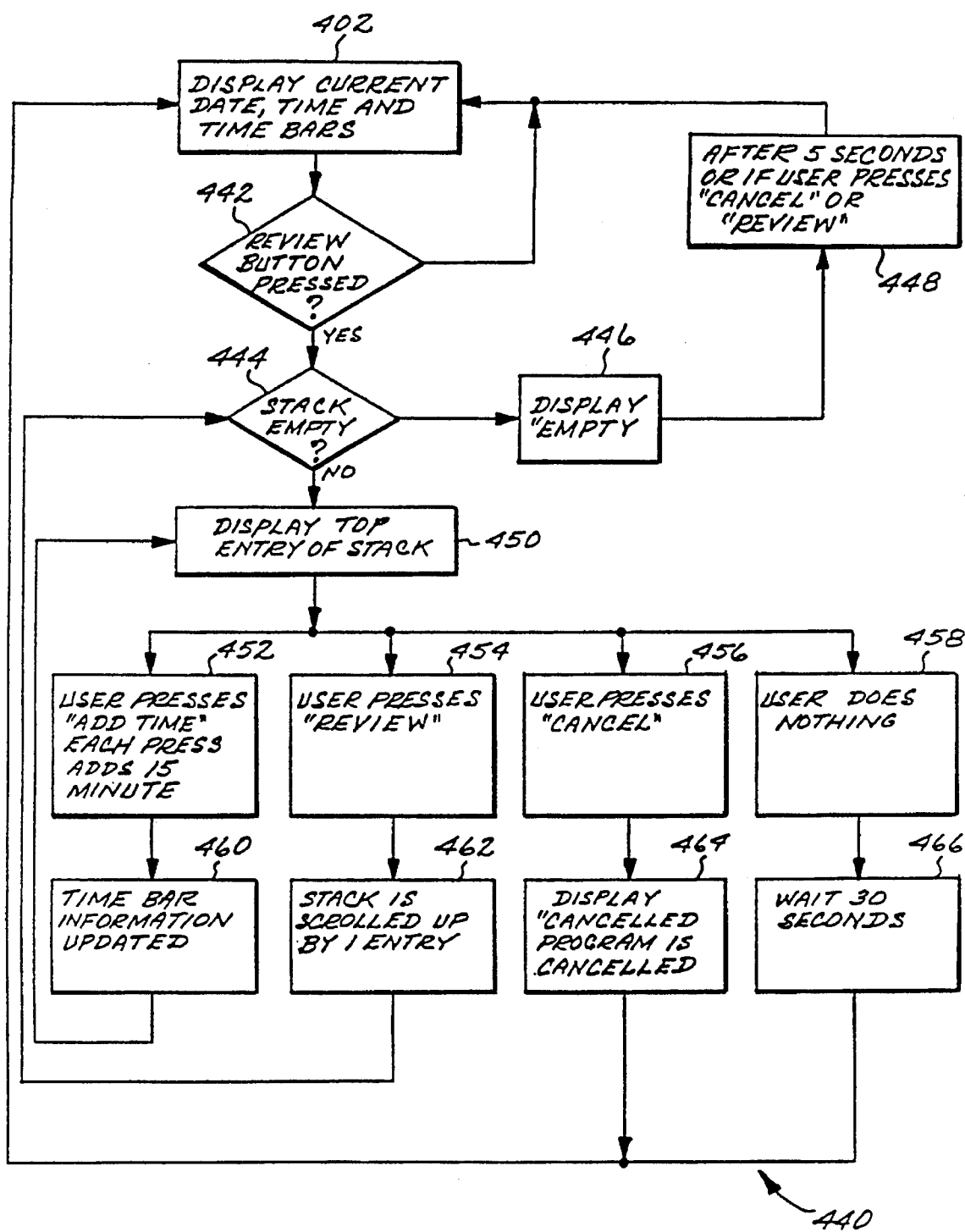
FIG. 24 is a flow graph for review and program cancellation of programs entered into the apparatus of FIG. 15.
Figure 25:
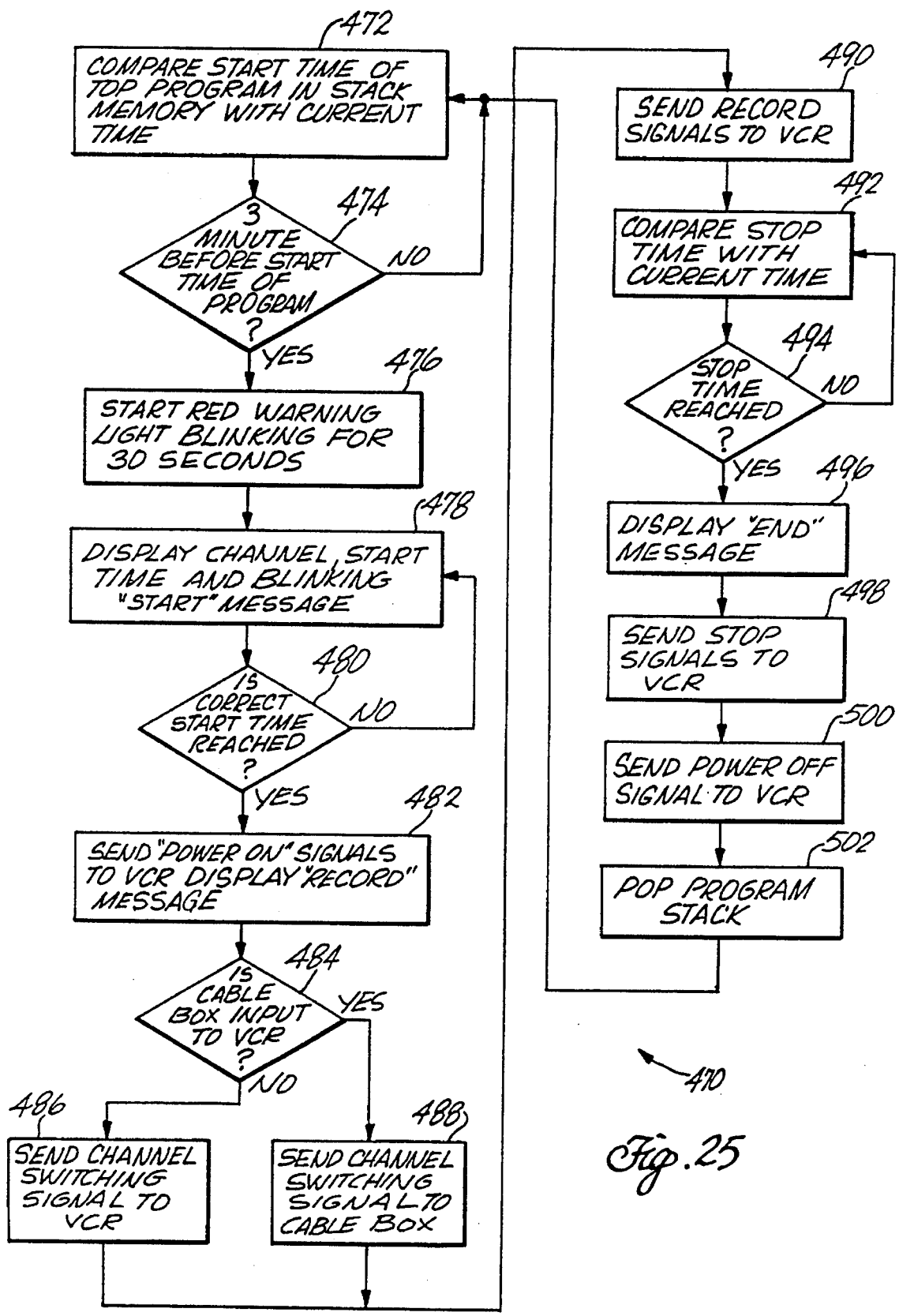
FIG. 25 is a flow graph for executing recorder preprogramming using compressed codes according to a preferred embodiment of the invention.

The flow charts for the program that is stored in the read only memory (ROM) of the microcomputer 380 that executes program entry, review and program cancellation, and record execution are illustrated in FIGS. 23, 24, and 25, respectively. The FIG. 23 for program entry, which process was described above, consists of the following steps: display current date, time and time bars step 402, which is the quiescent state of instant programmer 300; scan keyboard to determine if numeric decimal compressed code entered step 404; display code as it is entered step 406; user checks if correct code entered step 408 and user presses CANCEL key 304 step 428; user advances or retards start time by three hours by pressing SAVE key 316 or ENTER key 318 step 410; user presses ONCE key 310, WEEKLY key 308 or DAILY key 312 key step 412; microcomputer decodes compressed code into CDTL step 414; test if conflict with stored programs step 416, if so, display "CLASH" message step 420, user presses ONCE key 310, WEEKLY key 308 or DAILY key 312 step 422, then accommodate conflicting entries step 432, as described above in the discussion of the "CLASH" options, and entry not saved step 424; set display as date, channel, start time and duration (time bars) for ONCE, or DA, channel, start time and duration for DAILY, or day of week, channel, start time and duration for WEEKLY step 418; user presses ADD TIME key 324, which adds 15 minutes to record time step 426; user checks display step 430; enter program on stack in chronological order step 434 wherein the stack is a portion of the RAM of microcontroller 380; and calculate length of tape required and update time bars step 436.

The FIG. 24 flowchart for review and cancellation, which process was described above, consists of the following steps: display current date, time and time bars step 402; REVIEW key 306 pressed step 442; test if stack empty step 444, display "EMPTY" step 446, and return to current date and time display step 448; display top stack entry step 450; user presses ADD TIME key 324 step 452 and update time bars step 460; user presses REVIEW key 306 step 454 and scroll stack up one entry step 462; user presses CANCEL key 304 step 456 and display "CANCELLED" and cancel program step 464; and user does nothing step 458 and wait 30 seconds step 466, wherein the 30 second timeout can be implemented in the timers of microcomputer 380.

The FIG. 25 flowchart for record execution, which is the process of automatically recording a program and which was described above, consists of the following steps: compare start time of top program in stack memory with current time step 472; test if three minutes before start time of program step 474; start red warning LED 332 blinking for 30 seconds step 476; display channel, start time and blinking "START" message step 478, is correct start time reached step 480 and send power ON signal to VCR and display "REC" message step 482; test if a cable box is input to VCR step 484, send channel switching signals to VCR step 486 and send channel switching signals to cable box step 488; send record signals to VCR step 490; compare stop time with current time step 492, test if stop time reached step 494 and display "END" message step 496; send stop signals to VCR step 498; send power OFF signal to VCR step 500; and pop program stack step 502.

Figure 26:
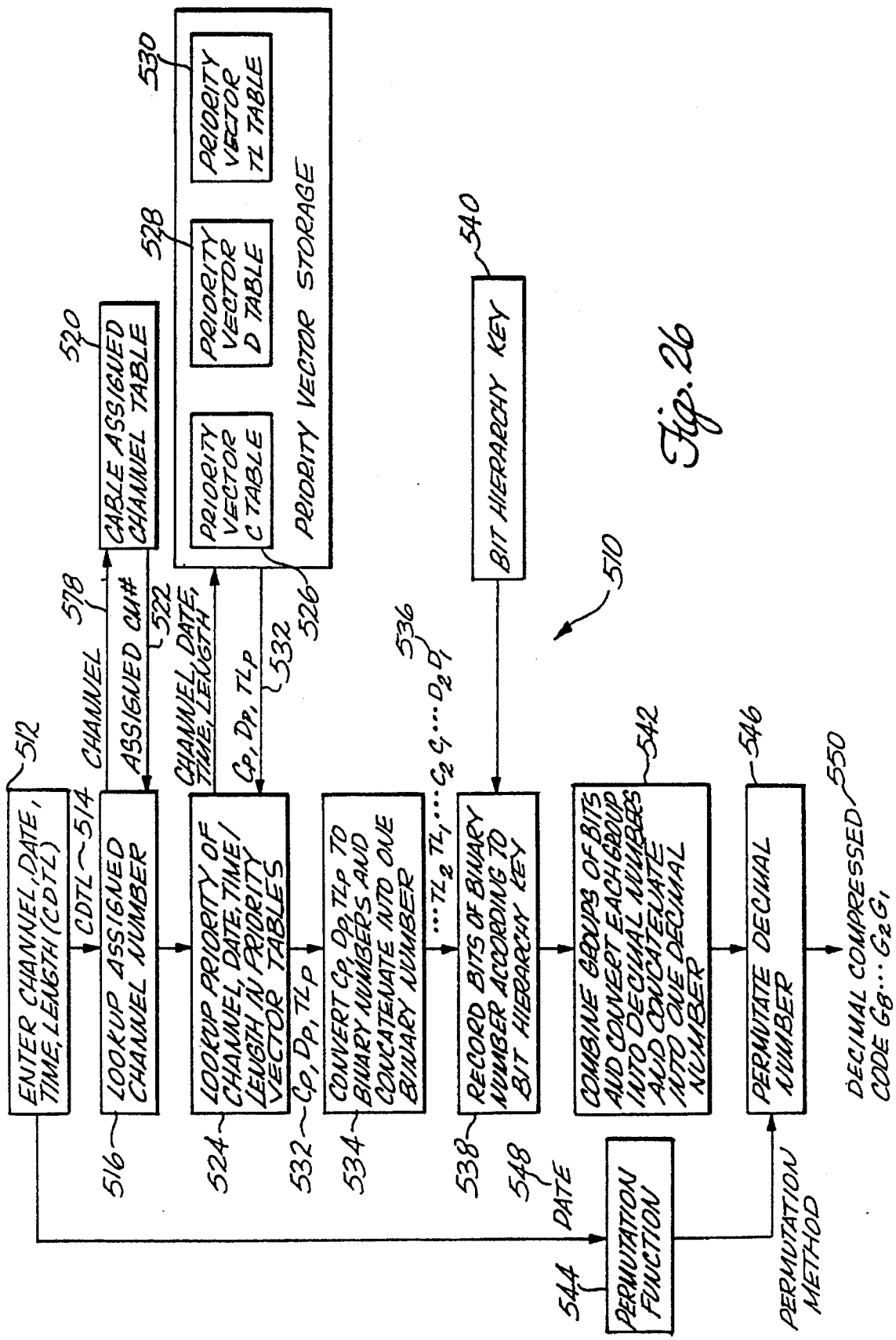
FIG. 26 is a flow graph for encoding program channel, date, time and length information into decimal compressed codes.

FIG. 26 is a flowchart of the method for encoding channel, date, time and length (CDTL) into decimal compressed code 510. This process is done "off-line" and can be implemented on a general purpose computer and is done to obtain the compressed codes 212 that are included in the program guide or calendar of FIG. 8. The first step in the encoding method is the enter channel, date, time and length (CDTL) step 512 wherein for a particular program the channel, date, start time and length CDTL 514 of the program are entered. The next step is the look up assigned channel number step 516, which substitutes an assigned channel number 522 for each channel 518. Often, for example for network broadcast channels, such as channel 2, the assigned channel number is the same; however, for a cable channel such as HBO a channel number is assigned and is looked up in a cable assigned channel table 520, which would essentially be the same as the first two columns of the table of FIG. 28. Next, the look up priority of channel, date and time/length in priority vector tables step 524 performs a look up in priority vector channel (C) table 526, priority vector date (D) table 528 and priority vector time/length (TL) table 530 using the indices of channel, date and time/length, respectively, to produce the vector $C_p$, $D_p$, $TL_p$ 532. The use of a combined time/length (TL) table to set priorities recognizes that there is a direct relationship between these combinations and the popularity of a program. For example, at 6:30 PM, a short program is more likely to be popular than a 2 hour program, because it may be the dinner hour.

The channel priority table is ordered so that the most frequently used channels have a low priority number. An example of the data that is in the priority vector C table 526 follows.

| channel | 4 | 7 | 2 | 3 | 5 | 6 | 11 | 13 | ... |
|---------|---|---|---|---|---|---|----|----|-----|
| priority | 0 | 1 | 2 | 3 | 4 | 5 | 6 | 7 | ... |

Generally the dates of a month all have an equal priority or equal usage, so the low number days in a month and the low number priorities would correspond in the priority vector D table 528 as in the following example.

| date | 1 | 2 | 3 | 4 | 5 | 6 | 7 | 8 | ... |
|------|---|---|---|---|---|---|---|---|-----|
| priority | 0 | 1 | 2 | 3 | 4 | 5 | 6 | 7 | ... |

The priority of the start times and length of the programs could be arranged in a matrix that would assign a priority to each combination of start times and program lengths so that more popular combinations of start time and length would have a low priority number and less popular combinations would have a high priority number. For example, a partial priority vector T/L table 530 might appear as follows.

| | Priority TL Table | | | |
|---|---|---|---|---|
| | TIME | | | |
| Length (hrs) | 6:30 pm | 7:00 pm | 7:30 pm | 8:00 pm ... |
| .5 | 8 | 4 | 7 | 10 |
| 1.0 | 12 | 15 | 13 | 18 |
| 1.5 | 20 | 19 | 17 | 30 |

Suppose the channel, date, time and length (CDTL) 514 data is channel 5, Feb. 10, 1990, 7:00 PM and 1.5 hours in length, then the $C_p, D_p, TL_p$ data 532 for the above example would be 4 9 19. The next step is the convert $C_p$, $D_p$, $TL_p$ to binary numbers and concatenate them into one binary number step 534, resulting in the data word ... $TL_2TL_1$ .. . $C_2C_1$ ... $D_2D_1$ 536. For the example given above, converting the ... $TL_2TL_1$ ... $C_2C_1$ ... $D_2D_1$ 536 word to binary would yield the three binary numbers: ... 0010011, ... 0100, ... 01001. The number of binary bits to use in each conversion is determined by the number of combinations involved. This could vary depending on the implementation; however one preferred embodiment would use eight bits for $C_p$, denoted as $C_8\ C_7\ C_6\ C_5\ C_4\ C_3\ C_2\ C_1$, which would provide for 256 channels, five bits for $D_p$, which can be denoted as $D_5\ D_4\ D_3\ D_2\ D_1$, would provide for 31 days in a month, and fourteen bits for $TL_p$, denoted as $TL_{14} ... TL_3\ TL_2\ TL_1$, which would provide for start times spaced every 5 minutes over 24 hours and program lengths in increments of 5 minute lengths for programs up to 3 hours in length and program length in increments of 15 minute lengths for programs from 3 to 8 hours in length. This requires about 288*(36+20)=16,128 combinations, which are provided by the 2**14=16,384 binary combinations. Altogether there are 8+5+14=27 bits of information $TL_{14}$ ... $TL_2TL_1C_8$ ... $C_2C_1D_5$ ... $D_2D_1$. For the above example padding each number with zeros and then concatenating them would yield the 27 bit binary number: 000000000100110000010001001.

The next step is to use bit hierarchy key 540, which can be stored in read only memory 64 to perform the reorder bits of binary number according to bit hierarchy key step 538. As described previously, a bit hierarchy key 540 can be any ordering of the ... $TL_2TL_1$ ... $C_2C_1$ ... $D_2D_1$ 536 bits and in general will be selected so that programs most likely to be the subject of timer preprogramming would have a low value compressed code 212, which would minimize keystrokes. The ordering of the bit hierarchy key can be determined by the differential probabilities of the various bit combinations as previously discussed. The details of deriving a bit hierarchy key 540 were described relative to bit hierarchy key 120 and the same method can be used for bit hierarchy key 540. For example, the bit hierarchy key might be:

| $TL_8$ | $C_3$ | ... | $TL_{10}$ | $C_2$ | $TL_1$ | $C_1$ | $L_1$ | $D_5$ | $D_4$ | $D_3$ | $D_2$ | $D_1$ |
|---|---|---|---|---|---|---|---|---|---|---|---|---|
| 27 | 26 | ... | 10 | 9 | 8 | 7 | 6 | 5 | 4 | 3 | 2 | 1 |

The next step is the combine groups of bits and convert each group into decimal numbers and concatenate into one decimal number step 542. For example, after reordering according to the bit hierarchy key, the code may be 000000001010010000010001001, which could be grouped as 00000000101001000,0010001001. If these groups of binary bits are converted to decimal as 328,137 and concatenated into one decimal number, then the resulting decimal number is 328137. The last encoding step is the permute decimal number step 546, which permutes the decimal number according to permutation function 544 that is dependent on the date 548 and in particular the month and year and provides a security feature for the codes. After the permute decimal number step 546, the decimal compressed code $G_8$ ... $G_2G_1$ 550 may, for example, be 238731. These encoded codes are then included in a program guide or calendar as in the compressed code indication 212 of FIG. 8.

Figure 27:
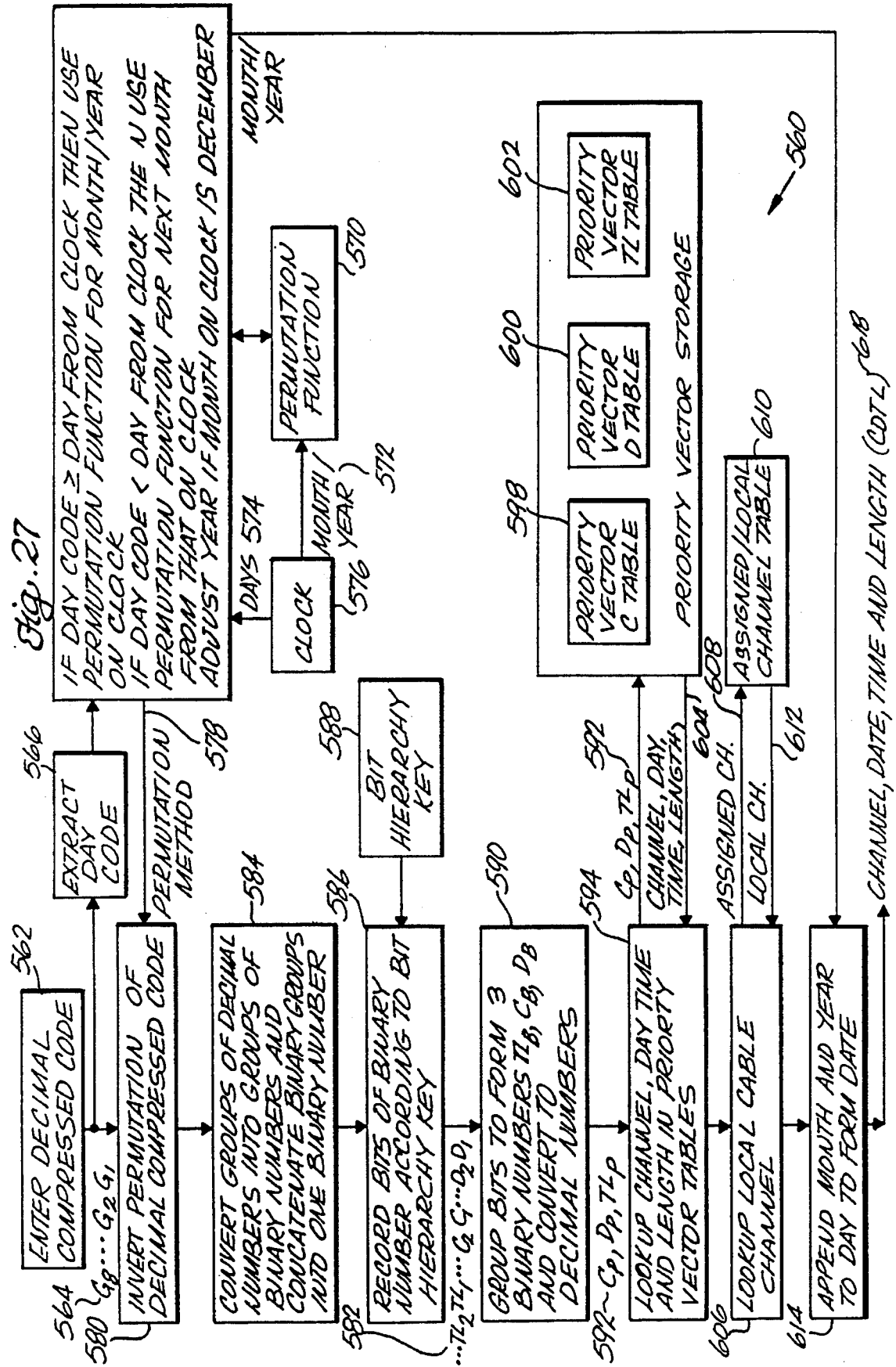
FIG. 27 is a flow graph for decoding decimal compressed codes into program channel, date, time and length information.

FIG. 27 is a flowchart of the method for decoding a decimal compressed code into channel, date, time and length 560, which is step 414 of FIG. 23. Once the decimal compressed code $G_8$ ... $G_2G_1$ 564 is entered in step 562, it is necessary to invert the permutation function of steps 544 and 546 of FIG. 26. The first step is the extract day code step 566, which extracts the day code for the program in the decimal compressed code and passes the day code to step 568, which also receives the current day 574 from the clock 576, which is implemented by microcomputer 380 in FIGS. 21 and 22. The clock 576 also sends the current month and year to the permutation function 570, which is dependent on the month and year. Then step 568 performs the function: if day code is same or greater than current day from clock, then use permutation function for month/year on clock, otherwise use permutation function for next month after the month on the clock and use next year if the month on the clock is December. In other words, since there is provision for preprogramming recording for one month or 31 days ahead, if the day for the program is equal to or greater than the current day of the month, then it refers to a day in the present month; otherwise, if the day for the program is less than the current day of the month, it must refer to a program in the next month. The extract day code step 566, which must be performed before the invert permutation of decimal compressed code step 580, is accomplished by a prior knowledge of how the permute decimal number step 546 of FIG. 26 is performed relative to the day code information.

The selected permutation method 578 is used in the invert permutation of decimal compressed code step 580. For the example given above, the output of step 580 would be: 328137. The next step is the convert groups of decimal numbers into groups of binary numbers and concatenate binary groups into one binary number step 584, which is the inverse of step 542 of FIG. 26 and for the above example would result in the binary code: 000000001010010000010001001. Then the bit hierarchy key 588 is used in the reorder bits of binary number according to bit hierarchy key step 586, which inverts step 538 of FIG. 26 to obtain 000000000100110000010001001 for the above example, which is ... $TL_2TL_1$ ... $C_2C_1$ ... $D_2D_1$ 582 corresponding to 536 of FIG. 26. The next step is to group bits to form three binary numbers $TL_b$, $C_b$, $D_b$ and convert to decimal numbers step 590 resulting in $C_p$, $D_p$, $TL_p$ 592, which for the example above would be: 4, 9, 19, and which are priority vectors for channel, day and time/length, which in turn are used to look up channel, day, time and length 604 in priority vector channel (C) table 598, priority vector date (D) table 600, and priority vector time/length (TL) table 602, respectively.

The look up local channel number step 606 looks up the local channel 612 given the assigned channel number 608, in the assigned/local channel table 610, which is setup by the user via the CH key 322, as explained above. An example of the assigned/local channel table 610 is the right two columns of the assigned/local channel table 620 of FIG. 28. The correspondence between the assigned channel numbers, such as 624 and 628, and the local channel numbers, such as 626 and 630 is established during setup by the user. For the example, FIG. 28 shows an exact correspondence between the assigned channel number 5 and the local channel number 5. The last step is the append month and year to day to form date step 614. The correct month and year are obtained from step 568 and are again dependent on whether the day code is equal to or greater than the day from the clock or less than the day from the clock. If the day code is equal to or greater than the day from the clock, the month and year as shown on the clock are used, otherwise the next month is used and the next year is used if the clock month is December. The result is the channel, date, time and length (CDTL) 618, which for the above example would be channel 5, Feb. 10, 1990, 7:00 PM and 1.5 hours in length.

Figure 29:
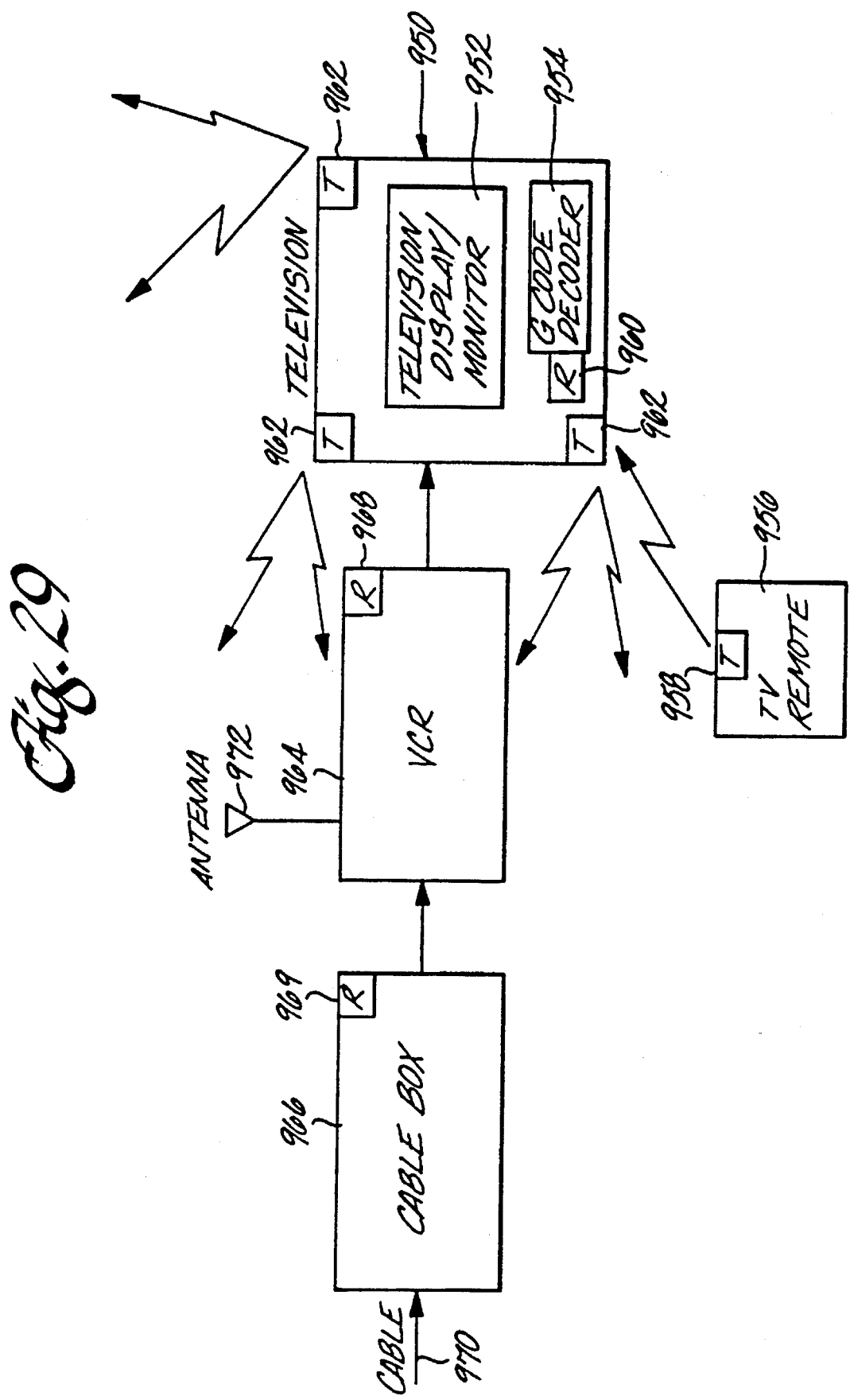
FIG. 29 block diagram of a system including a television having a G-code decoder.

Another preferred embodiment is to embed the decoding means into a television receiver with G-code decoder 950, as shown in FIG. 29, which is a block diagram of a system including a television receiver having a G-code decoder. The user would use the television remote controller 956 or controls on the television receiver to enter the code that signifies the program to be recorded. The same television remote and controls on the television would also be used to perform normal television control functions, such as channel selection. When a G-code is entered, the television remote would send the G-code to the television with G-code decoder 950 via infrared transmitter 958. An infrared receiver 960 on the television receiver 950 would receive the transmission and send the code to the G-code decoder 954, which would decode the code into CDTL and use this information along with a clock, which would also be embedded in the television receiver 950, to send the proper commands to the VCR 964 and cable box 966 at the appropriate time so that the selected program will be recorded at the proper time. The transmission from the television 950 would be via infrared transmitters 962, which can be placed at strategic points on the television cabinet, such as at the corners. The transmission is then received by the VCR 964 via infrared receiver 968 and the cable box 966 via infrared receiver 969.

Figure 30:
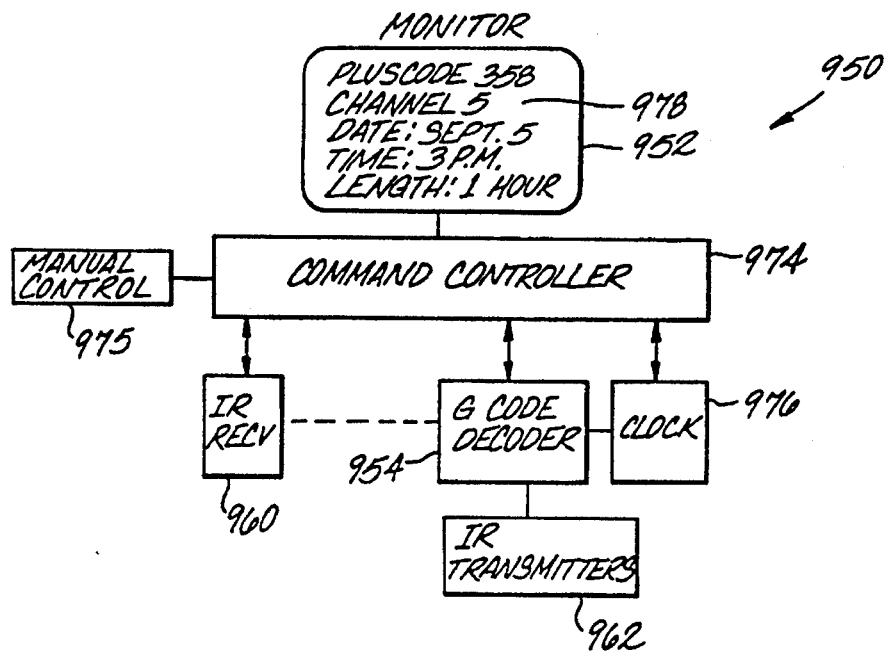
FIG. 30 is a schematic of a television having a G-code decoder.

FIG. 30 is a schematic of a television receiver having a G-code decoder. The television receiver with G-code decoder 950 would receive signals from the television remote controller 956 via infrared receiver 960, which would send the signals to either command controller 974 or directly to G-code decoder 954. The command controller 974 may be present in the television receiver to control other items in the television, including "on screen" functions such as displaying the channel number when the channel is changed. The G-code decoder 954 would decode a sent G-code and using the date and time from clock 976 would send the proper commands to the VCR 964 and cable box 966 via infrared transmitters 962. The G-codes and other commands could also be sent to the command controller via manual control 975. When the G-code is decoded, then the G-code and the decoded CDTL information could be displayed "on screen" as shown in on screen display 978 on television display/monitor 952. The "on screen" display is not necessary and any format is optional.

Figure 31:
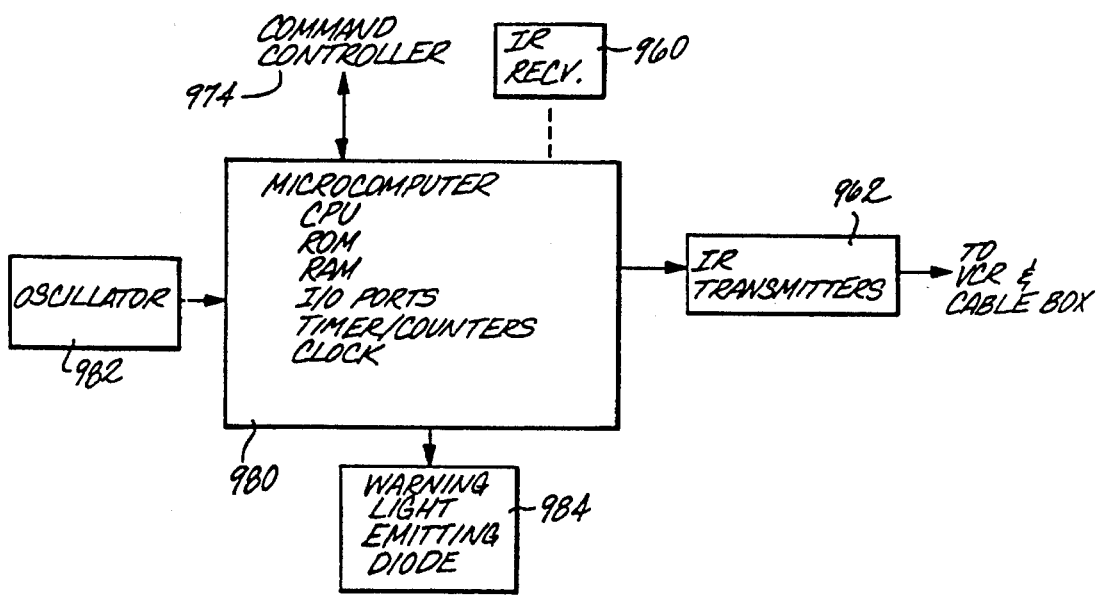
FIG. 31 is a schematic showing apparatus for a G-code decoder in a television having G-code decoding.

FIG. 31 is a schematic showing apparatus for a G-code decoder in a television receiver having G-code decoding. The circuitry is very similar to that described in FIGS. 21 and 22; however, there are interfaces to an infrared receiver 960 and command controller 974 rather than LCD 384 and Key Pad 386. The key elements are microcontroller 980 and oscillator 982. The interface to command controller 974 is one preferred embodiment; another embodiment could have direct interfaces between the manual control 975, the infrared receiver 960, the television display/monitor 952 and the G-code decoder 954 without going through the intermediary command controller 974. The television circuitry would include the capability of storing or learning the infrared code protocols for the VCR and the cable box. The warning light emitting diode 984 would be mounted on the cabinet of the television to warn that recording was about to begin in order to alert the user to have the VCR ready with tape to record.

With the "on screen" display on television display/monitor 952, the operation of the television receiver with G-code decoder 950 can be essentially identical to that described in FIGS. 23, 24 and 25 for program entry, program review and program cancellation, and execution of recorder preprogramming using compressed codes, respectively. Everything that was displayed on LCD 384 would instead be displayed on the television monitor 952. The only difference would be that "on screen" would only perform step 402 (display current date, time and time bars) when the user put television remote controller 956 into a mode for G-code entry and transmission, program review or program cancellation. The method of encoding program channel, date, time and length information into decimal compressed codes of FIG. 26, the method of decoding decimal compressed codes into program channel, date, time and length information of FIG. 27, and the method of assigning channel numbers to local channel numbers as illustrated in FIG. 28 would stay the same.

Another preferred embodiment of the invention is to embed the decoding means into various equipments associated with television, such as a video cassette recorder, cable box or satellite receiver. In any system the decoding means would only have to be present in one of the equipments, such as the cable box, which would then at the appropriate time distribute the proper commands to the other equipments such as a VCR and a satellite receiver to record the desired program.

Figure 32:
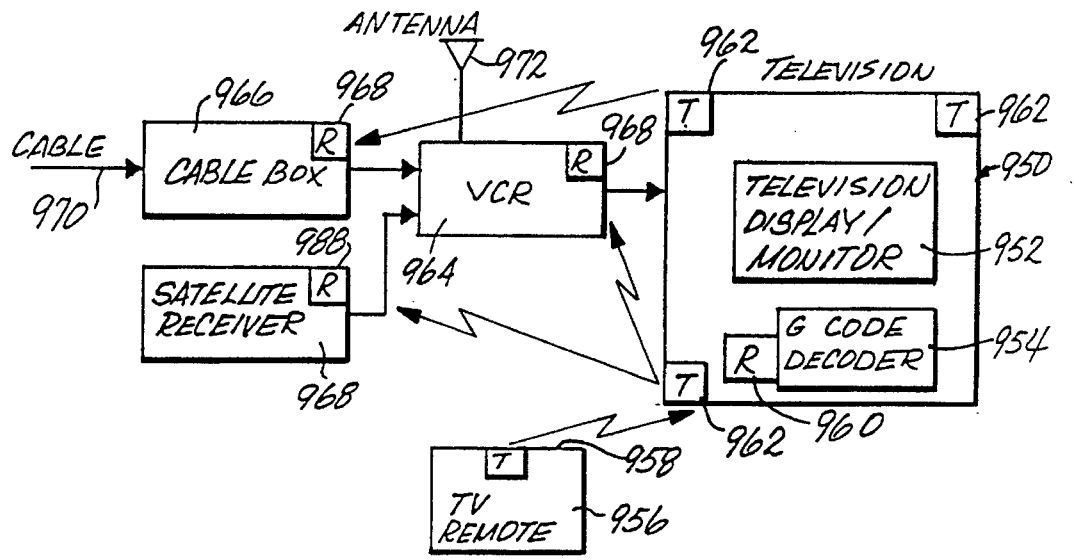
FIG. 32 is a block diagram of a system including a television having a G-code decoder, a VCR, a cable box and a satellite receiver.

FIG. 32 is a block diagram of a system including a television having a G-code decoder 950, a VCR 964, a cable box 966 and a satellite receiver 986. This system would work identically to the system shown in FIG. 29, except that a satellite receiver is included, which could receive commands via infrared receiver 988 from infrared transmitters 962 mounted on television receiver with G-code decoder 950. The commands received by the satellite receiver could include on/off commands and channel select commands. The satellite receiver 986 could feed a television signal to VCR 964, which would record the program and/or relay it to television display/monitor 952.

Figure 33:
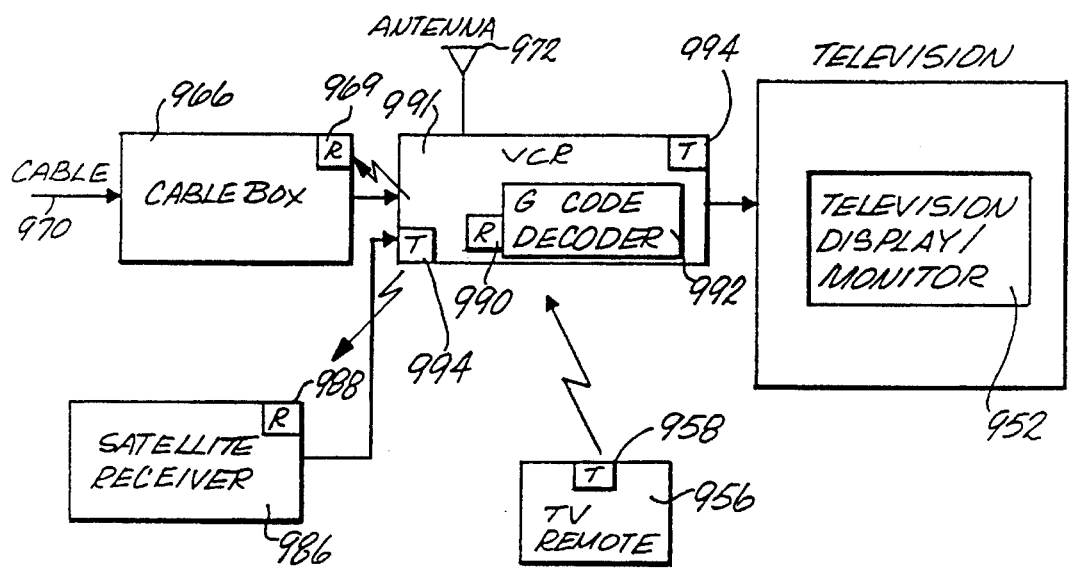
FIG. 33 is a block diagram of a system including a VCR having a G-code decoder, a television, a cable box and a satellite receiver.

FIG. 33 is a block diagram of a system including a VCR having a G-code decoder 991, a television 952, a cable box 966 and a satellite receiver 986. The user would use the television remote controller 956 or controls on the VCR 991 to enter the code that signifies the program to be recorded. When a G-code is entered, the television remote would send the G-code to VCR 991 with G-code decoder 992 via infrared transmitter 958. An infrared receiver 990 on the VCR 991 would receive the transmission and send the code to the G-code decoder 992, which would decode the code into CDTL and use this information along with a clock, which would also be embedded in the VCR 991, to send the proper commands to the cable box 966 and the satellite receiver 986 at the appropriate time so that the selected program will be recorded at the proper time. The transmission from the VCR 991 would be via infrared transmitters 994, which can be placed at strategic points on the VCR. The transmission is then received by the cable box 966 via infrared receiver 969 and the satellite receiver 986 via infrared receiver 988.

Another preferred embodiment of the transmission method and apparatus between equipments is shown in FIG. 36, which is a perspective view showing a cable box 372 placed on top of a VCR 370 having an infrared transmitter 1008 behind the front panel 1009 which communicates to the cable box infrared receiver 1010 via reflection from surrounding reflecting surfaces such as walls.

Another preferred embodiment of the transmission method and apparatus between equipments is shown in FIG. 37, which is a perspective view showing a cable box 372 placed on top of a VCR 370 having an infrared transmitter 1014 inside a infrared dome 1012 on the top of the VCR which communicates to the cable box infrared receiver 1010 via direct communication or reflection depending on placement of the infrared receiver 1010 relative to infrared dome 1012.

Another preferred embodiment of the transmission method and apparatus between equipments is shown in FIG. 38, which is a perspective view of a VCR 370 having an infrared transmitter 1022 inside a mouse 1020 coupled via a cable 1018, which is plugged via plug 1017 into receptacle 1016 on the VCR. The mouse 1020 is placed near the cable box infrared receiver 1010. This embodiment is most useful when the cable box is separated from the VCR by walls of a cabinet, for example, that would prevent either direct or reflective infrared transmission.

Another preferred embodiment of the transmission method and apparatus between equipments is shown in FIG. 39, which is a perspective view of a VCR 370 having an infrared transmitter 1026 inside a stick on miniature mouse 1024 coupled via a cable 1018, which is plugged via plug 1017 into receptacle 1016 on the VCR. The stick on miniature mouse 1024 is stuck onto the cable box very near the infrared receiver 1010. This embodiment is also most useful when the cable box is separated from the VCR by walls of a cabinet, for example, that would prevent either direct or reflective infrared transmission.

The transmission methods and apparatus of FIGS. 36, 37, 38 and 39 could also be used with the system of FIG. 32 to transmit information from television receiver with G-code decoder 950 to VCR 964, cable box 966 and satellite receiver 986.

FIG. 34 is a block diagram of a system including a cable box having a G-code decoder 997, a television 952, a VCR 964, and a satellite receiver 986. The user would use the television remote controller 956 or controls on the cable box 997 to enter the code that signifies the program to be recorded. When a G-code is entered, the television remote would send the G-code to cable box 997 with G-code decoder 998 via infrared transmitter 958. An infrared receiver 996 on the cable box 997 would receive the transmission and send the code to the G-code decoder 998, which would decode the code into CDTL and use this information along with a clock, which would also be embedded in the cable box 997, to send the proper commands to the VCR 964 and the satellite receiver 986 at the appropriate time so that the selected program will be recorded at the proper time. The transmission from the cable box 997 would be via infrared transmitters 1000, which can be placed at strategic points on the cable box. The transmission is then received by the VCR 964 via infrared receiver 968 and the satellite receiver 986 via infrared receiver 988. The transmission methods and apparatus of FIGS. 36, 37, 38 and 39 could also be used with the system of FIG. 34 to transmit information from cable box 997 to VCR 964 and satellite receiver 986.

FIG. 35 is a block diagram of a system including a satellite receiver 1005 having a G-code decoder, a television 952, a VCR 964, and a cable box 966. The user would use the television remote controller 956 or controls on the satellite receiver 1005 to enter the code that signifies the program to be recorded. When a G-code is entered, the television remote would send the G-code to satellite receiver 1005 with G-code decoder 1004 via infrared transmitter 958. An infrared receiver 1002 on the satellite receiver 1005 would receive the transmission and send the code to the G-code decoder 1004, which would decode the code into CDTL and use this information along with a clock, which would also be embedded in the satellite receiver 1005, to send the proper commands to the VCR 964 and the cable box 966 at the appropriate time so that the selected program will be recorded at the proper time. The transmission from the satellite receiver 1005 would be via infrared transmitters 1006, which can be placed at strategic points on the satellite receiver. The transmission is then received by the VCR 964 via infrared receiver 968 and the cable box 966 via infrared receiver 969. The transmission methods and apparatus of FIGS. 36, 37, 38 and 39 could also be used with the system of FIG. 35 to transmit information from satellite receiver 1005 to VCR 964 and cable box 966.

Figure 40:
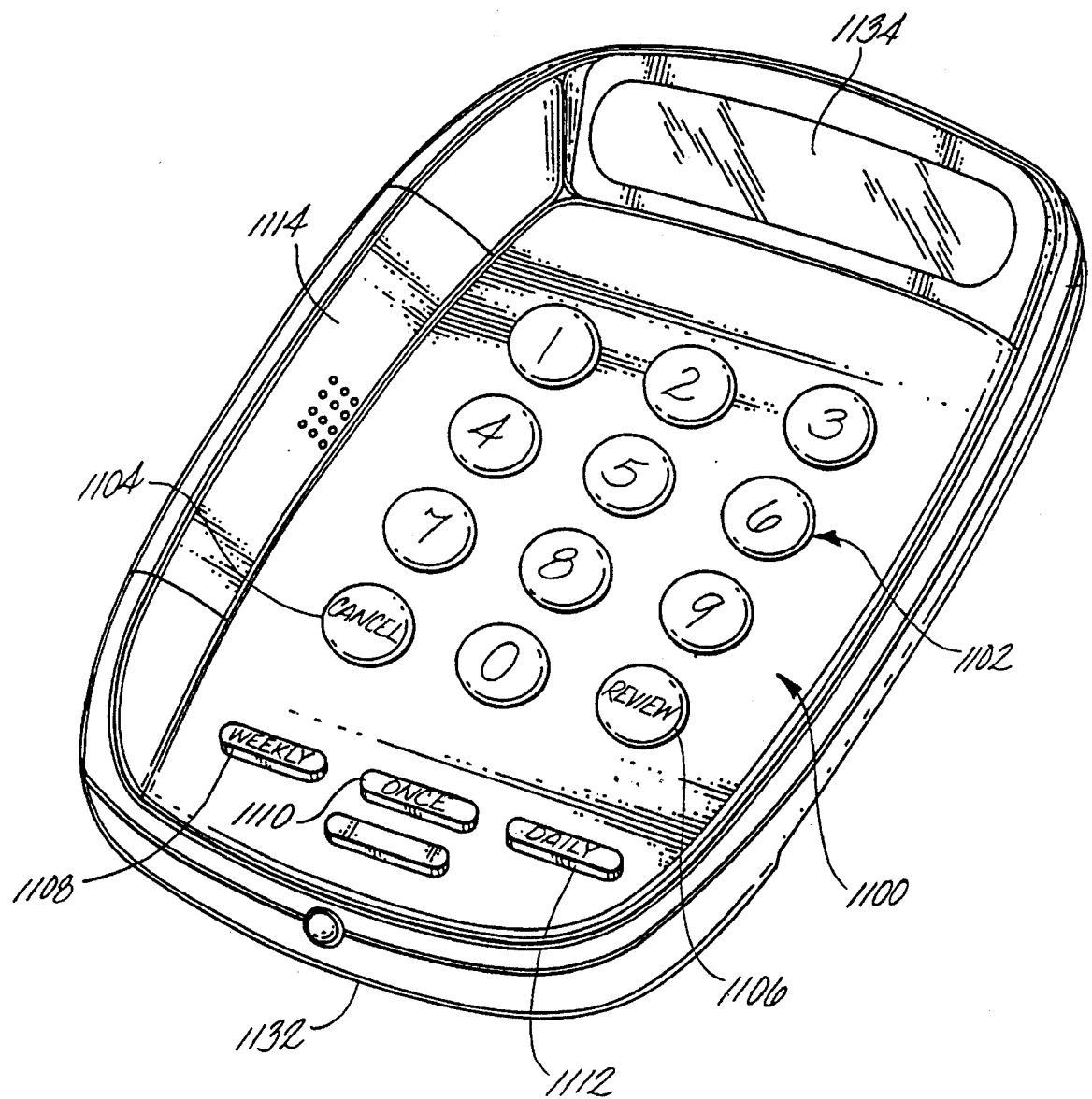
FIG. 40 is a perspective view of a second apparatus for using compressed codes for recorder preprogramming according to a preferred embodiment of the invention.
Figure 4C:
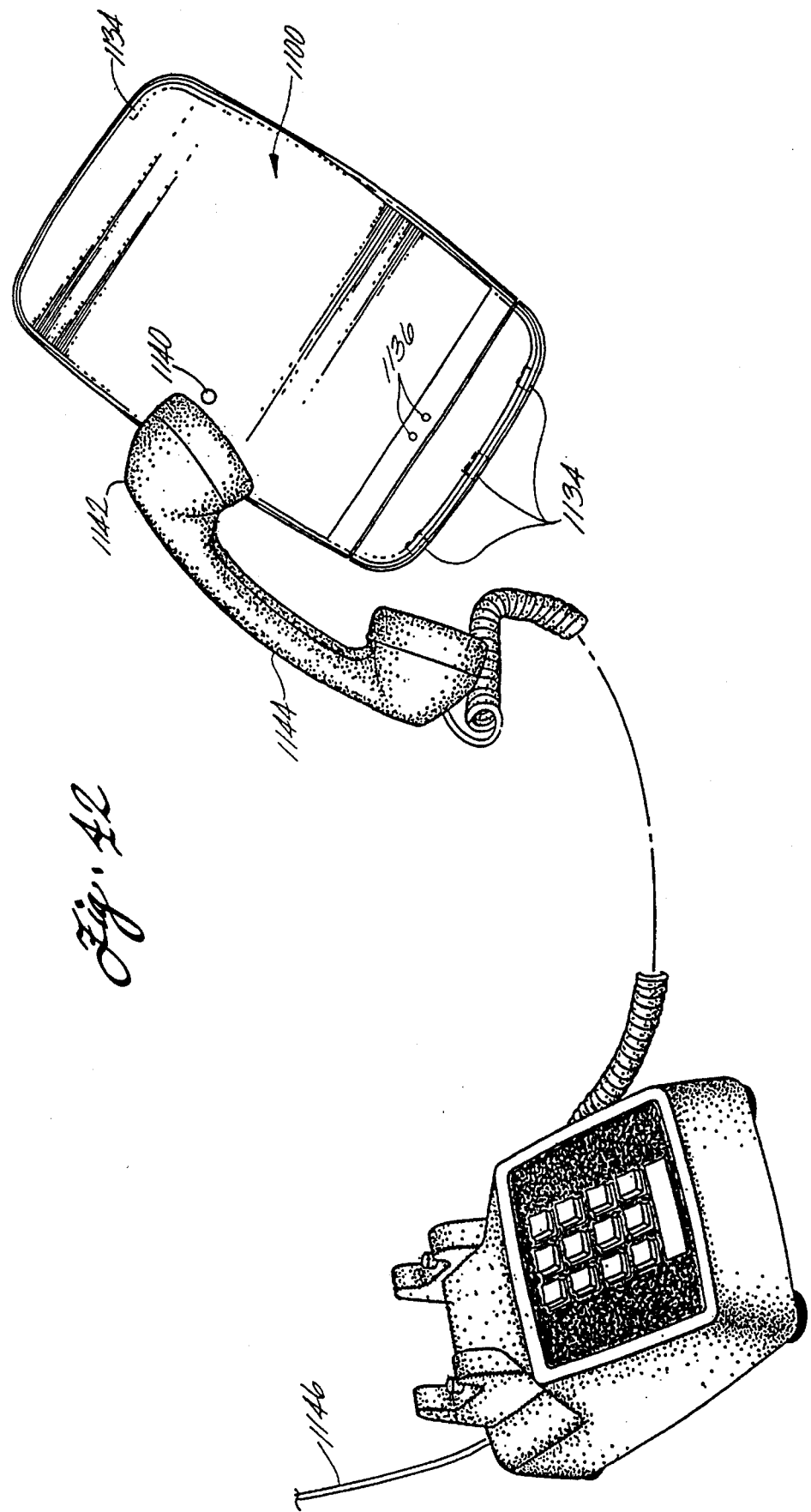

Another preferred embodiment of an apparatus for using compressed codes for a recorder programming is the custom programmer 1100 of FIGS. 40 and 41. The custom programmer 1100 is similar to instant programmer 300 and has number keys 1102, which are numbered 0–9, a CANCEL key 1104, a REVIEW key 1106, a WEEKLY key 1108, a ONCE key 1110 and a DAILY (M–F) key 1112, which correspond directly to keys 302–312 of instant programmer 300, and which are used to program the custom programmer 1100. Like the instant programmer 300, a lid normally covers other keys, which are used to setup the instant custom programmer 1100. When lid 1114 is lifted, the following keys are revealed, but not shown in the drawings: SAVE key, ENTER key, CLOCK key, CH key, ADD TIME key, VCR key, CABLE key, and TEST key. These keys of the custom programmer 1100 correspond to and operate substantially the same as keys 316–330 of instant programmer 300, respectively. Also included in the custom programmer 1100 shown in FIG. 40 are: liquid crystal display 1134, red warning light emitting diode 1132 and IR diodes 1134, which correspond to liquid crystal display 350, red warning light emitting diode 332 and IR diodes 342–348 as shown in FIG. 15.

As discussed above, when using the instant programmer 300, the consumer initially performs a set-up sequence, consisting of selecting a protocol for the model/brand of VCR, setting the current real time, selecting a protocol for the model/brand of cable box, and entering a series of channel number assignments. Although the instant programmer 300 makes recording of television programs extremely simple, the initial set-up sequence for the instant programmer 300 is more complex and deters the use of the instant programmer by some consumers. Custom programmer 1100 includes a microphone opening 1140 through which at least one microphone inside the custom programmer 1100 can receive electronically coded audio signals that contain the information necessary for the custom programmer's initial set-up and commands to store this information into the custom programmer 1100.

In order to receive these audio signals, a user may call a special phone number which could be a toll-free 800 number, a pay-per-minute 900 number, or a standard telephone number with standard toll charges applying. The consumer can speak to an operator who orally inquires from the consumer the information regarding the consumer's VCR model and brand, zip code, model and brand of cable box and the newspaper or other publication which the consumer will use to obtain the compressed codes. This is all the information needed to perform the initial set-up for the custom programmer 1100. From the zip code information, the operator can determine to which cable system the consumer is connected and can combine this data with the knowledge of which publication the consumer will use to select the correct local channel mapping table for the consumer.

The operator then directs the consumer to press a designated programming key which is, in the case of the preferred embodiment, the CH key located under lid 1114. When the CH key is pressed, the display 1134 with display the message "PHONE1 KEY2". Pressing the "2" numeric key places the custom programmer into the manual local channel table programming mode that is implemented by instant programmer 300 when CH key 322 is pressed. Pressing the "1" numeric key initiates the remote programming mode. The custom programmer 1100 is then ready to receive an audio signal and display 1134 displays the message "WAIT".

The operator will then direct the consumer to place the earpiece 1142 of the telephone receiver 1144 over the microphone opening 1140 of the custom programmer 1100 as generally shown in FIG. 42. The earpiece need not be placed directly against the custom programmer 1100, but may be held more than an inch away from the microphone opening with generally satisfactory results. After a pause sufficient to allow the consumer to place the telephone receiver in the proper position, the operator will initiate the downloading of the initial set-up data and initial set-up programming commands transmitted over the telephone line 1146 using audio signals to the consumer's custom programmer 1100.

If the initial set-up data is successfully transferred to the custom programmer 1100, the display 1134 of the custom programmer 1100 will display the message "DONE". If the reception of the initial set-up data is not successful within a predetermined time limit, red warning light emitting diode 1132 will blink to inform the consumer to adjust the position of the telephone earpiece before another down load of the information is attempted. After a waiting period allowing this adjustment, the initial set-up data and commands are retransmitted over the telephone line. If after a predetermined number of attempts to download the initial set-up information are unsuccessful, the liquid crystal display 1134 displays the message "FAIL" and the operator is again connected to the consumer allowing the operator to speak to the consumer to provide additional assistance in the positioning of the telephone earpiece.

Alternatively, a live operator could be provided by the local cable company and the initial set-up information downloaded to the custom programmer 1100 by telephone line, through the existing cable of the cable system, or any other transmission means. If local cable companies supply the live operators, the only information they would need to gather from the consumer would be the VCR brand and model and the publication containing compressed codes that the consumer plans on using, because the local cable company would know the model and brand of cable box installed at the consumer's location and the necessary data regarding the local channel designations for that cable system.

Figure 43:
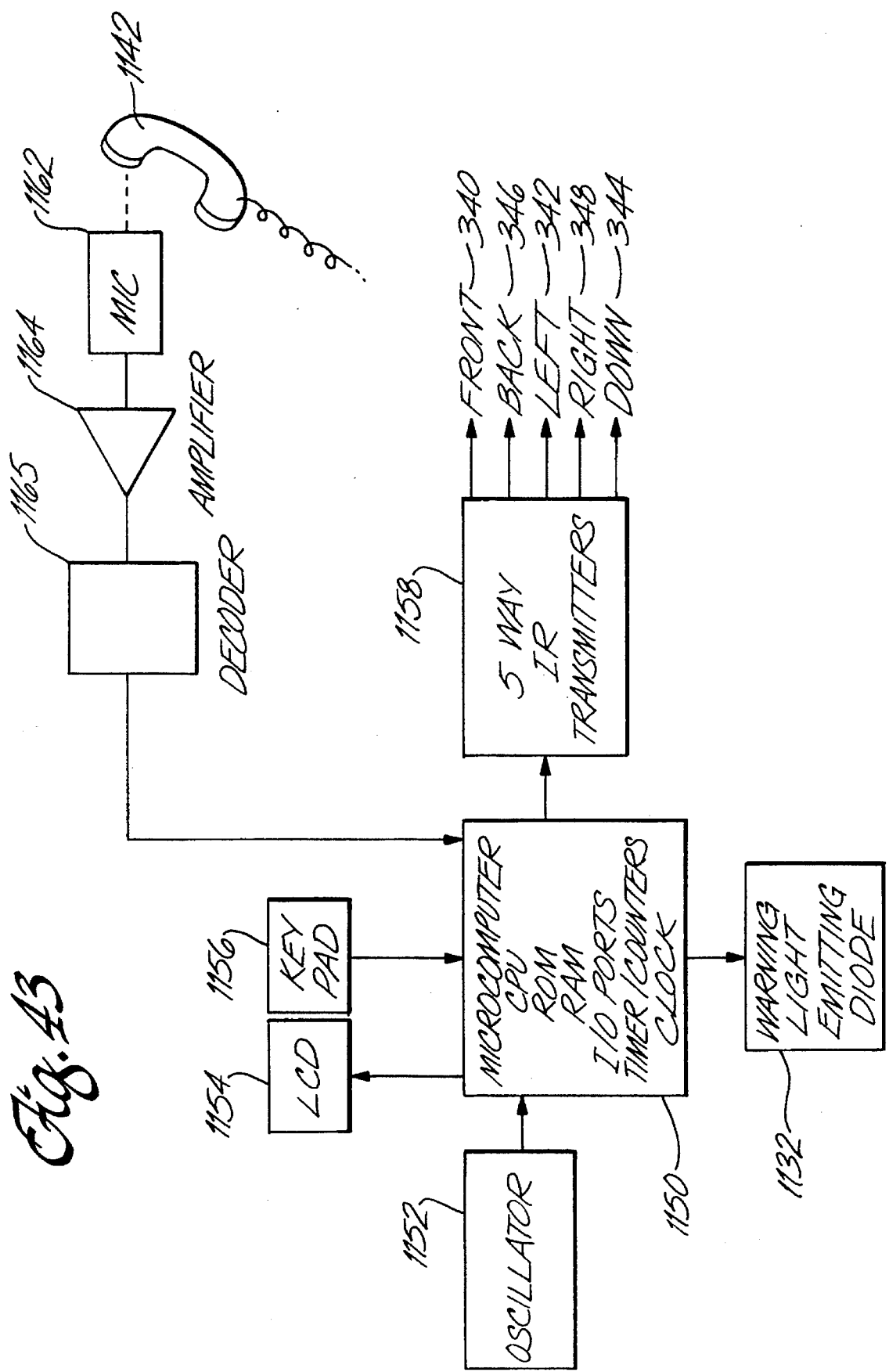
FIG. 43 is a schematic showing second apparatus for using compressed codes for recorder preprogramming according to a preferred embodiment of the invention.
Figure 44:
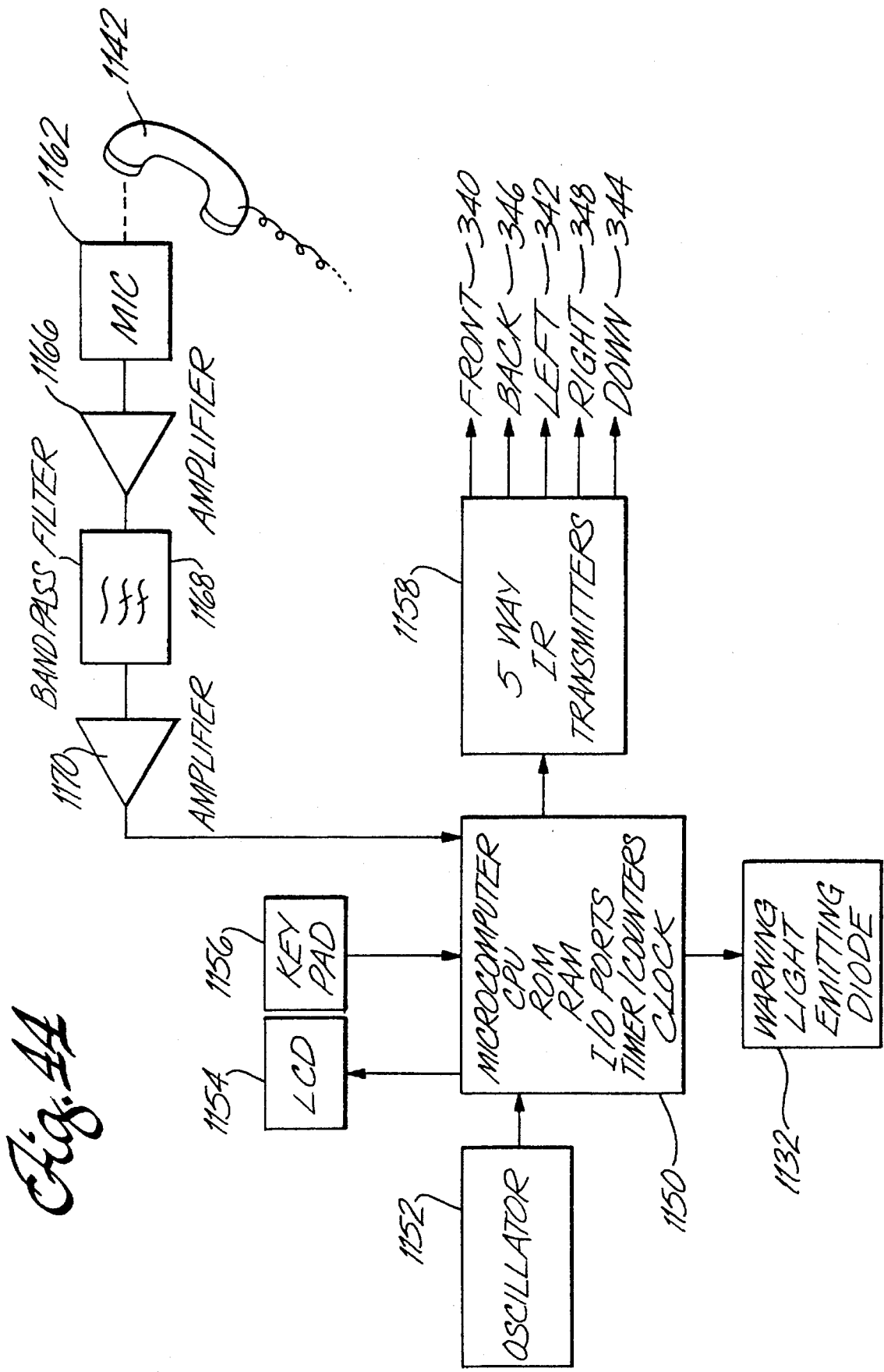
FIG. 44 is an alternate schematic showing second apparatus for using compressed codes for recorder preprogramming according to a preferred embodiment of the invention.

FIGS. 43 and 44 are schematics of the circuitry needed to implement alternative embodiments of the custom programmer 1100. The circuit consists of microcomputer 1150, oscillator 1152, liquid crystal display 1154, keypad 1156, five way IR transmitters 1158 and red warning light emitting diode 1160. These components directly correspond to microcomputer 380, oscillator 382, liquid crystal display 384, keypad 386, five way IR transmitters 388 and red warning light emitting diode 332, respectively of instant programmer 300 and perform in the same manner. In both FIGS. 43 and 44, earpiece 1142 generates serial audio signals which are received by microphone 1162.

As shown in FIG. 43 the audio signals received by microphone 1162 are passed through amplifier 1164 and forwarded through a DTMF decoder circuit 1165 and into a serial port of microcomputer 1150. In the alternative circuit shown in FIG. 44, the audio signals received by microphone 1162 are passed through amplifier 1165, through a band pass filter 1168 with a cutoff at approximately 1–4 kHz, and through a second amplifier 1170 to a serial port of microcomputer 1150.

Alternatively, a dual microphone system (not shown) may be employed to increase reliability, especially when the custom programmer 1100 is to be programmed in an environment with a high level of background noise that could interfere with the transmission of data through the single microphone acoustic means. In this system, one microphone would be placed near the telephone earpiece and the second microphone would be place some distance away from the earpiece in order to pick up background noise. A audio signal cancellation circuit is then used to effectively "subtract" the background noise picked up by the second microphone from the audio data signals combined with the background noise that is picked up from the first microphone resulting in solely clean audio data signals.

Figure 45:
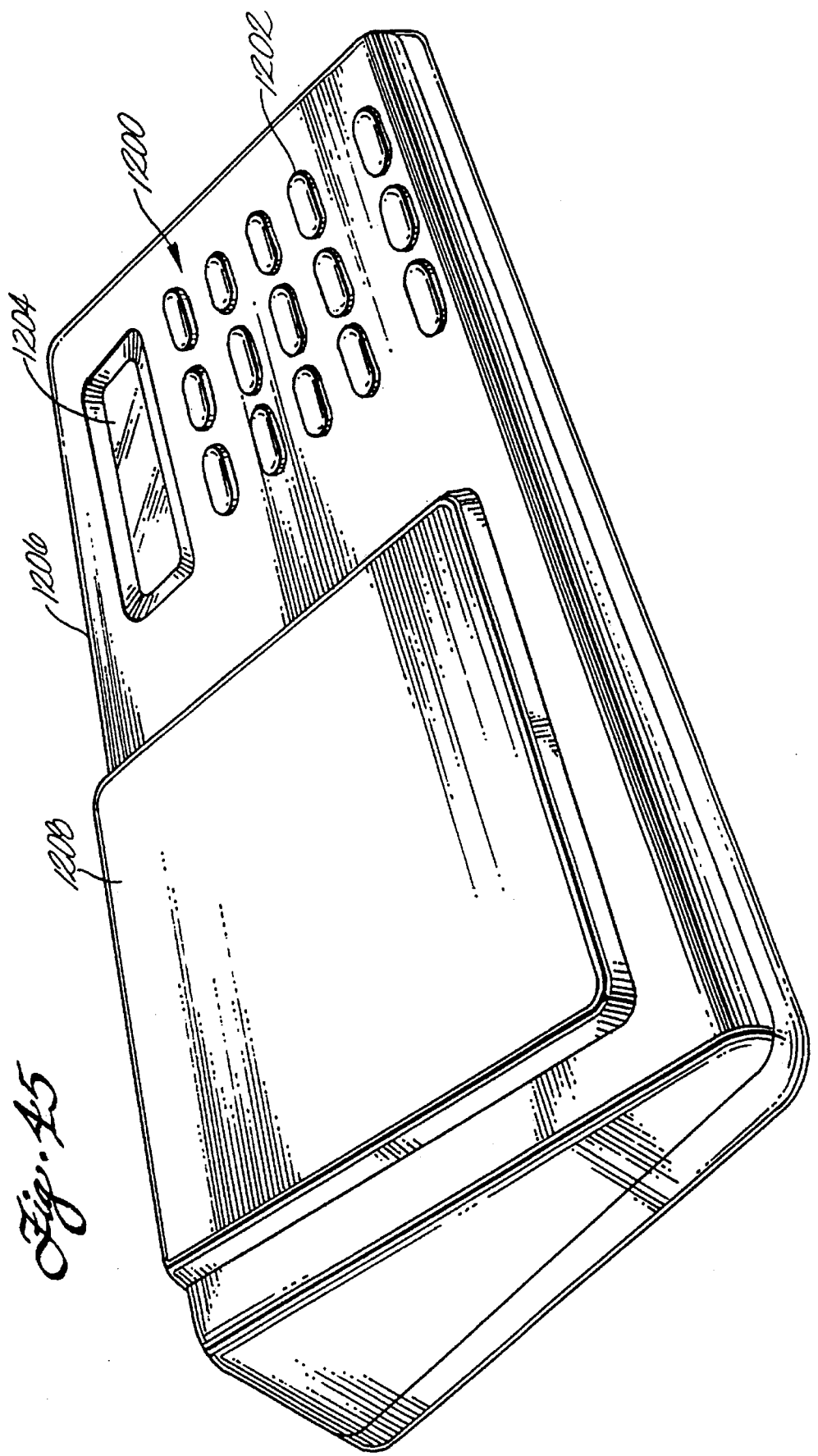
FIG. 45 is a perspective view of an apparatus for programming remote controls with memories according to a preferred embodiment of the invention.

Another preferred embodiment includes a separate initial set-up programmer 1200 as shown in FIGS. 45. The initial set-up programmer 1200 serves the same basic function as the telephonic audio signal programming capability of custom programmer 1100, namely allowing the total setup of the instant programmer 300 or custom programmer 1100 with a minimum of effort on the part of the consumer. Normally, initial set-up programmers 1200 would be maintained by sellers of either the instant programmer 300 or the custom programmer 1100. The initial set-up programmer could be programmed with the local channel tables for the cable systems and the television calendars that publish G-codes in the vicinity of the seller. When a customer purchases an instant programmer 300 or custom programmer 1100, the seller can inquire where the customer lives and which television calendar the customer uses and use the initial set-up programmer 1200 to download the appropriate local channel table for that customer. Further, the initial set-up programmer 1200 can also set the clock, VCR brand and model, and cable box brand and model for the customer's instant programmer 300 or custom programmer 1100.

Figure 46:
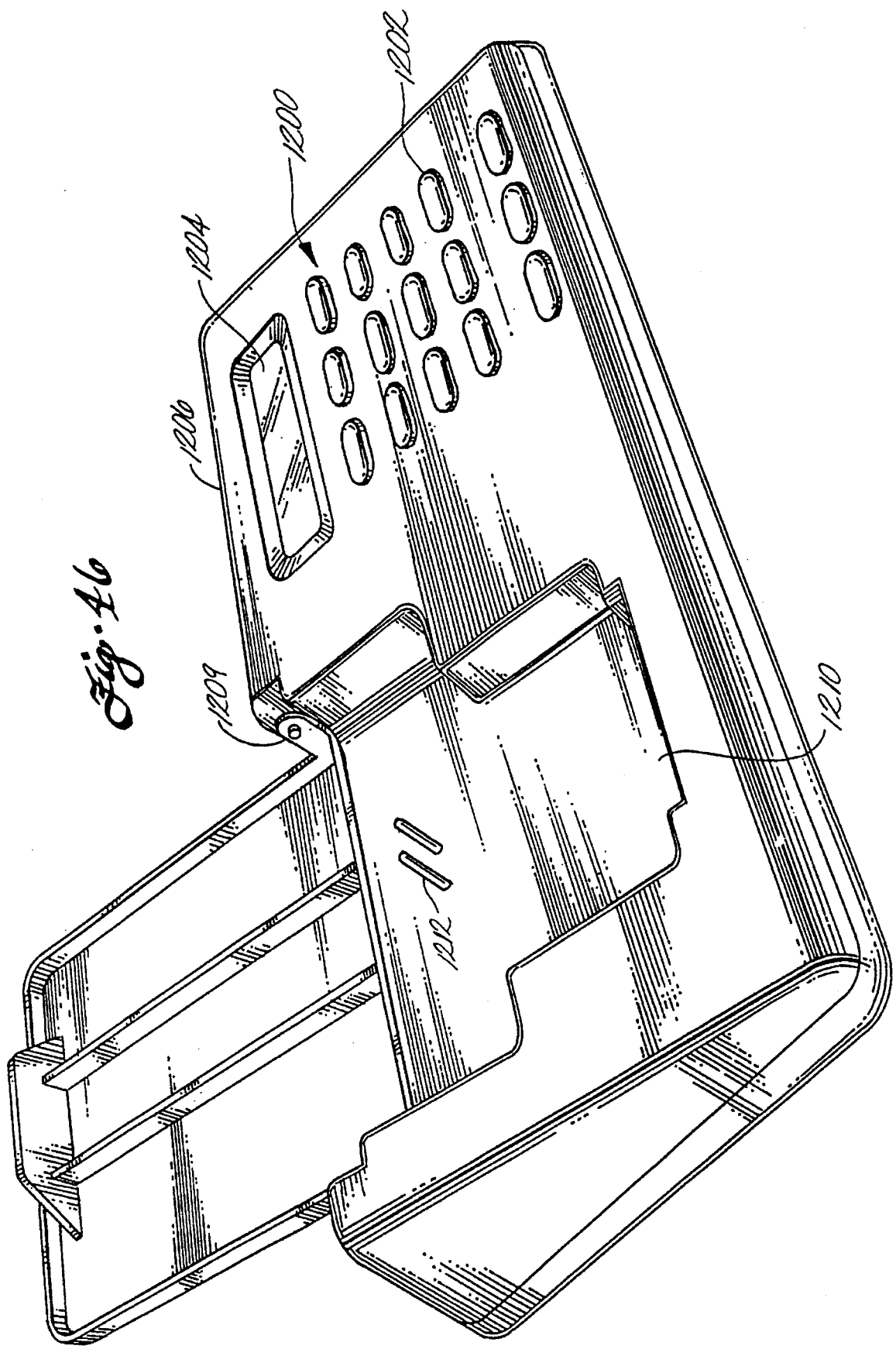
FIG. 46 is a perspective view of the apparatus of FIG. 45 with the hinged lid in the open position.
Figure 47:
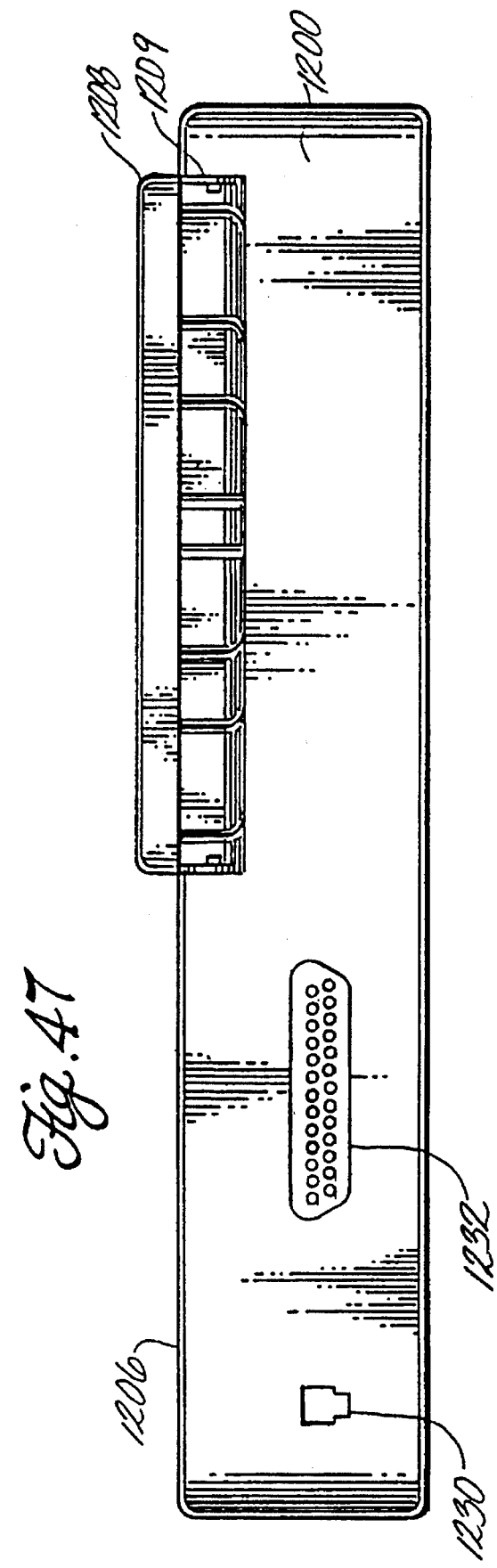
FIG. 47 is a rear view of the apparatus of FIG. 45 showing telephone and computer input/output ports.

The initial set-up programmer 1200 includes a keyboard 1202, a display 1204, an enclosure 1206, and a lid 1208, with hinges 1209 at the top that allow the lid to open to reveal a depression 1210 for holding instant programmers 300 and custom programmers 1100 and two electrical contact pins 1212 as shown in FIG. 46. The initial set-up programmer 1200 includes a modular phone jack 1230 and a serial port 1232 as shown in FIG. 47 for transferring data to and from computers, either directly or over telephone lines.

Figure 48:
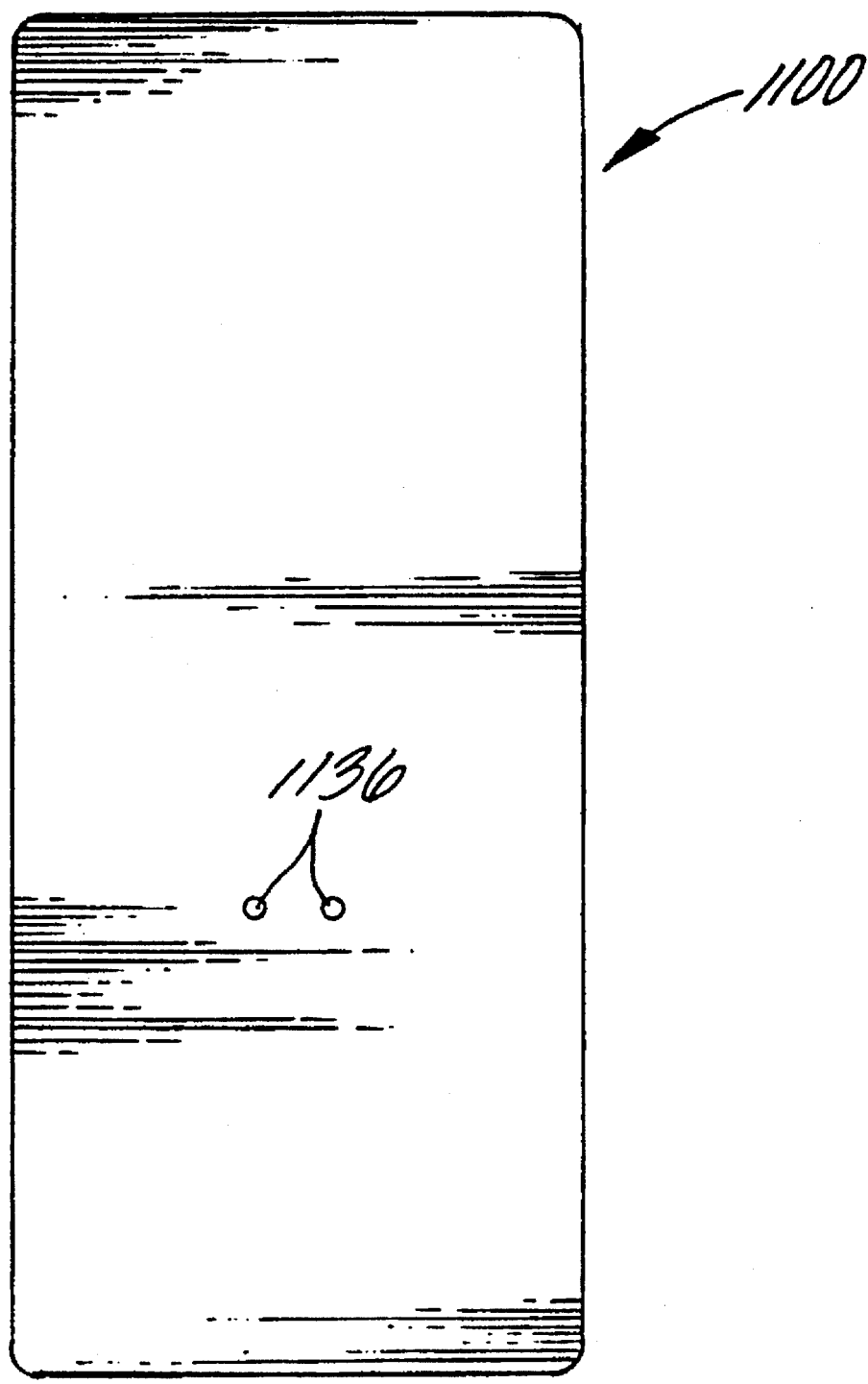
FIG. 48 is a bottom view of the apparatus of FIG. 15 showing electrical contact access holes.
Figure 49:
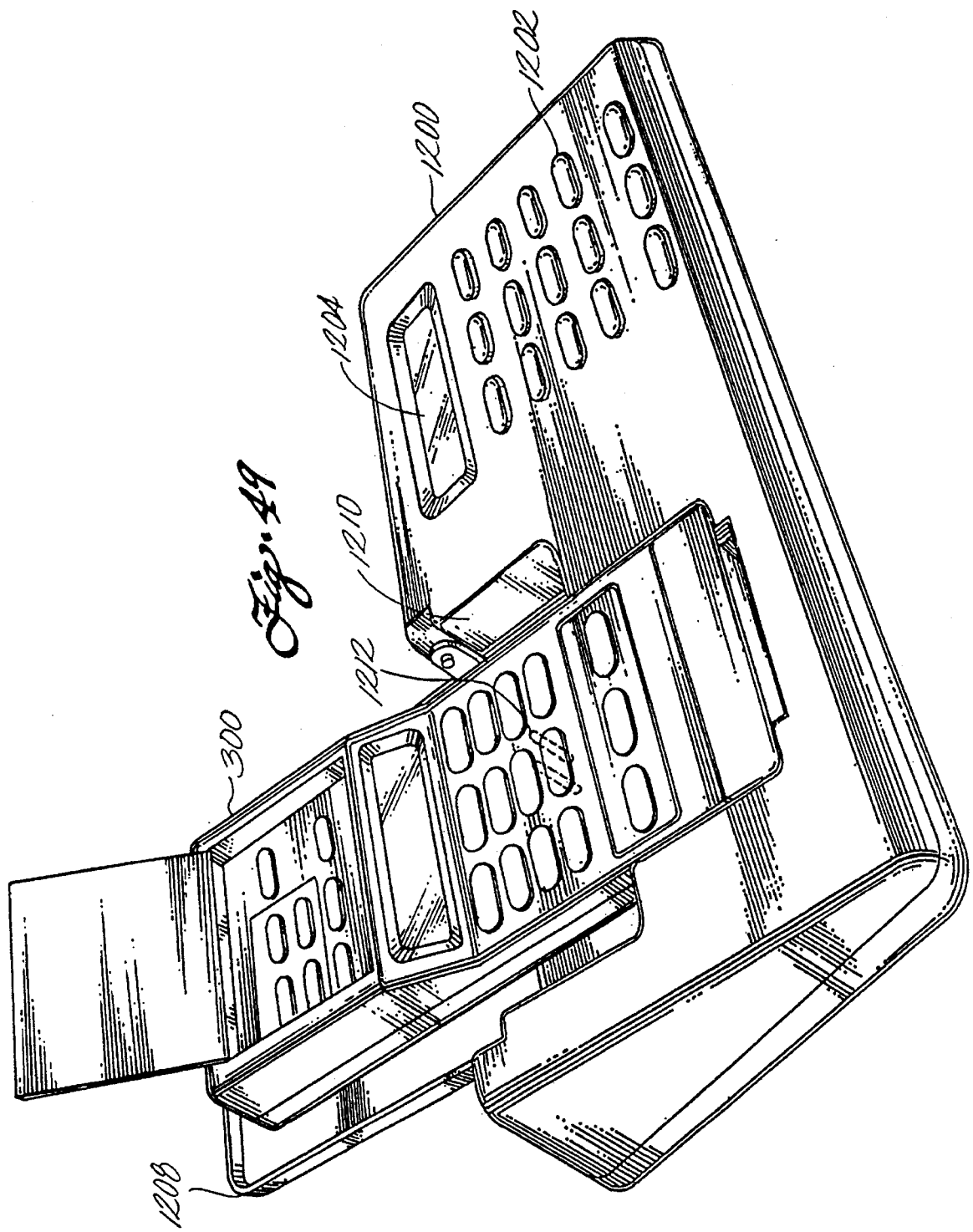
FIG. 49 is a perspective view of the apparatus of FIG. 45 coupled to an apparatus according to FIG. 15.
Figure 50:
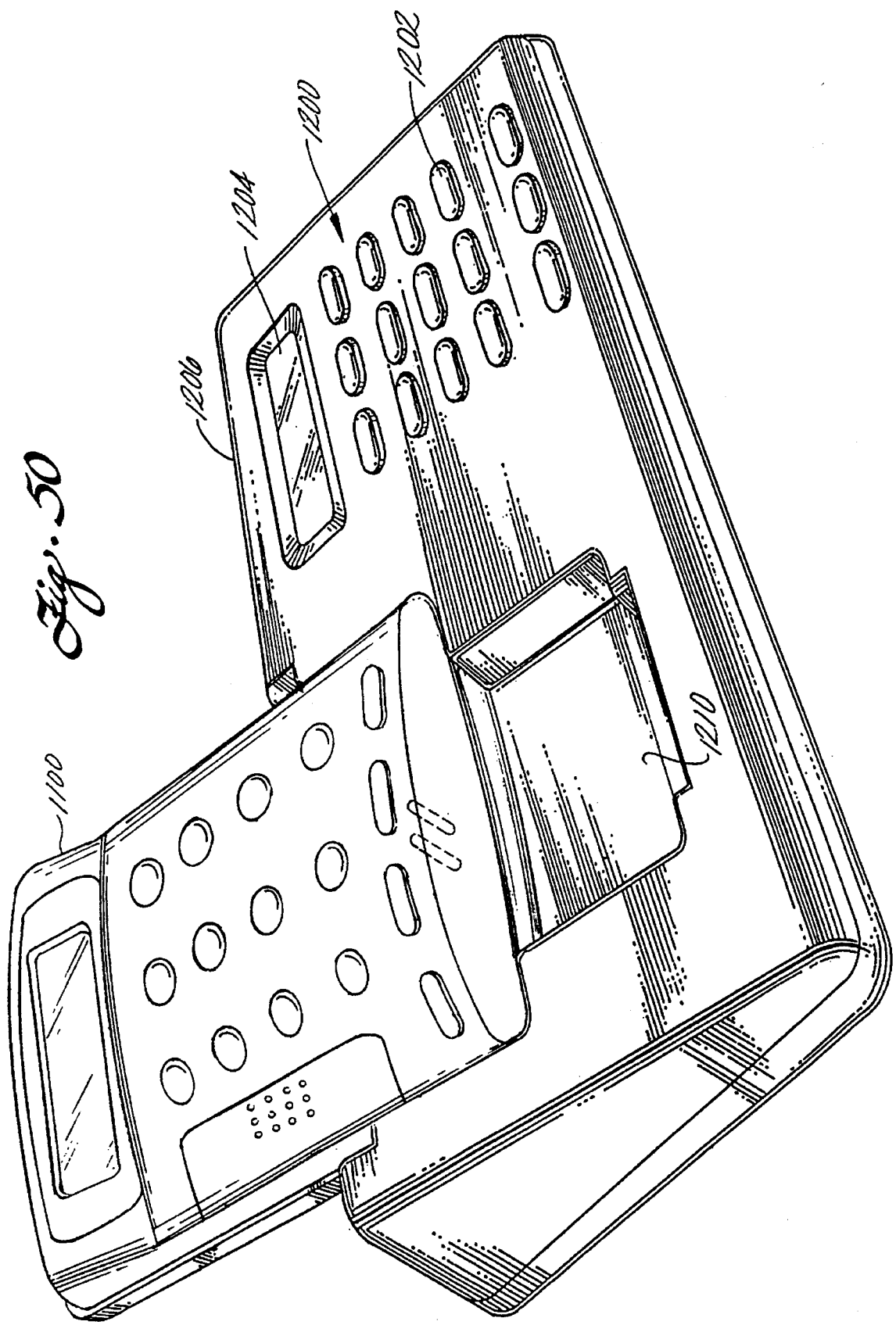
FIG. 50 is a perspective view of the apparatus of FIG. 45 coupled to an apparatus according to FIG. 40.

FIG. 48 shows two access holes 1136 in the bottom of the instant programmer 300 that allow access to two contact points on the circuit board (not shown) inside the instant programmer 300. FIG. 49 shows the initial set-up programmer 1200 with an instant programmer 300 fit into the depression 1210 with the two contact pins 1212 extending upwards through the access holes 1213 in the bottom of the instant programmer 300. FIG. 50 shows the initial set-up programmer 1200 with a custom programmer 1100 fit into the depression 1210 with the two contact pins 1212 extending upwards through the access holes 1136 in the bottom of the instant programmer 300.

Figure 51:
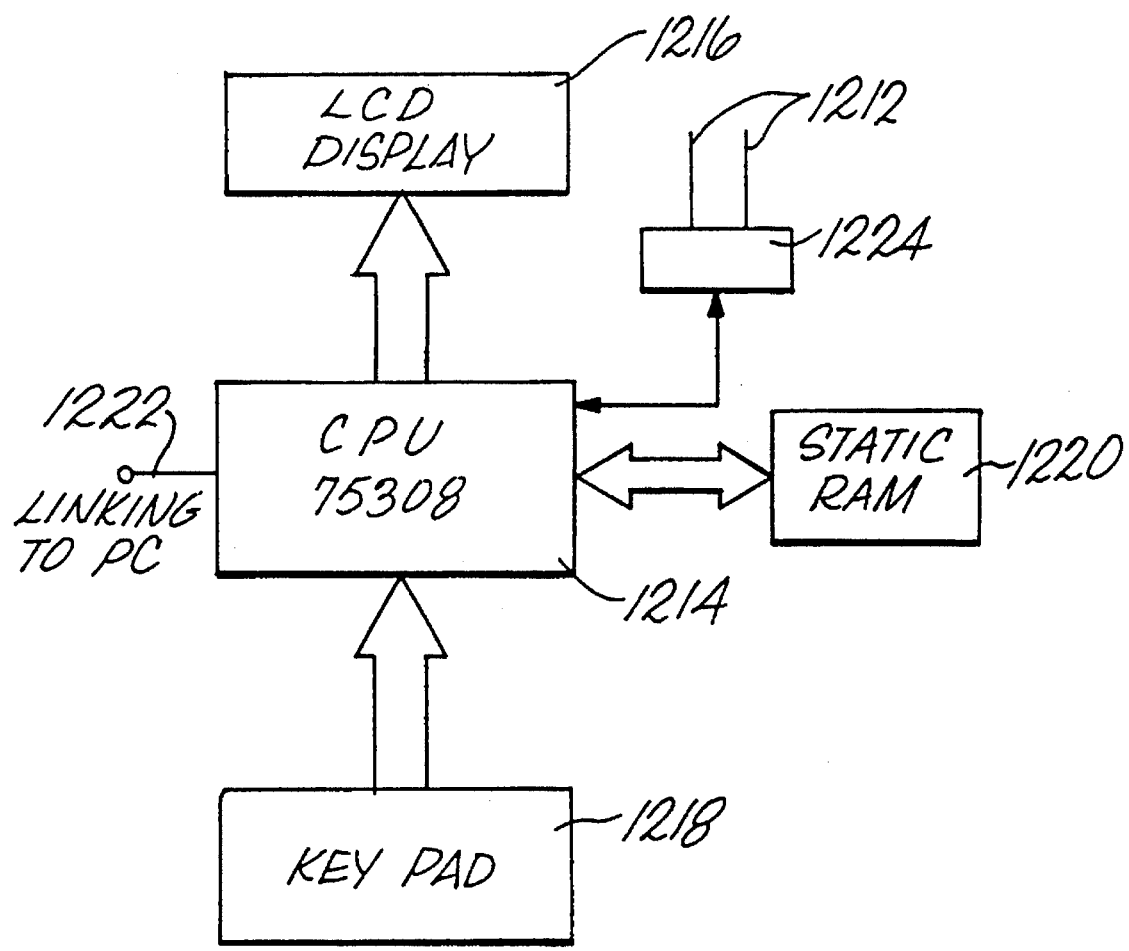
FIG. 51 is a schematic showing apparatus for programming remote controls with memories according to a preferred embodiment of the invention.

FIG. 51 is a schematic that shows circuitry included in the initial set-up programmer 1200. The initial set-up programmer includes a microcontroller (NEC µPD7530x) 1214, a liquid crystal display 1216, a keypad 1218, static random access memory (static RAM) 1220, computer port 1222 and programming pins 1224. Local channel tables can be transferred from a computer to the initial set-up programmer 1200 and stored in static RAM 1220.

Figure 52:
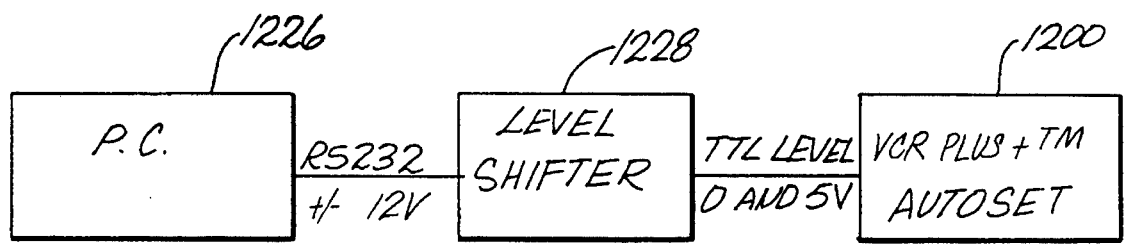
FIG. 52 is a schematic showing the electronic connection between apparatus for programming remote controls with memories according to a preferred embodiment of the invention and a personal computer.

FIG. 52 is a schematic showing the data transfer connection between a personal computer 1226 and initial set-up programmer 1200. Local channel table data is output from personal computer 1226 through a serial RS-232 port with +12 and −12 volt signals. The +12 and −12 volt signals are transformed to TTL compatible 0 and 5 volt signals by level shifter 1228 which are input into microcontroller 1214. Level shifter 1228 can be either external or internal to initial set-up programmer 1200.

Alternatively, local channel table data can be transferred to the initial set-up programmer 1200 by audio signals carried over telephone lines. Further, local channel tables may be entered into the initial set-up programmer through keyboard 1202 in the same manner used to program this information into either instant programmers 300 or custom programmers 1100.

Included in keyboard 1202 are "SEND CLK", "SEND CH", "SEND CAB" and "SEND VCR", which set the clock, download the local channel table, select the protocol for the cable box brand and model and select the protocol for the VCR brand and model, respectively when they are pressed. If the information is successfully transferred to the instant programmer 300 or custom programmer 1100 connected to the initial set-up programmer 1200, display 1204 displays the message "Tr OK", otherwise the message "Tr Err" is displayed on display 1204.

Data is transferred to instant programmer 300 and custom programmer 1100 through the two contact pins 1212. The first of these pins is the ground pin. The second pin connects with test point 392 a shown in FIG. 22. Test point 392 is connected to both an interrupt pin and one input/output (I/O) pin of microcomputer 380. The two pins are tied together with an open collector method so that both input and output can be accomplished with one pin. The two contact pins 1212 connect to the same functional pins of the microcomputer 1150 of the custom programmer 1100. Data is transferred serially through these pins at a 4800 baud rate using TTL voltage levels. The instant programmer 300 and custom programmer 1100 return a low pulse of a predetermined length to the initial set-up programmer 1200 when they have received all of transferred data.

The invention as shown in the preferred embodiments of the custom programmer 1100 and the initial set-up programmer 1200 can be readily included within televisions, video cassette recorders, cable boxes, or satellite receivers. It would not be complicated to embed either the custom programmer 1100 or the initial set-up programmer 1200 in televisions, video cassette recorders, cable boxes, and satellite receivers by adding suitable cabling or other transmission means between various video devices being used.

Another embodiment of the invention is the custom controller 1300 shown in FIGS. 53–58. The custom controller contains the same circuitry and performs the same functions as the custom programmer 1100, but also performs the functions of a complete universal remote control that can be setup automatically. The custom controller includes on its main control surface 1302 and its auxiliary control surface 1304, buttons that perform the same functions as buttons 1102–1112, 1156 of the custom programmer, a display 1306 that performs the same functions as display 1134, 1154 and IR transmitters 1314 which perform the same functions as IR transmitters 1131, 1158. The custom controller can also be equipped with a lid (not shown) that covers hidden keys (not shown) used to setup the custom controller like lid 1114 on the custom programmer 1100 and lid 316 and keys 316–330 on the instant programmer 300. The keys under the lid could include SAVE, ENTER, CLOCK, CH, ADD TIME, VCR, CABLE and TEST keys like the instant programmer and the custom programmer.

The custom controller includes a microphone 1308, which performs the same functions as microphone 1140 of the custom programmer and is accessible through the microphone access hole 1309. Through the microphone, the custom controller is programmed with all of the set-up information needed to function as an instant or custom programmer (i.e., channel map, current time of day, model/brand of cable box and VCR). Alternatively, the custom controller can be programmed by the initial set-up programmer 1200 shown in FIGS. 45–47 and 49–51 in the identical manner described above in connection with these figures for the instant and custom programmers. Accordingly, the custom controller includes access holes 1310 through which contact can be made with the contact pins 1212 of the set-up programmer 1200.

Custom controller 1300 also includes additional buttons on its control surfaces 1302 and 1304 that can used to operate any home electronic device that can be controlled by an infrared remote control. These standard infrared remote controls work by transmitting different IR codes for each different function to be performed by the device being controlled. Each button of the custom controller triggers the transmission of an IR code that would ordinarily be transmitted by another remote control. The actual make up of these IR codes used to control the various home electronic equipment are described in more detail in U.S. Pat. No. 4,623,887 to Welles, II which is hereby incorporated by reference.

Figure 58:
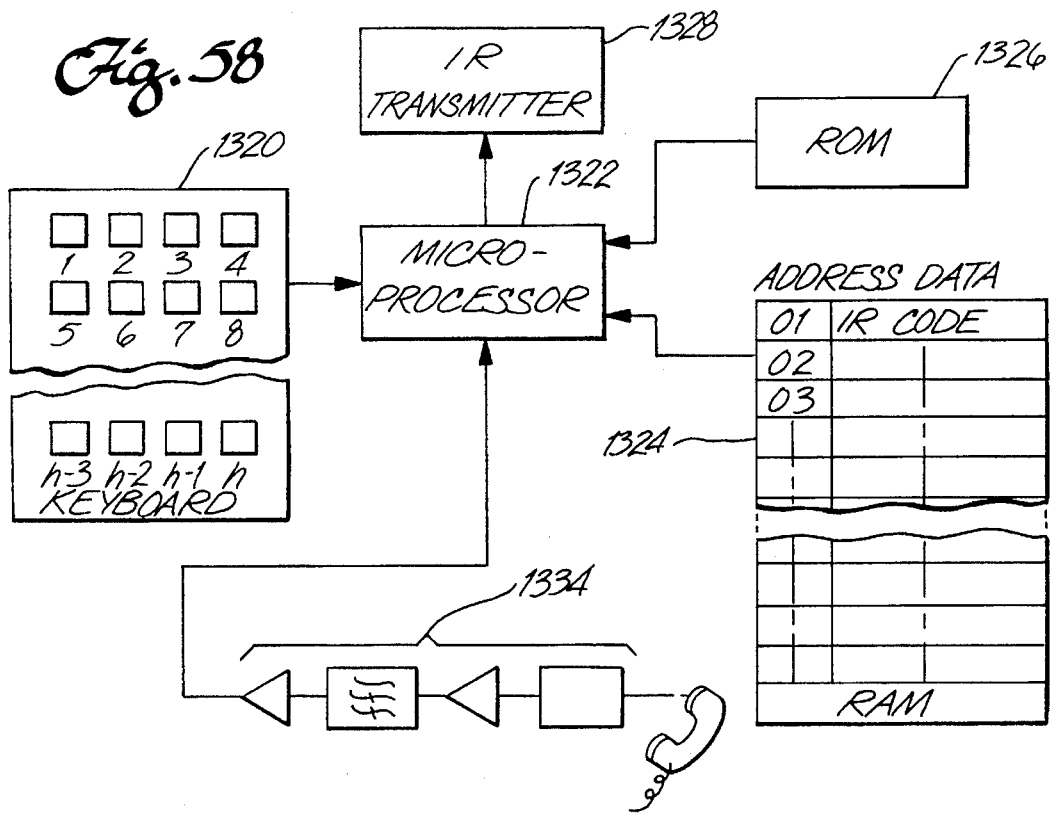
FIG. 58 is a block schematic of an embodiment of the apparatus of FIG. 53.
Figure 59:
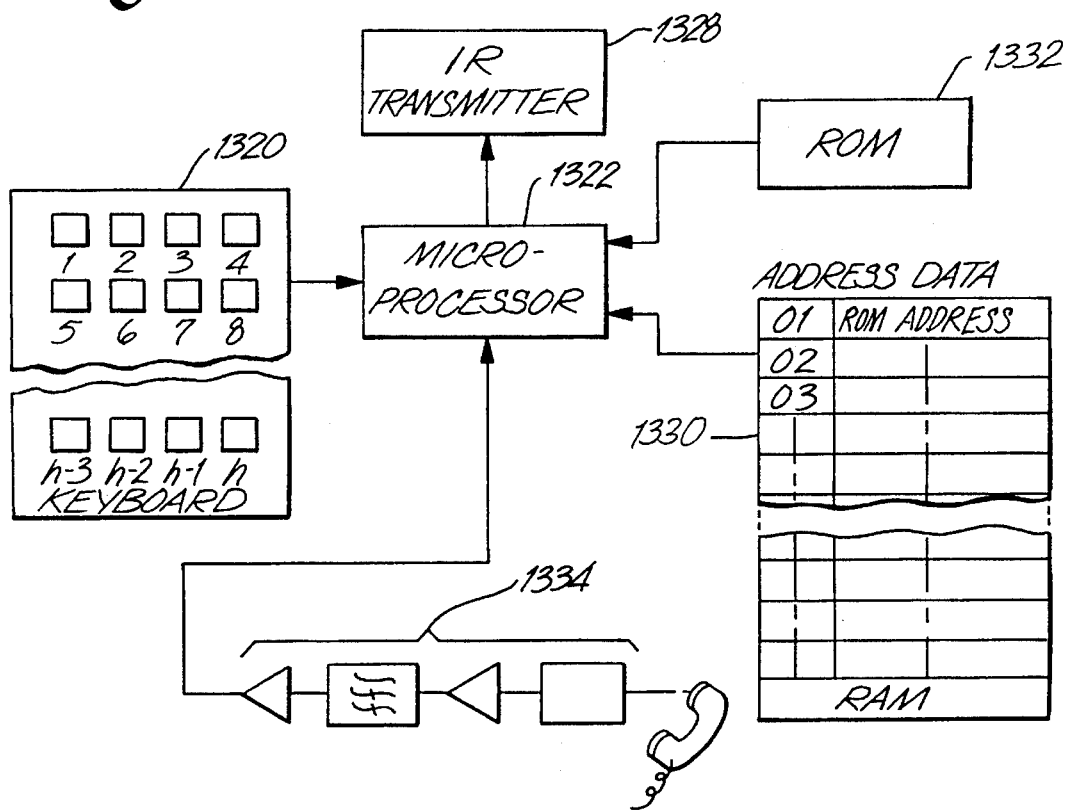
FIG. 59 is a block schematic of an alternative embodiment of the apparatus of FIG. 53.
Figure 60:
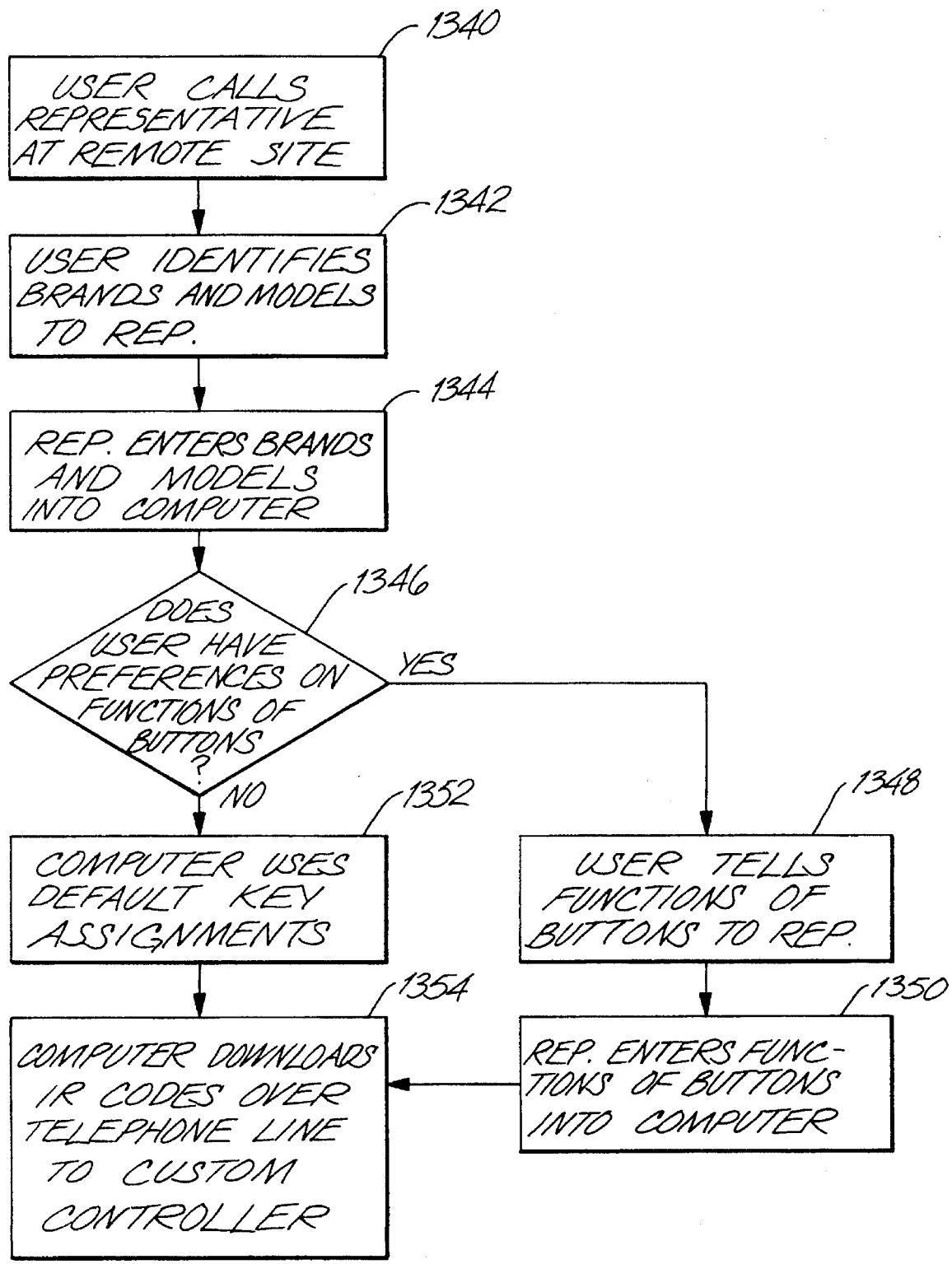
FIG. 60 is a flow chart of the process of remotely programming the apparatus of FIG. 53 over telephone lines.

Most of the time, the custom controller will be used to control televisions, VCRs, cable boxes, satellite receivers and hi-fi audio equipment. It is noted that both the instant programmer 300 and the custom programmer 1100 already functioned as universal remote controllers with respect to video recorders, cable boxes, televisions and satellite receivers as they can control diverse brands and models of these devices. However, the instant and custom programmers only use their universal remote features to change or select channels on cable boxes, video recorders, televisions and satellite receivers, begin and end recording by video recorders and turning the power on any of these devices on and off. Nonetheless, the schematic of the custom controller will be the same as the schematics of the custom programmer shown in FIGS. 43 and 44 except that the custom controller includes a keypad (see 1156) with more buttons and the size requirements for the ROM and RAM in the microcomputer (see 1150) are greater than in the custom programmer. FIGS. 58 and 59 show block diagram schematics for two alternate embodiments of the custom controller. It is noted these two schematics contain the same basic components, but the utilization and minimum size of the RAMs 1324 and 1330 and ROMs 1326, 1332 are different.

The custom controller's complete universal remote feature operates as follows. Each button on the keyboard 1320, which is mounted on control surfaces 1302, 1304 of the custom controller, is hard wired with a button code or a memory address, which is generated each time the button is pressed. The microcomputer 1322 receives the code or address generated by the pressed button and, if the button generates a code, consults a look-up table to retrieve an address for the button code. This look up table, as well as the instructions that control the operation of the microprocessor are stored in ROM 1326 and 1332.

In the embodiment of FIG. 58, the microprocessor retrieves an IR code from RAM 1324 at the address derived from the pressed button. In this embodiment, the minimum size for the ROM is very small as the ROM only needs to store the button code look up table and microprocessor instructions. However, the size of the RAM needs to be large enough to store an IR code for each button on the keyboard.

In the embodiment of FIG. 59, the microprocessor consults a look-up table in RAM 1330 which contains address to ROM 1332, which contains the actual IR codes. The ROM address is retrieved from RAM at the address derived from the pressed button on keyboard 1320. The IR code is then retrieved from ROM at the address retrieved from RAM. This embodiment allows the ROM to be preprogrammed with the IR codes for a large number of home electronic devices. This increases the minimum size of the ROM substantially, but reduces the minimum size of the RAM because ROM addresses are generally shorter than IR codes.

In both the embodiments of FIG. 58 and 59, the IR code retrieved from either ROM or RAM is sent by the microprocessor to IR transmitters 1328 and is transmitted.

Before the custom controller can be used as a complete universal remote control, it must be programmed with the IR codes for the functions and the brand and models of home electronic equipment it is going to control. Traditionally this has been done in two different ways. First, the custom controller can "learn" the IR codes for the products that it is to control from the remote controls that come with each product. The custom controller would then also include an IR receiver (not shown) that would receive IR codes from other remote controls and store these codes and which button on the custom controller each code is associated with into RAM. This type of "learning" controller usually employs the schematic of FIG. 58. The second traditional programming method involves providing a ROM that contains the IR codes for most functions of most brands and models of home electronic equipment. The user then enters into the custom controller what brand/model of each type of home electronic device that the user plans to use the custom controller with. In this method, for each brand and model of home electronic equipment, the custom controller will also include in ROM the associations between the IR codes for the equipment and the keys on the custom controller that will trigger the sending of the IR codes. A controller utilizing this second programming method usually employs the schematic of FIG. 59.

In an alternate embodiment, the custom controller can be programmed by either or both of these methods. IR codes that are "learned" from other remote controllers are stored in RAM 1324 shown in FIG. 58. Alternatively, ROM 1332 shown in FIG. 1332 includes IR codes for most VCRs, cable boxes, satellite receivers, televisions and stereo components and the ability to program which brand/model of these device he or she is using. In yet another embodiment, the embodiments shown in FIGS. 58 and 59 can be combined by including a flag bit in the data stored in RAM 1324 or 1330. If the flag bit is set, the rest of the data at that address is a ROM address which points to the location of the IR code in ROM 1332. If the flag bit is not set, the rest of the data at that address contains actual IR code data.

In the preferred embodiment of FIGS. 53–60, though, IR codes are programmed into the memory of the custom controller through the microphone 1308 that is used for the setup of the channel map, cable box and VCR brand/model and the current time of day. Using the process shown in FIG. 60, a process similar to that described above in connection with the custom programmer 1100, in block 1340, the user calls either a special phone number which could be a toll-free 800 number, a pay-per-minute 900 number, or a standard telephone number with standard toll charges applying. In block 1342, the consumer speaks on the telephone to a customer service representative (representative) located at a remote site who orally inquires from the consumer the information regarding the brand and model of each home electronic device with which the consumer wants to use custom controller. In blocks 1346 and 1348, the consumer also has the opportunity to tell the representative which functions each button of the control surfaces 1302 and 1304 is to perform. In block 1350, the representative enters this information into a computer at the remote site. If the consumer does not have preferences regarding which button of the custom controller is used to perform which functions, in block 1352, the representative does not enter any preferences into the computer and the computer relies on default associations between the buttons and functions that are previously stored in the computer.

Once this information has been entered into the computer, in block 1354 the computer programs the custom programmer in at least two different ways, depending on whether the embodiment of FIG. 58 or 59 is used. If the embodiment of FIG. 58 is used, the computer downloads, through microphone assembly 1334 in either manner described above in connection with the custom programmer and shown in FIGS. 43 and 44, all of the necessary IR codes into RAM 1324 at the addresses associated with the buttons on the keyboard 1320 according to the consumer's expressed wishes. If this method is used, no IR codes need be stored in the ROM of the custom controller when it is manufactured.

If the embodiment of FIG. 59 is used, the ROM 1332 installed into the custom controller at manufacture is programmed with the IR codes of many different brands, models and types of home electronic devices. In this case, the computer downloads, through microphone assembly 1334, the addresses of the ROM for all of the necessary IR codes into RAM 1330 instead of downloading the IR codes themselves.

In an alternative embodiment the ROM 1332 contains default associations between IR codes and buttons of the custom controller, so that these associations need not be downloaded unless the consumer has requested associations between buttons and IR codes that are different from the default associations. This method reduces the amount of data that needs to be sent over the telephone lines from the remote site to the custom controller, but can increase the size and cost of the ROM installed in the custom controller. In the rare case where the IR codes for the device that the consumer wants to control are not included in the ROM, the computer would just download the IR codes themselves for that device as in the first programming method described above with reference to FIG. 58.

It is noted above that in either of the embodiments shown in FIGS. 58 and 59, the microphone and decoding assemblies from either FIG. 43 or FIG. 44 may be used. Preferably, the microphone and decoding assembly in FIG. 44 is used as it is less expensive than the assembly in FIG. 43 that uses a DTMF decoder 1166. The system shown in FIG. 44 utilizes just two single frequency signals rather than many dual frequency signals as in a DTMF system. The first signal, a tone of approximately 3000 Hz, is used to signify a binary "one" and the second signal, a tone of approximately 500 Hz, is used to signify "zero." Since a 500 Hz signal is being used in this embodiment, the bandwidth of the 1000–4000 Hz high pass filter 1168 from FIG. 44 will have to be broadened to include 500 Hz when included in the microphone and decoder assembly 1334.

A series of these two tones are transmitted over the telephone line, representing a binary series. A short period of no signal is included between each tone in the series of tones so that two consecutive 500 Hz or two consecutive 3000 Hz signals are interpreted as two sequential signals and not one long signal. In an alternative embodiment, the series of signal tones are sent at a predetermined clock speed.

A decoder (not shown) is included between the microphone assembly 1334 and the microprocessor 1322 that converts the 3000 Hz signals to high electrical signals and converts the 500 Hz signals to low electrical signals that are sent to a serial input into the microprocessor. A clock signal is simultaneously sent to the microprocessor with each high or low signal.

Alternatively, the initial set-up programmer 1200 could be used to perform the IR code programming of the custom controller 1300 instead of using the microphone/telephone interface.

Figure 61:
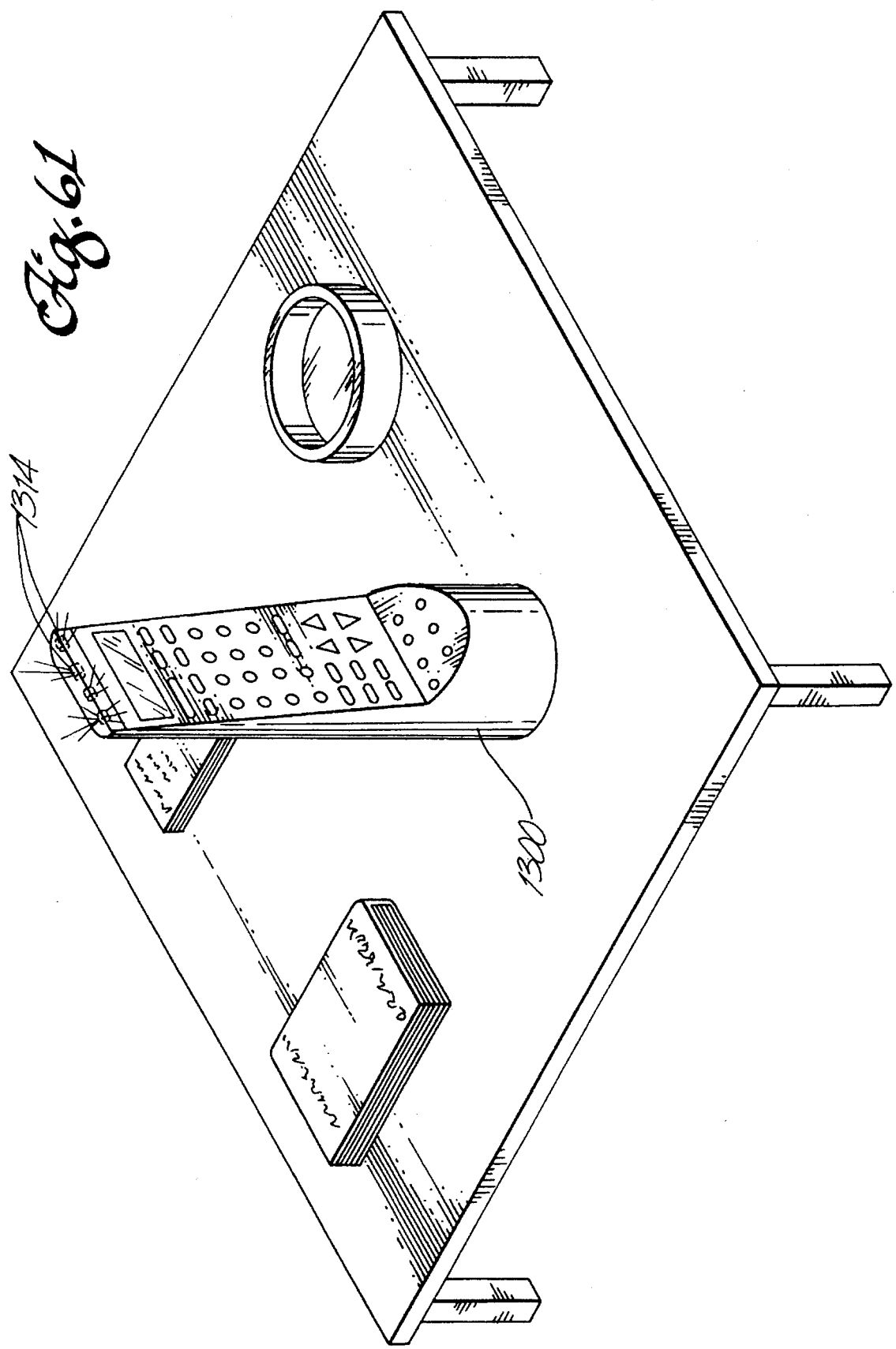
FIG. 61 shows the apparatus of FIG. 53 in its upright position, resting on a coffee table on the apparatus' bottom surface.
Figure 62:
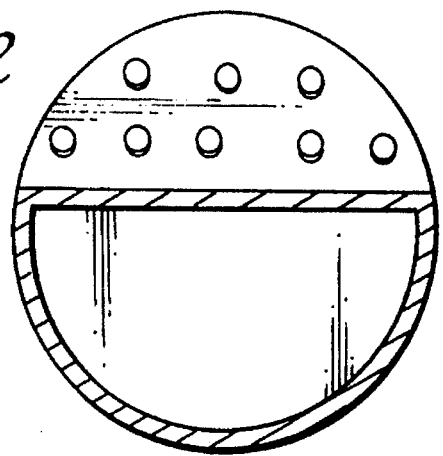
FIG. 62 is a cross sectional view taken along line 7—7 of FIG. 53.
Figure 63:
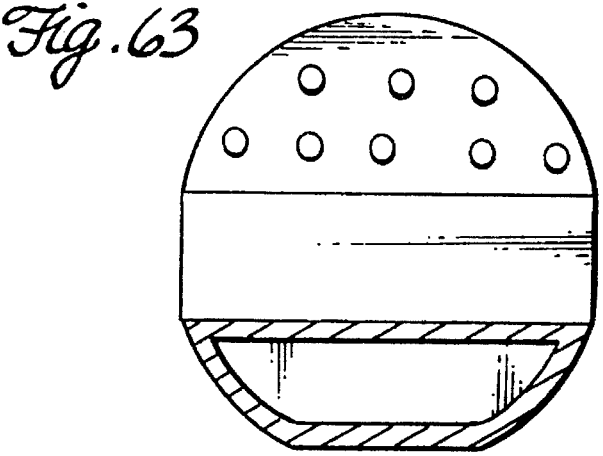
FIG. 63 is a cross sectional view taken along line 8—8 of FIG. 53.
Figure 64:
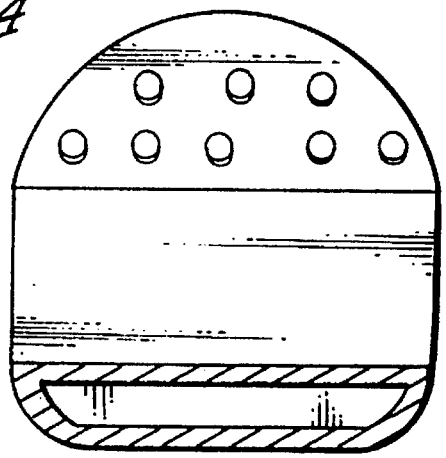
FIG. 64 is a cross sectional view taken along line 9—9 of FIG. 53.
Figure 65:
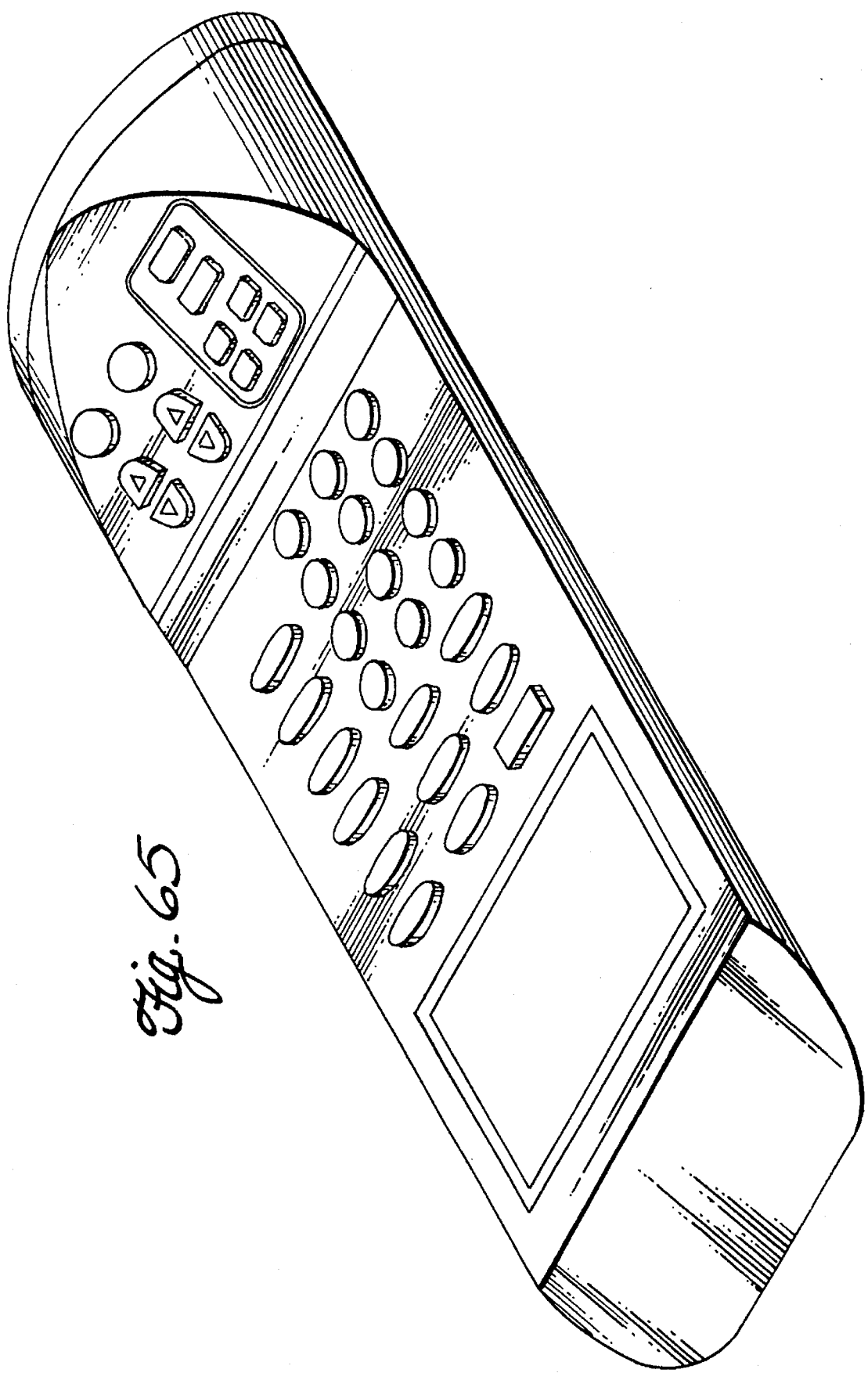
FIG. 65 is a perspective view of an alternative embodiment of the remote control of FIG. 53.
Figure 66:
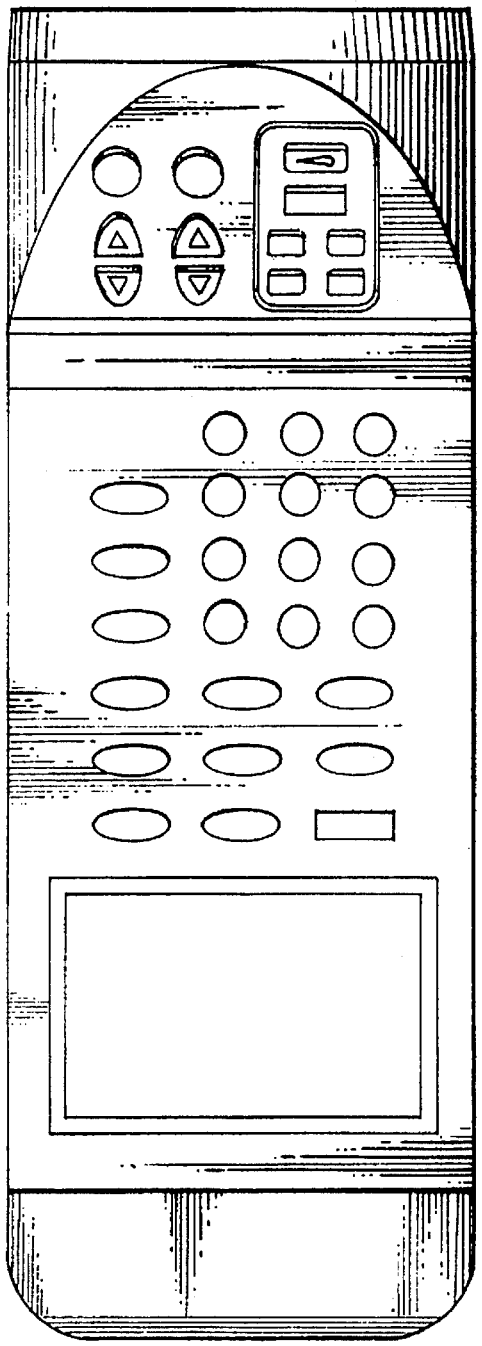
FIG. 66 is a front view of the remote control of FIG. 65.
Figure 67:
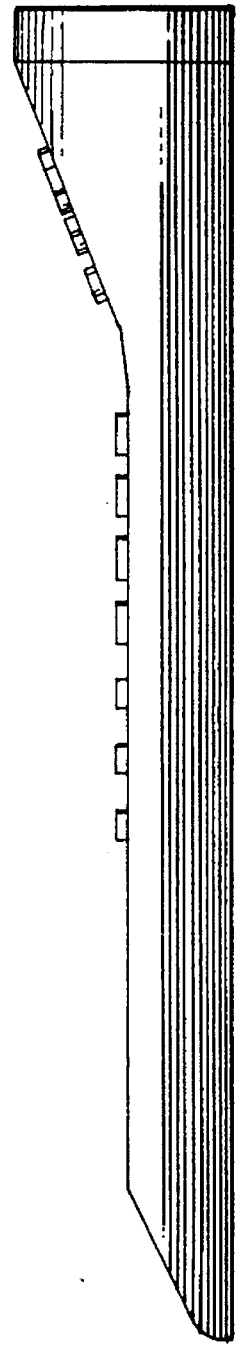
FIG. 67 is a side view of the remote control of FIG. 65.
Figure 69:
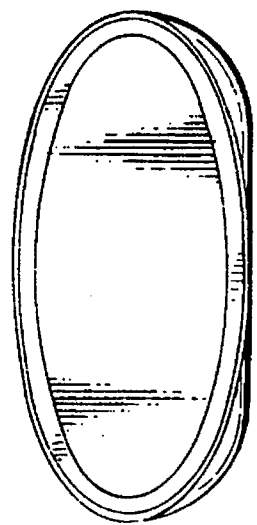
FIG. 69 is a bottom view of the remote control of FIG. 65.
Figure 68:
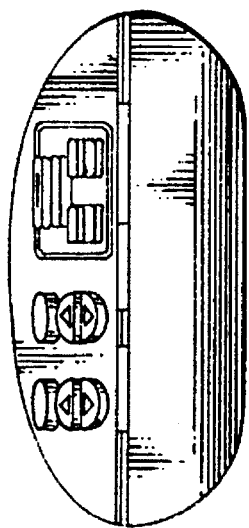
FIG. 68 is a top view of the remote control of FIG. 65.
Figure 70:
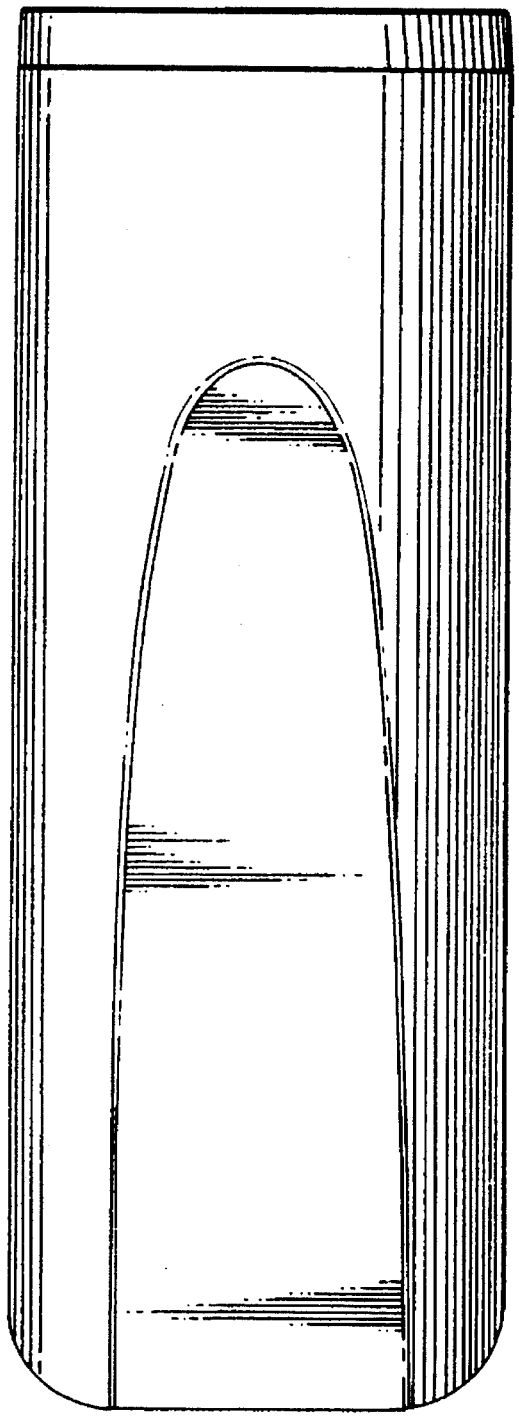
FIG. 70 is a back view of the remote control of FIG. 65.
Figure 71:
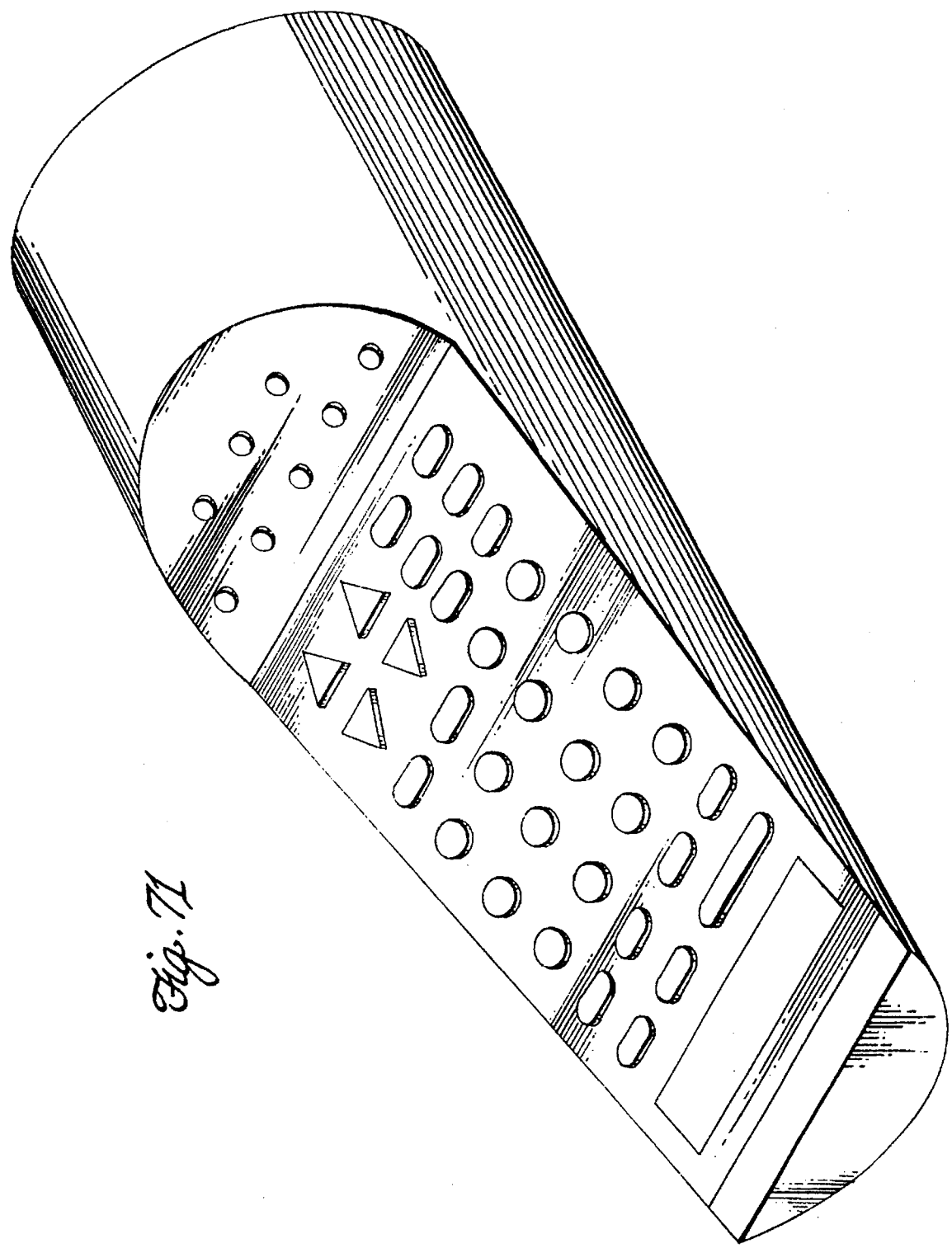
FIG. 71 is a perspective view of a second alternative embodiment of the remote control of FIG. 53.
Figure 72:
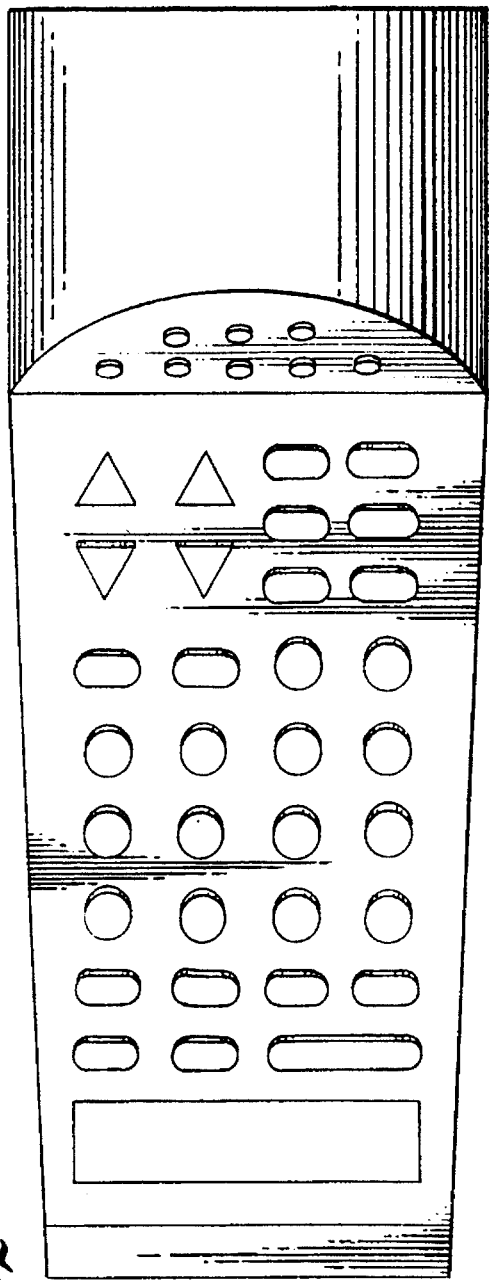
FIG. 72 is a front view of the remote control of FIG. 71.
Figure 73:
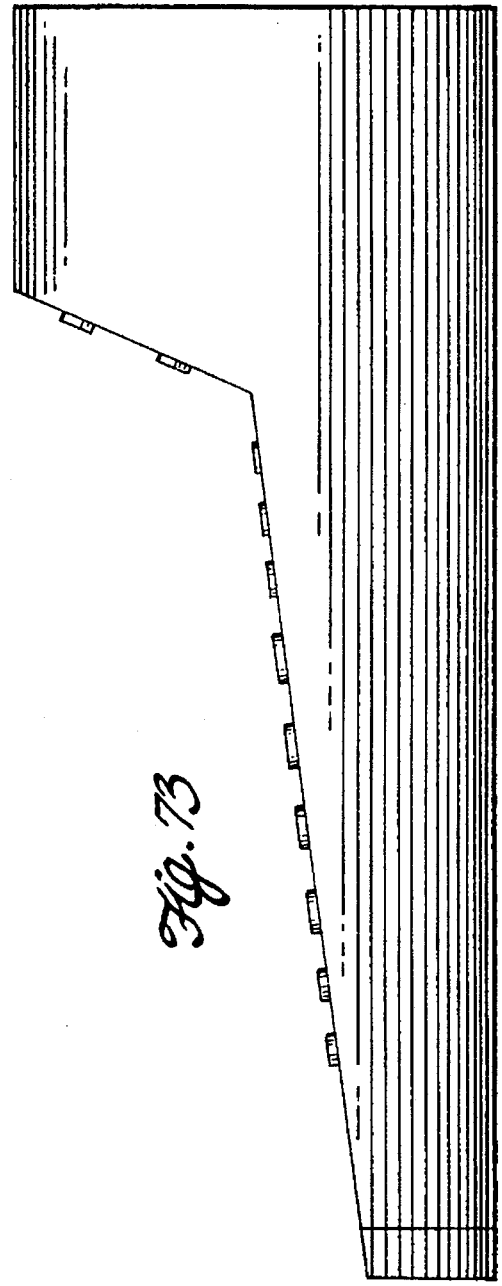
FIG. 73 is a side view of the remote control of FIG. 71.
Figure 75:
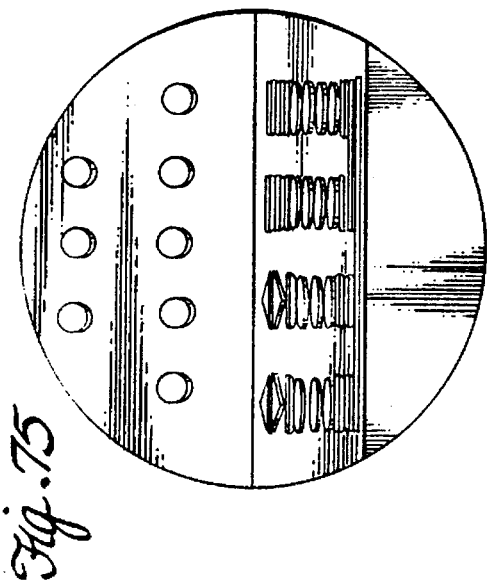
FIG. 75 is a top view of the remote control of FIG. 71.
Figure 74:
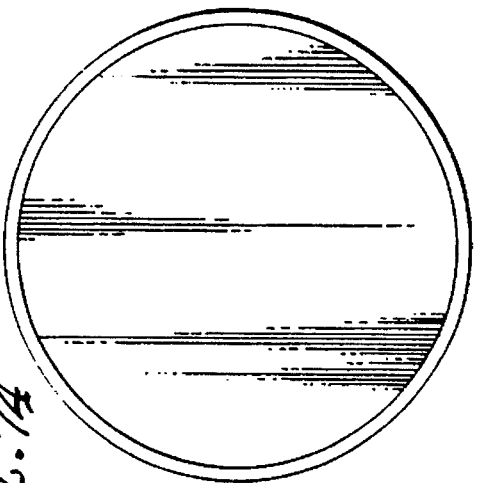
FIG. 74 is a bottom view of the remote control of FIG. 71.
Figure 76:
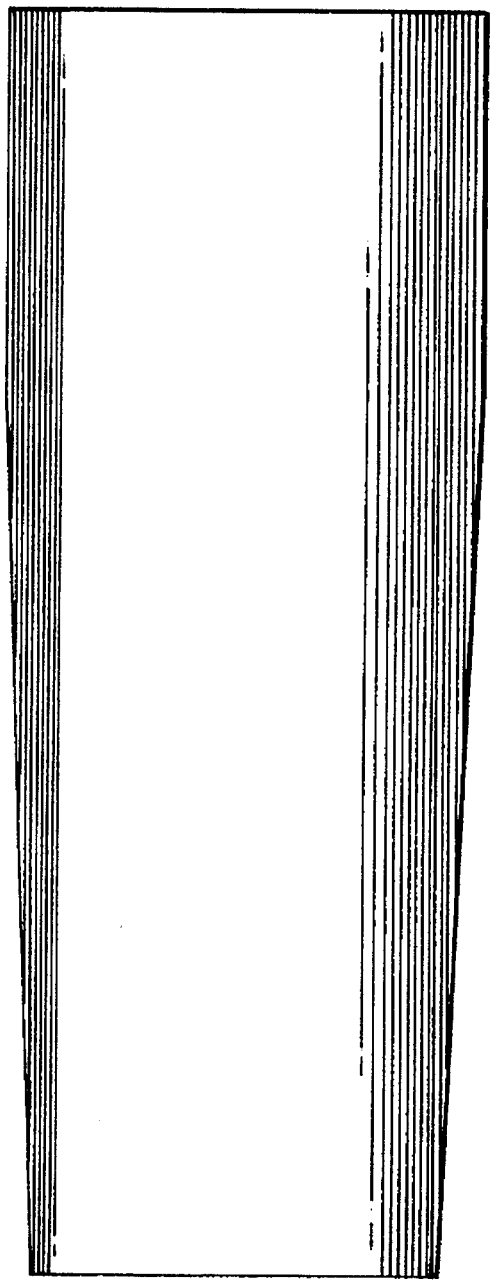
FIG. 76 is a back view of the remote control of FIG. 71.

The custom controller has several additional features. First, the bottom surface 1312 of the custom controller is large enough so that custom controller can be set on this surface as shown in FIG. 61 and resist tipping over. The advantage of being able to stand the custom controller in this upright position is that IR transmitters 1314 are then at a substantial height above the surface on which the custom controller is set. This lessens the probability that pillows, newspapers, magazines or other debris will be inadvertently placed on top of the custom controller as it will be difficult for debris to balance on the top of the custom controller when in the upright position. Further, stacks of pillows, magazines and other debris placed next to the custom controller must be rather high before they will block the IR transmissions of the custom controller. This feature is extremely important because, unlike the instant programmer which can have a permanent holder next to the cable box and VCR, away from magazines and pillows, the custom controller, having full universal remote capabilities, is designed to be used some distance away from the video equipment. Yet, to function properly as an automatic video recorder controller, the IR transmitters of the custom controller need to have a direct line of sight to the IR receivers of the video equipment to be controlled.

The degree of enlargement of the bottom surface 1312 needs to be enough so that the custom controller is stable and resistant to being tipped over when it is put in the upright position shown in FIG. 61. Determining an acceptable size of bottom portion is based on several factors. First, it is usually desirable for the length and the width of the bottom surface to be approximately equal. If the length is significantly greater than the width (as is the case with traditional prior art universal remote controls), the controller can be easily tipped over along the axes that span the width of the bottom surface. Next, the proportion of the height of the controller to the length and width of the bottom surface cannot be too great. A ratio of the length of the bottom face to the height of the controller and of the width of the bottom face to the height of the controller of approximately 3 to 1 or less is usually sufficient. However, this ratio depends on the uniformity of the density of the custom controller and thus the center of gravity. If the upper portions of the custom controller (when it is in the upright position) are more dense than the lower portions, the center of gravity will be high and the ratio of the width and length of the bottom surface will need to be enlarged. On the other hand, if the lower portions are more dense, the center of gravity will be lower and the ratio can be safely reduced. One way the center of gravity is lowered in the custom controller is by placing the batteries 1316, which are comparatively very dense, very near the bottom surface.

Another factor in the stability of the custom controller is the lateral location of the custom controller's center of gravity. The closer the center of gravity is to being directly above the center of the bottom surface when the custom controller is in the upright position, the more stable the custom controller will be. It is noted that the upper portion of embodiment of the custom controller shown in FIGS. 53–58 is off center. This moves the center of gravity away from the center of bottom surface slightly, but adds to the aesthetic appearance of the custom controller.

The shape of the bottom surface is not particularly relevant, but rather the shortest distance across the bottom surface is relevant. On the other hand, the shape of the back surface of the custom controller is significant. Preferably, the back surface is semicircular or substantially semicircular. The closer the back surface is to a semicylindrical shape, the more comfortable the custom controller is for a consumer to hold, as the cylindrical shape fits better into human hands.

Another feature of the custom controller is its two control surfaces 1302 and 1304. Auxiliary control surface 1304 is designed to include buttons that will be used most often when the custom controller is in its upright position, such as volume up and down controls. The angle between the bottom surface and the auxiliary control surface, if extended to intersect, is less than or equal to 45°. Keeping the angle less than or equal to 45° directs at least half of the force needed to press button on the auxiliary control surface downwards into the table or other surface the custom controller is resting on instead of sideways, which would tend to topple the custom controller when it is in the upright position.

Two alternative embodiments of the custom controller 1300 are shown in FIGS. 65–70 and FIGS. 71–76, which show controllers having control surfaces with angles, if extended, relative to the bottom surface of greater than and less than 45°, respectively.

Yet another feature of the custom controller are one touch channel tuning buttons. These buttons would be assigned to a specific television or cable channel such as HBO, ESPN, CNN or MTV. For example, if a button is assigned to CNN, when the CNN button is pressed, the custom controller transmits IR codes to change the channel on a television, VCR, cable box or satellite receiver to the channel number on which CNN is broadcast. When the consumer sets up the custom controller, he or she tells the representative what channels he or she watches the most and the representative directs the computer to have selected keys on the custom controller be programmed to tune these channels. The consumer tells the representative which keys on the custom controller he or she wishes to tune to which channels, or the representative can select the keys. After the keys and channels have been selected, the consumer then writes the channel names next to the keys that tune them or labels with different channel names can be supplied which are then applied to the custom controller next to the appropriate buttons. These one touch tuning buttons are particularly well suited to being programmed as buttons on the auxiliary control surface, so that the consumer can operate these buttons without having to pick up the custom controller.

Figure 77:
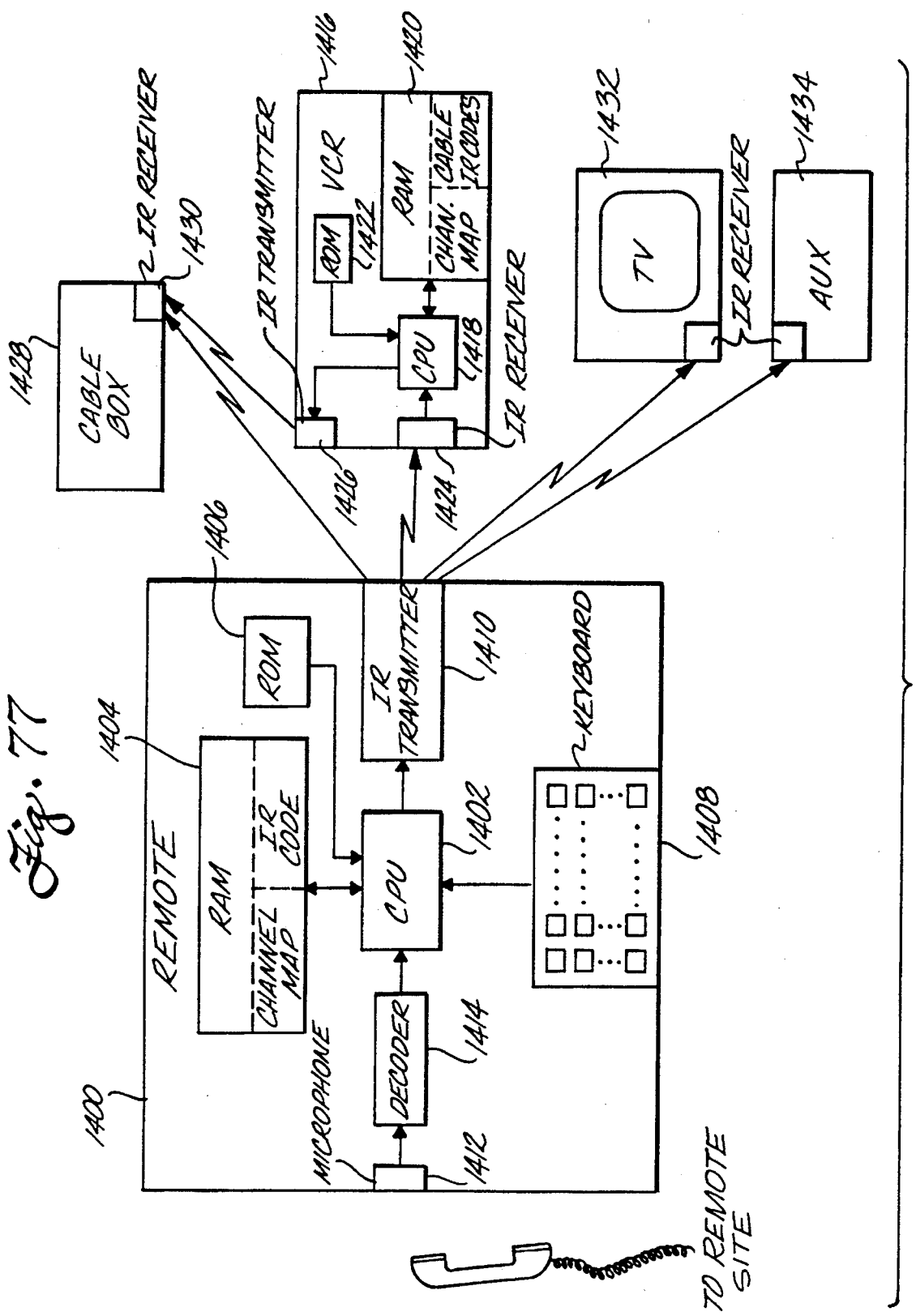
FIG. 77 is a block diagram of a system for downloading initial setup data from a remote site, through a remote control, to a video recorder capable of controlling other devices, according to a preferred embodiment.
Figure 78:
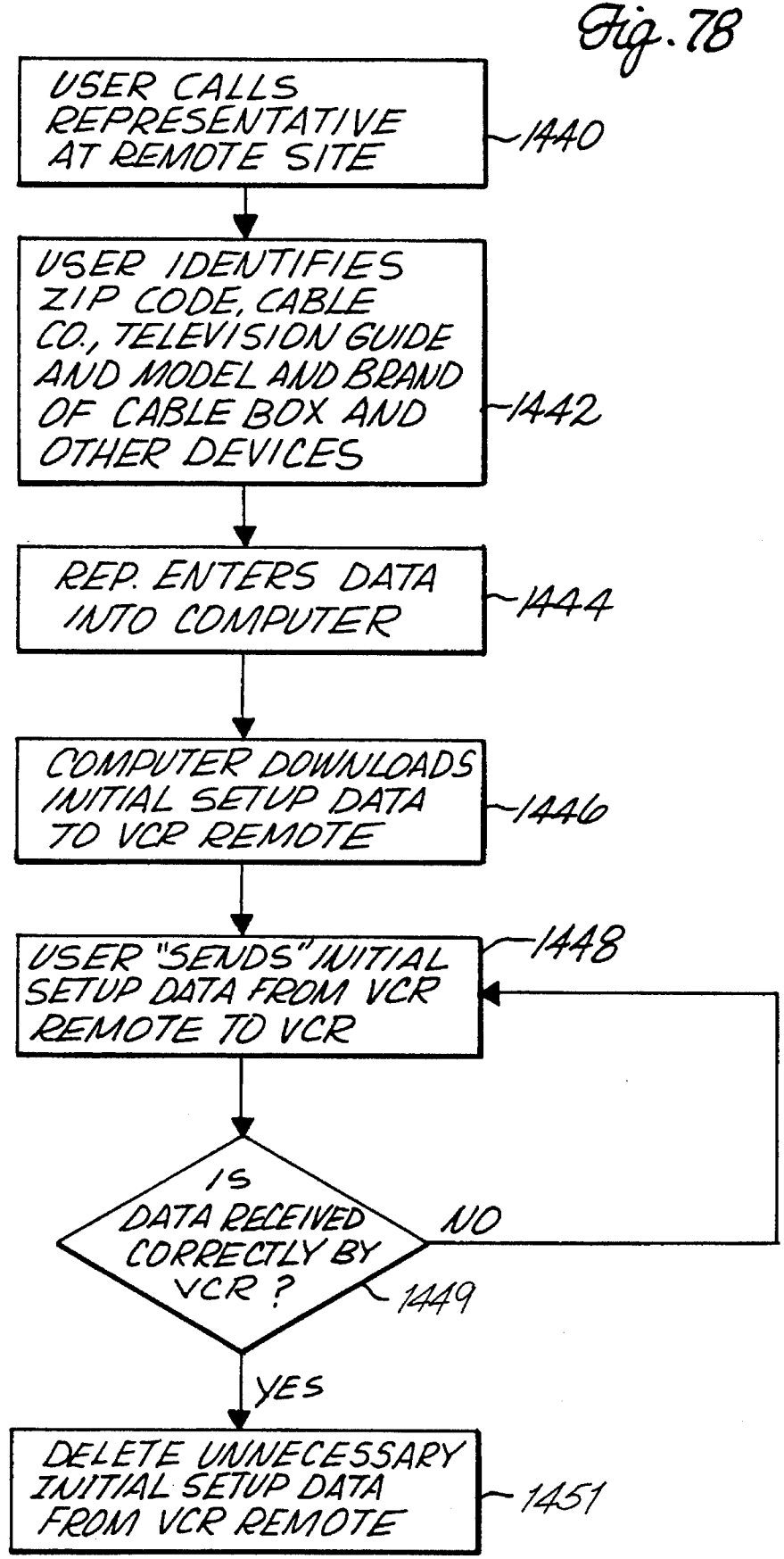
FIG. 78 is a flow diagram of a method for downloading initial setup data from a remote site, through a remote control, to a video recorder, according to a preferred embodiment.

Another embodiment, shown in FIGS. 77–78 is an alternative embodiment to the embodiment shown in FIG. 33. An initial setup routine must be performed on the VCR in the embodiment in FIG. 33 similar to that which must be performed on the instant programmer 300. This consists of entering, into the VCR, the local channel map, the current time and an identification of the cable box, television or satellite receiver that is to be controlled by the VCR. In the embodiment of FIG. 33, this initial setup is performed manually by the user in the same manner as for the instant programmer by pressing a series of keys on either the VCR itself or the television remote control 956 used to control VCR. In this embodiment shown in FIG. 77, the television remote control from FIG. 33 is replaced with an auto-programming VCR remote control 1400 ("VCR remote"). The VCR remote includes a CPU 1402, RAM 1404, ROM 1406, keyboard 1408 and an IR transmitter 1410 that are typical for IR remote control units. Further, the VCR remote includes a microphone 1412 and an audio signal decoder 1414. The microphone and decoder can be either of the embodiments 1166 or 1168–1170 shown in FIGS. 43 and 44.

As with the custom controller described above, the signal conditioner comprised of 1166, 1168 and 1170 in FIG. 44, and 1334 in FIGS. 58–59 is preferred as the more economical embodiment. The signal conditioning can be as simple as some amplifiers. The audio signals received by the microphone are sent through the signal conditioner to a serial port of the CPU 1402 in FIG. 77, which performs the DTMF decoding function.

In the preferred embodiment, the alternative VCR remote 1400 is a also a universal remote such as custom controller 1300 with all of the structure and functions of the custom controller. Thus, the VCR remote is capable of controlling the cable box 1428, VCR 1416, television 1432 and any other auxiliary home electronic equipment that is IR remote controllable 1434

A significant advantage of the VCR remote control is that the data required to be entered into the VCR 1416 for the initial setup can initially be downloaded from a remote site by telephone to the VCR remote control. To do this, the consumer calls the remote site by using the telephone, and orally gives the information necessary to perform the initial setup to a person at the remote site. The person at the remote site then instructs the consumer to place the telephone earpiece near the microphone of the VCR remote and the initial setup is downloaded. Thereafter, the user easily causes the data to be downloaded by IR transmission from the VCR remote control to the VCR itself by pressing a "send" key or a "send" sequence of keys. The VCR receives the initial setup data, stores it in its memory 1420 and then is ready to be used as an instant programmer.

Figure 79:
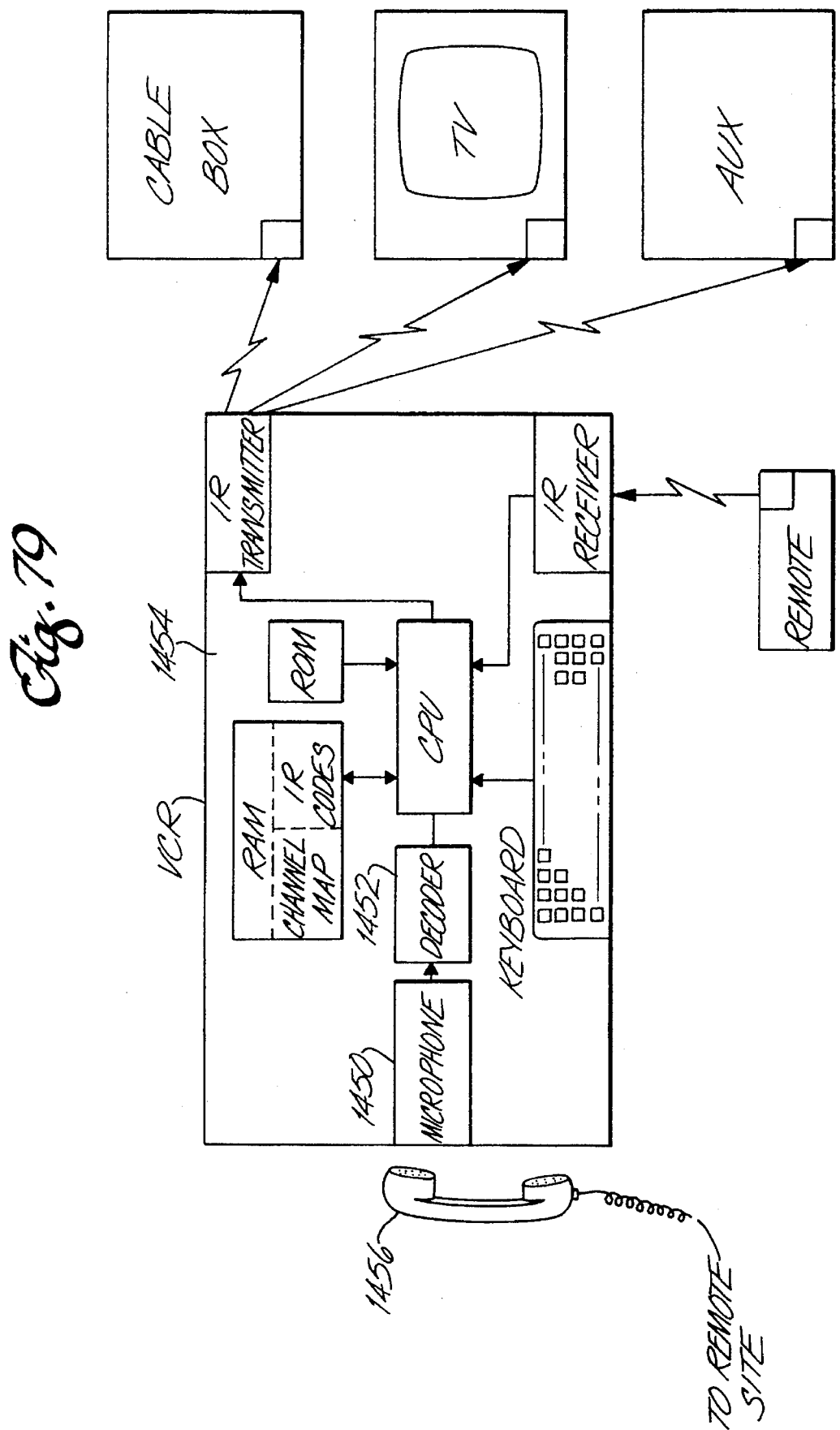
FIG. 79 is a block diagram for an alternative embodiment of the system shown in FIG. 77.

In an alternative embodiment, shown in FIG. 79, the structural elements of the custom programmer 1100 shown in FIGS. 40–44, including a microphone 1450 and decoder 1452 are embedded within a VCR 1454 instead of being embedded in the VCR as shown in FIG. 33. The decoder 1452 can just be a signal conditioner, as described above for FIG. 77, with the CPU performing the DTMF decoding function. In this embodiment, the user holds the telephone earpiece 1456 to the microphone embedded in the VCR to download the initial setup data directly from the remote site into the VCR. The difficulty with this embodiment is that often a user's VCR and telephone are not located close enough together to position the telephone earpiece near the VCR. Further, correction of this problem, which would involve adding an extension cord to the telephone or disconnecting and relocating the VCR nearer the telephone are not convenient.

Figure 80:
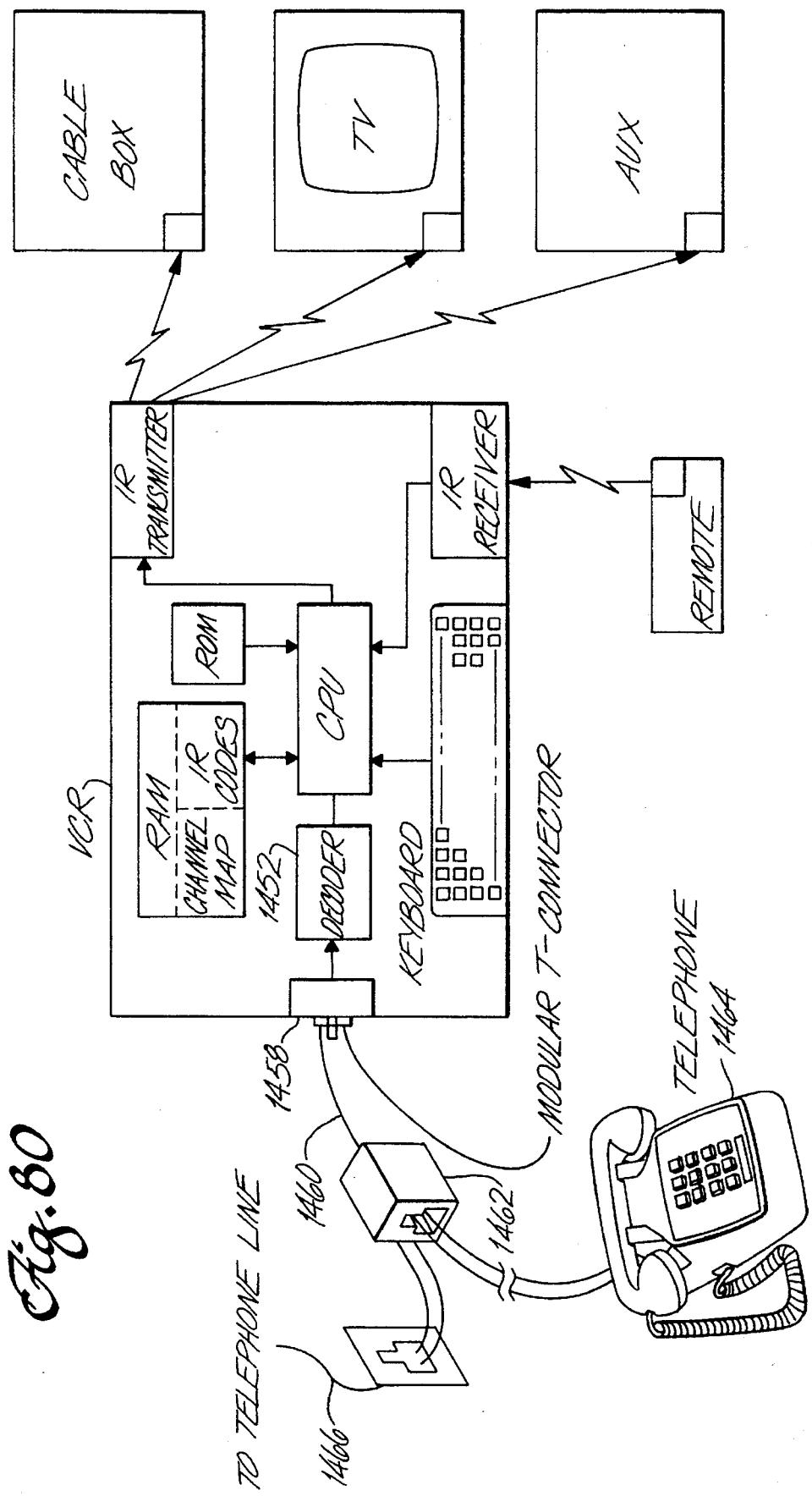
FIG. 80 is a block diagram for an alternative embodiment of the system shown in FIG. 77.

In another embodiment, shown in FIG. 80, the microphone in the VCR with custom programmer embedded is replaced with a modular phone jack 1458 that leads directly to the decoder assembly 1452 in the VCR. A standard telephone line 1460 would then connect the VCR to a modular T-connector 1462 so that both the VCR and an independent telephone 1464 are connected to the telephone line 1466. The consumer then uses the telephone to call and talk to the remote site, but the data is transmitted directly to the VCR. The transfer of data by this method may be more accurate than transmission by audible tones. However, this embodiment suffers from the same problem of the proximity of the consumer's phone outlets to the VCR.

With the embodiment shown in FIG. 77, though, the proximity of the VCR to a consumer's telephone or telephone jack is not important. The consumer simply carries the remote to his or her phone and gets the initial setup data downloaded into the VCR remote. The consumer then carries the remote to a location near the VCR and downloads the initial setup data to the VCR.

In another embodiment, the VCR remote, shown in FIG. 77, operates as a relay station, translating the audio signals from the telephone directly into the IR pulses beamed at an appliance, such as a VCR or a TV.

Figure 81:
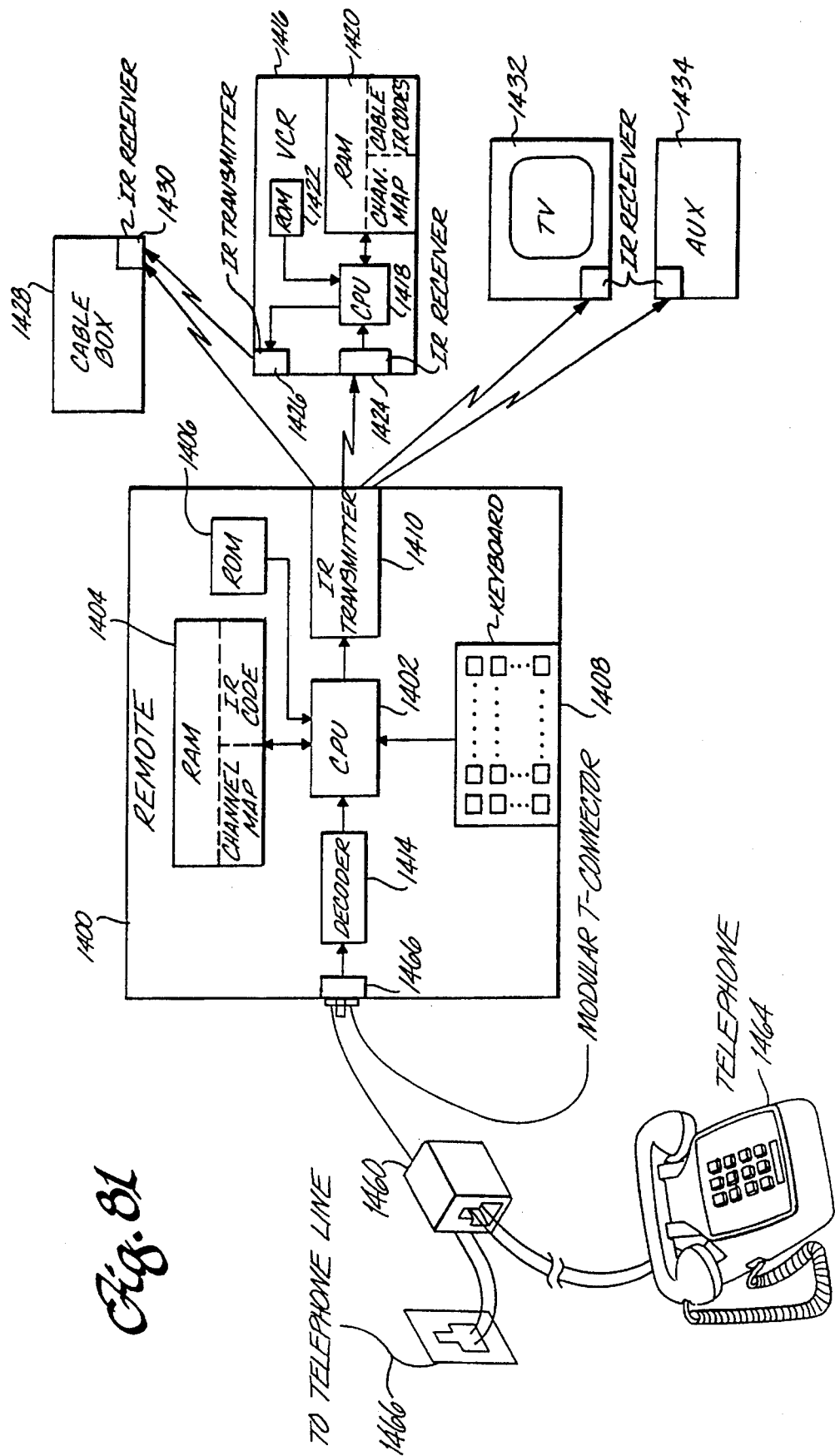
FIG. 81 is a block diagram for an alternative embodiment of the system shown in FIG. 77.

Another embodiment, shown in FIG. 81, is to install a modular jack 1466 into the VCR remote 1400. In this embodiment, the VCR remote is connected to the telephone by a T-connector 1468 and operates in the same way as the VCR with a built in modular jack described above and shown in FIG. 80 except that after the initial setup data is transferred to the VCR remote, the VCR remote is placed near the VCR and the initial setup data is downloaded by IR transmission to the VCR. One advantage that this embodiment has over the VCR with a built in modular jack is that the VCR remote can be taken to the telephone whereas the VCR may be located far from the telephone. It is also possible to add a DTMF generator to the VCR remote so that the keypad 1408 of the VCR remote can be used to dial the telephone number of the remote site. Alternatively, telephone numbers for the remote site are stored in the memory of the VCR remote so that the consumer may dial the remote site by pressing a minimum number of keys.

The details of the operation of the VCR remote are as follows. In the first step, shown in block 1440 of FIG. 78, the consumer places a telephone call on either an 800, 900 or normal toll call line to a customer service representative. In block 1442, the representative inquires from the consumer information necessary to perform the initial setup, such as the consumer's ZIP code or the name of the consumer's cable company, the television guide that consumer uses, the brand and model of the consumer's cable box (it is sometimes possible to deduce this data from the ZIP code or cable company name data) and the brand and model of the consumer's VCR. As with the initial setup of the custom programmer, the channel map and cable box IR codes can be determined from this data. If the VCR remote control is also a universal remote control, the representative inquires as to the brands and models of any other IR controllable home electronic equipment that the consumer may wish to control with the VCR remote control.

Once the channel map and IR code data to be downloaded have been identified in block 1442, the initial setup data, including the channel map, IR code data and the current time, including the date, is downloaded over the telephone line to the VCR remote control. In the preferred embodiment, the initial setup data is generated by a computer at or connected to the representative's location, transmitted over telephone lines, received by the VCR remote control's microphone or modular phone jack and decoder, and stored into RAM 1404 by CPU 1402.

In block 1448, the consumer presses a "send" key or a sequence of keys that triggers the transmission of the initial setup data through the IR transmitter to the VCR's IR receiver. If the VCR remote control is a universal remote, the IR codes for IR controllable devices other than the cable box are preferably not transmitted to the VCR as they are used by the VCR remote control itself, not the VCR. The data is stored by the VCR's CPU into the VCR's RAM.

In an alternative embodiment, the VCR remote control's IR transmitter is not a multi-directional or wide angle IR transmitter. The more expensive multi-directional or wide angle IR transmitters are not necessary because the IR transmitter is not used to transmit IR signals when the VCR remote control is set on a table or on top of the cable box or VCR.

In any case, in the preferred embodiment, a multi-directional or wide angle IR transmitter is retained to increase the likelihood of the successful downloading of all of the initial setup data. Although the quantity of the initial setup data is not tremendous, it is substantial. Thus, an uninterrupted IR stream of a significant duration is required to reach the VCR from the VCR remote control. The more diverse the radiation of IR signals is, the more likely it is that all of a stream of IR signals will reach the IR receiver in the VCR, either directly or by reflection.

For preexisting VCRs with a built in instant programmer and IR transmitter that were made before the present VCR remote control, that can also have their initial setup performed through the use of a remote control, the VCR remote control can be programmed, either with a program stored in ROM at manufacture or by telephone into RAM, to use the preexisting VCRs own protocol for initial setup using a remote control. In other words, the VCR remote control is programmed to mimic a consumer using the VCR's original remote control to perform the initial setup.

In VCRs designed specifically for use with the VCR remote control, a special protocol, designed to reduce the length of the IR transmission sent to the VCR is used. In an alternative embodiment, part of this special protocol includes using a receipt confirmation signal combined with known error detection and/or error correction schemes to assure the reception of the entire stream of initial setup data by the VCR. Known error detection schemes that can be used include using a parity check bit in every byte of data and embedding a code at some point in the data stream that indicates the length of the entire data stream. The use of these and other known error detection and correction schemes allows the VCR to verify whether the complete stream of error free initial setup data was received. If it is verified that the data received is correct and complete, the VCR can produce an indication, either audio or visual, that the initial setup data was successfully received. If it is not verified that the data received is correct and complete, the VCR either gives no indication or produces a second indication to indicate an unsuccessful transmission. Upon an unsuccessful transmission, the consumer adjusts the position of the VCR remote control relative to the VCR and retransmits the initial setup data.

Another alternative is to provide modular telephone jacks in both the VCR and the VCR remote control for downloading the initial setup data from the VCR remote control to the VCR. This embodiment provides for more error free transmission of the initial setup data, but forces the consumer to connect, disconnect and store the cable that links the VCR remote control and the VCR.

Yet another alternative is to include in the VCR a microphone and decoder assembly similar to the microphone and decoder assembly 1412–1414 in the VCR remote control. An encoder and speaker (not shown) are then added to the VCR remote control. With this alternative embodiment the initial setup data is transmitted from the VCR remote control to the VCR using the same type of audio signals as used to download the initial setup data over the telephone lines to the VCR remote control. When the consumer is ready to transmit the initial setup data from the VCR remote control to the VCR, he or she simply holds up the speaker of the VCR remote control to the microphone of the VCR and presses the keys necessary to trigger transmission. In the preferred embodiment of this alternative, with current speaker and microphone technology, the speaker and microphone on the VCR remote control can be combined into a single microphone/speaker component.

In the downloading process of blocks 1446–1451 of FIG. 78, the channel map data and IR code data for the VCR is transmitted and stored into the RAM of the VCR remote control first. Thereafter the data is retransmitted to the VCR and stored into the RAM of the VCR. After transmission to the VCR of the channel map data and IR code data for the VCR is completed, the channel map and IR code data for the VCR is erased from the RAM in the VCR remote control. If IR code data for use by the VCR remote itself is initially downloaded with the channel map data and IR code data for the VCR, this data is, of course, not erased from the RAM in the VCR remote control.

As described above in reference to the custom controller 1300, shown in FIGS. 53–76 and particularly FIGS. 58 and 59, the IR codes for control of the cable box and other remote controllable electronic equipment that are downloaded over a telephone line to the video recorder, either directly or via a VCR remote, are stored in different ways in different alternative embodiments. Thus, IR codes for numerous cable boxes and other devices can be stored in the ROMs of the video recorder and the VCR remote with the addresses of the IR codes for a particular cable box or other device being downloaded to the RAM of the video recorder or VCR remote. Alternatively, the IR codes themselves can be downloaded to the RAM of the video recorder or VCR remote.

The invention as shown in the various embodiments of the VCR remote 1400 can readily be used with televisions, cable boxes, satellite receivers or other components that contain remote control transmitters. The only differences in operation in these alternate configurations are the IR codes and downloading protocols that the VCR remote uses. However, the VCR remote as described above is capable of having these codes and protocols downloaded by telephone along with the initial setup data.

In all of the embodiments presented in FIGS. 40–81 and the accompanying description, the example given of the type of data being downloaded to the custom programmer 1100, initial setup programmer 1200, custom controller 1300, VCR with built in IR transmitter and direct telephone input (FIGS. 79–80) and VCR remote 1400 (collectively, the "telephone downloadable programmers") is initial setup data. This initial setup data includes IR codes or IR code addresses for the remote control of other electronic equipment, local channel maps and the current time. In an alternative embodiment to all of the telephone downloadable programmers, shown in FIGS. 82–83, in addition to initial setup data, data representing programs that are desired to be recorded or viewed may be downloaded to the various telephone downloadable programmers. For any of the telephone downloadable programmers, the downloaded data representing a program to be recorded is in the form of the actual values of the channel, date, time-of-day and length of the program. Alternatively, for those telephone downloadable programmers that also perform the functions of the instant programmer 300, the data downloaded, representing a program to be recorded or viewed, is in the form of a compressed code or G-code, which contains the channel, date, time-of-day and length of the program.

Figure 82:
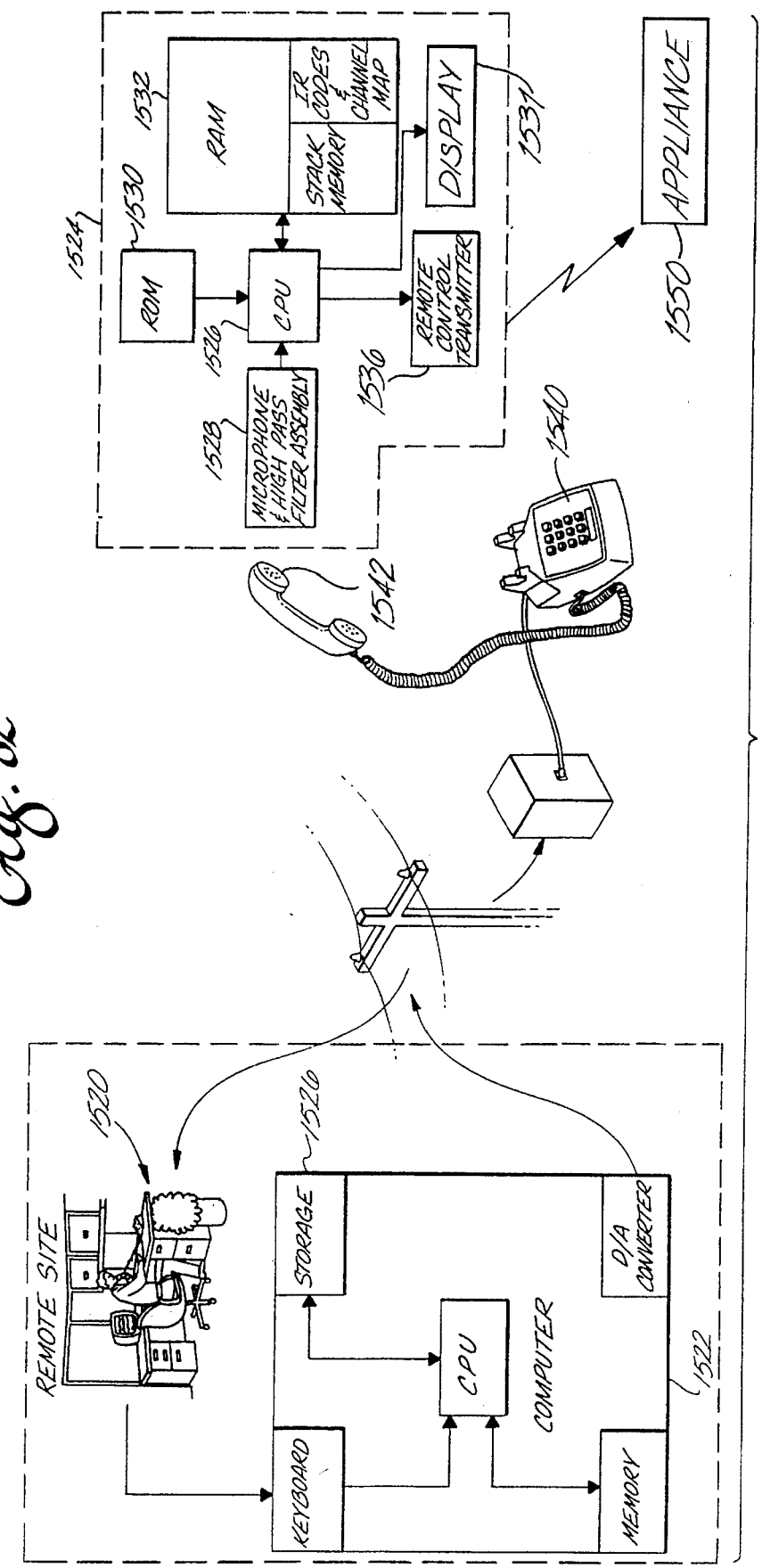
FIG. 82 is a diagram of a system for downloading television program data to a telephone downloadable programmer for control of video recorders and channel selectors.
Figure 83:
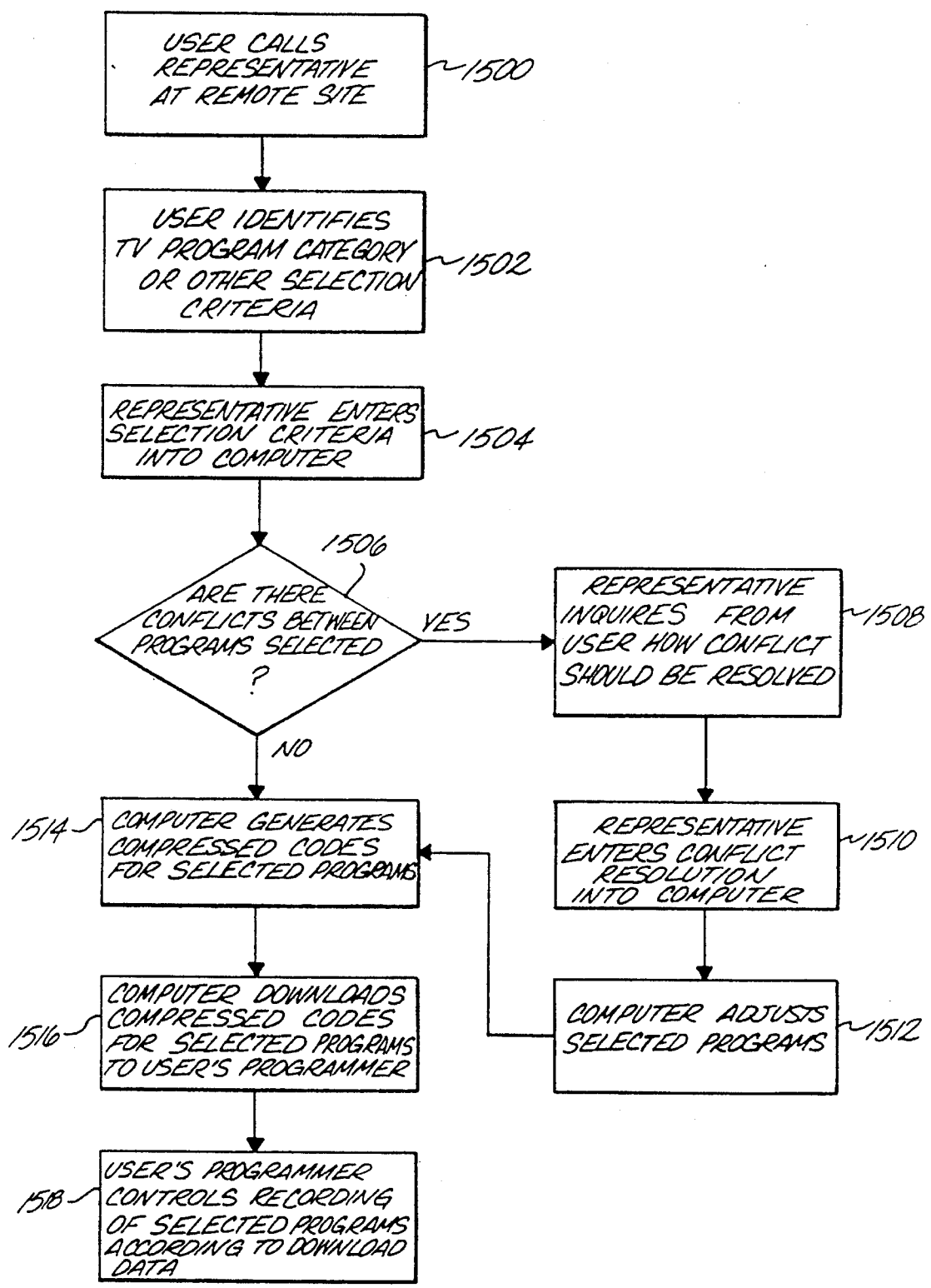
FIG. 83 is a flow diagram showing the operation of the system shown in FIG. 82.

The physical configuration of this embodiment for downloading program information is shown in FIG. 82. FIG. 83 shows a flow diagram of the process of selecting and downloading program information according to this embodiment. In block 1500, the user calls a customer service representative 1520 located at a remote site on the telephone, either on a pay-per-minute or pay-per-call 900 number, toll-free 800 number or regular toll number. In block 1502, the user orally tells the representative either specific shows that the user wants to record or a more general description of a type of show to be recorded or viewed. Such general descriptions include the type of show, such as situation comedies, dramas, action shows, mysteries, police or detective shows, real life rescue, emergency or police shows, game shows, news magazines, daily news programs, documentaries, sports events, movies, etc. The general descriptions further include more specific descriptions such as movies or shows starring a particular actor or actress or directed by a certain director (e.g. "all Humphrey Bogart movies"), sporting events involving a particular team and/or a particular sport (e.g. "all U.C.L.A. basketball games"), a show that may be on multiple times a week on different channels (e.g., "all episodes of 'I Love Lucy' on this week").

In block 1504, the representative enters the information given by the user in block 1502 into a computer 1522. The computer includes a large database of television programs to be broadcast in the future, stored in mass storage 1526, such as a hard disk. The computer then searches the database for television programs that match the information entered by the representative and retrieves the channel, date, time-of-day and length data for each program matching the information entered. In block 1506, the computer automatically checks the date, time-of-day and length data for all the programs retrieved in the database search for time conflicts between programs that overlap each other.

If there is a time conflict, the computer alerts the representative that there is a time conflict and the programs that are involved. In block 1508, the representative informs the user of the time conflict and the programs that are conflicting. The user then decides which of the conflicting programs he or she wishes to record or view. Alternatively, the user chooses to have only the non-conflicting portion of a program that partially conflicts with another program recorded or viewed to avoid the conflict. For example, if two programs are selected that both begin at 8:00 pm on Sunday, but one lasts one hour and the other lasts two hours, the user can choose to record the one hour program and the second hour of the two hour program. The user tells the representative how to resolve the conflict and, in block 1510, the representative enters this information into the computer, which adjusts the selected programs accordingly, in block 1512.

In one embodiment, in block 1514, the computer converts the channel, date, time-of-day and length of each of the programs remaining after the search of the database and after resolving time conflicts, if any, into G-codes for use by downloadable programmers that perform the functions of the instant programmer 300. Such a programmer is representatively shown by dotted line 1524 with the programmer 1524 having a CPU 1526, a microphone and high pass filter 1528 (similar to programmer 1100 as shown in FIG. 44), a random access memory (RAM) 1532, which includes a stack memory for storing the CDTL information, a ROM 1530, a remote control transmitter 1536 (which is usually an infrared emitter) and a display 1531. In block 1516, the computer downloads the G-codes over a telephone line to a telephone downloadable programmer 1524 that performs the functions of the instant programmer 300.

In another embodiment, the blocks 1514 and 1516 are replaced by a block (not shown) in which the computer downloads data representing the channel, date, time-of-day and length of each of the programs selected by the search of the database and modified to resolve time conflicts, if any, over a telephone line to any telephone downloadable programmer, such as programmer 1524.

After program data is downloaded to a telephone downloadable programmer, and decoded into channel, date, time-of-day and length if G-codes were downloaded, the CDTL data is stored into the memory of any of the telephone downloadable programmers, such as stack memory of RAM 1532, in the same manner such program data is stored into the stack memory 76 of FIG. 12, of the instant programmer 300 after it is decoded from a G-code as described above. After the program data is stored in memory, the control of the recording of the programs according to this data is performed in same manner as performed by the various telephone downloadable programmers described above.

In an alternative embodiment, the program data is downloaded to the telephone downloadable programmers for control of a television or cable box only, rather than for control of a video recorder. With this embodiment, the user is able to use a telephone downloadable programmer to simply change the channel of his or her television or cable box to assure that an important show is not missed because the user forgets what time it is or becomes engrossed in another show or simply because the user does not want to bother having to change channels manually.

The format of the database file to store the great amount of information about the future television broadcasts of television programs and the database program used to manipulate and search the database file can be any well known database format and corresponding database engine. In the preferred embodiment, the database format used consists of a series of records, each consisting of a predetermined set of fields that is the same as the set of fields in every other record in the database. Each television program corresponds to one record of the database. Each record contains fields for the title, channel, date, starting time-of-day and the length of the program. Further, each record includes a series of boolean fields, each field representing a certain category of television program, such as situation comedy, romantic movie, sports program, etc. The advantage of this embodiment is that many different categories may be easily represented and searched, while taking up little space. This embodiment takes up little space because even though there may be over a hundred different category fields, a boolean field usually takes up only one bit or at most one byte of space for each record in most database file formats. The small size of each category field also facilitates rapid searching through the database for all the programs in a certain category. This embodiment also allows for multiple overlapping categories. For example, the database may have separate category fields for crime subject matter, comedy, and fiction. One television program may be a fictional comedy about crime, thus containing a "true" value in all three category fields. On the other hand, a program may be a real life drama about crime which only would contain a "true" value in one of these category fields, viz. the crime subject matter field.

In addition to the boolean category fields, each record includes several "people" fields. The contents of the "people" fields include characters in the program, actors and actresses, directors and writers involved with the creation of the program. Thus, if a user desires to program all programs involving certain people, be they characters, actors or creators of the program, the computer can search the "people" fields for this information. Alternatively, there can be separate fields for characters, actors and actresses, and creators of programs.

Each record also includes fields devoted to the violence and sexual content of the television program. In the case of motion pictures, a field for the rating by the Motion Picture Association is utilized. In every record, boolean fields for such descriptions as mild violence, explicit violence, brief nudity, nudity, profanity, adult situations, and sexual theme are included. Thus, programs can be selected or excluded from a search based on such general content information.

Each record of the database also includes an abstract that contains a brief description of the program. This allows a more detailed and extensive search, albeit more time consuming, of specific program content by searching all of the abstract fields for certain keywords or combinations of keywords.

Figure 84A:
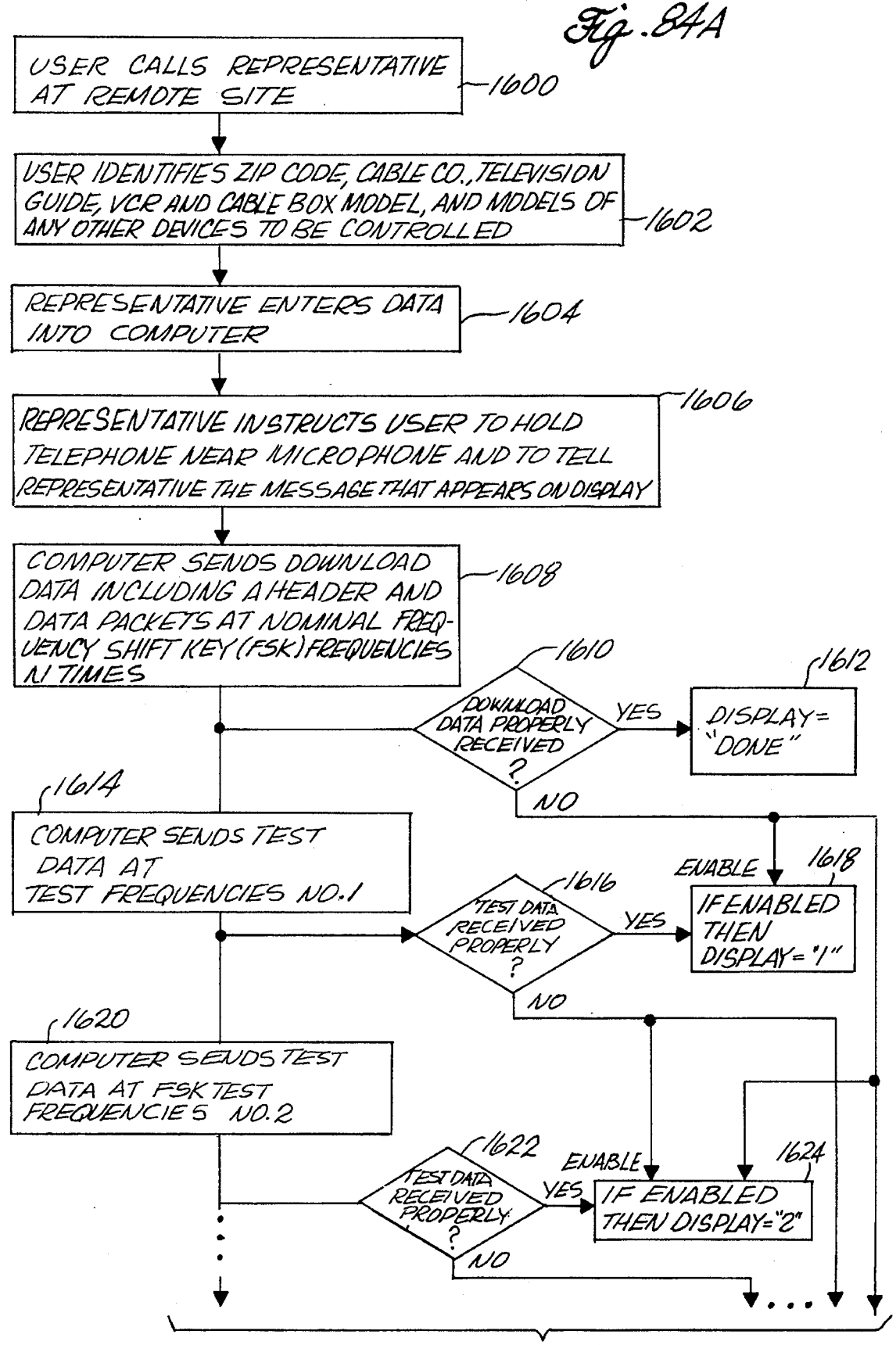
FIGS. 84A and 84B are flow diagrams showing a method by which the download of the initial setup data over the telephone to an instant programmer is improved by testing the effectiveness of the communication path and adjusting the frequencies for transmitting the initial setup data.
Figure 84B:
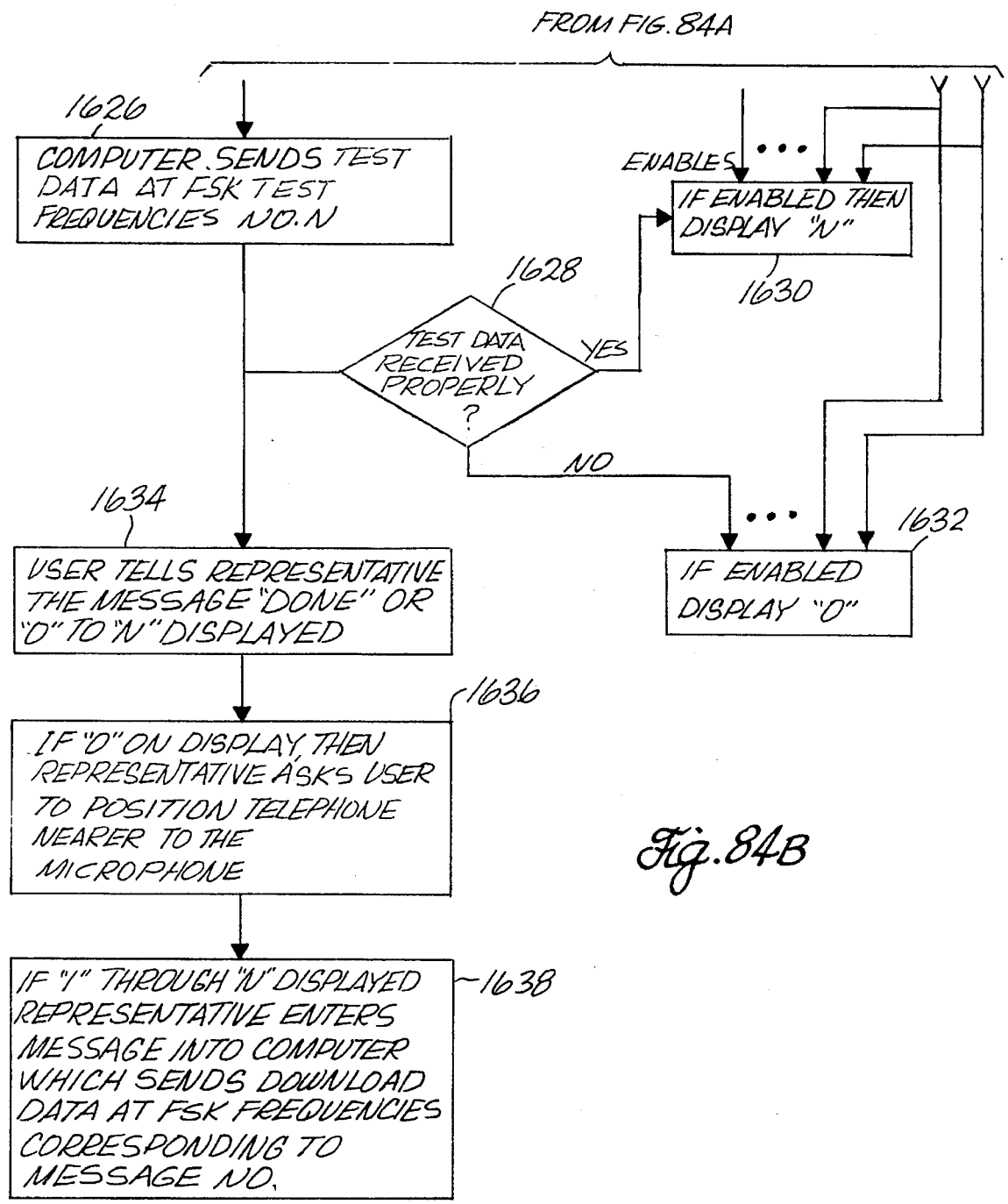

In an alternative embodiment, a method, as shown in FIGS. 84A and 84B, is provided by which the download of the initial setup data over the telephone to an instant programmer is improved by testing the effectiveness of the communication path and adjusting the frequencies for transmitting the initial setup data. The physical configuration of this embodiment for downloading program information is shown in FIG. 82, which shows a representative at a remote site 1520 communicating via telephone to the user's telephone 1540. The user holds the telephone earpiece 1542 in proximity to the microphone 1528 on instant programmer 1524. If the data is properly received then it is loaded into RAM 1532. The data or a portion of the data can be sent to appliance 1550 via the remote control transmitter 1536, which can be implemented as an infrared emitter.

In this application the term appliance includes televisions, cable boxes, satellite receivers, VCRs, stereos, thermostats for heaters, washing machines, drying machines, ovens, stoves, kitchen appliances, FAX machines, computers and other similar appliances including any remote controller for the various appliances. For example, a VCR may receive initial setup data or programming information from the instant programmer that is initially sent to the instant programmer via the telephone earpiece held in proximity to a microphone built into the instant programmer.

Figure 85:
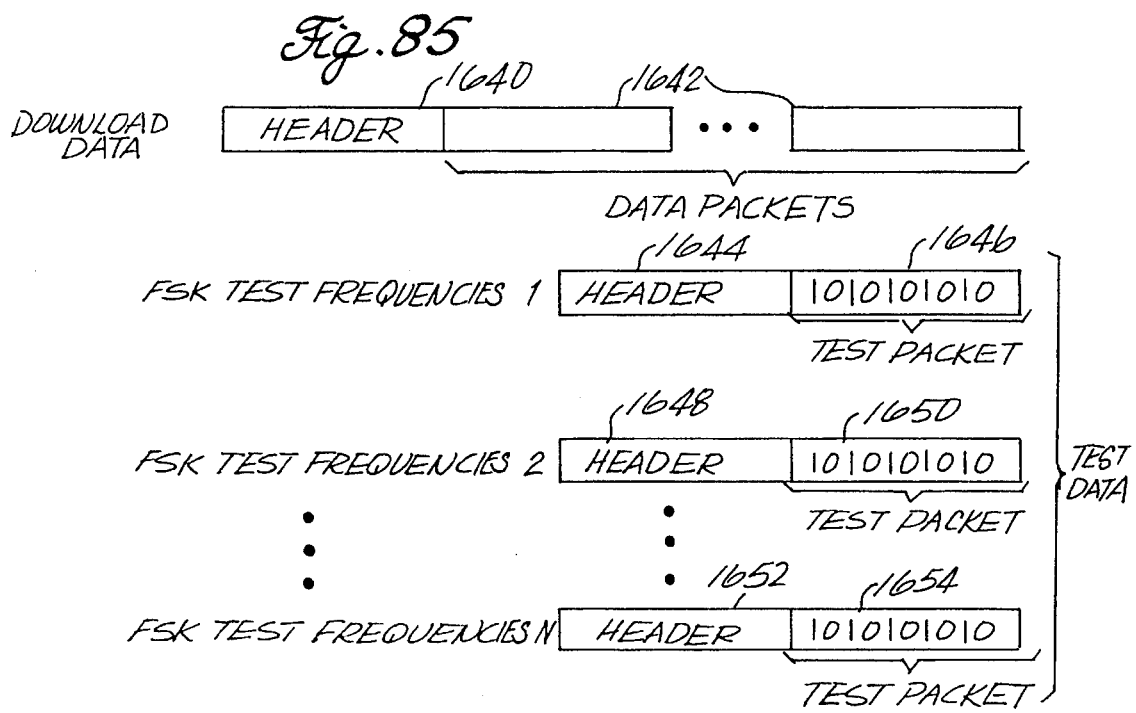
FIG. 85 is a diagram illustrating the download data and the test data sent in the method of FIGS. 84A and 84B.

The information downloaded is data that otherwise would have to be manually keyed in by the user, as previously described. In step 1600 of FIG. 84A, the user calls a customer service representative at a remote site on the telephone. In step 1602 the user gives the representative the information necessary to perform the initial setup, such as the user's zip code, cable company, type of television guide, VCR and guide box model numbers, and the model numbers of any appliance to be controlled by the instant programmer. The representative then enters the necessary information into a computer in step 1604 and instructs the user to hold the telephone earpiece next to a microphone on the instant programmer in step 1606. The user is also told in step 1606 to tell the representative a message that will appear on the display after the download. The computer then downloads the data, consisting of a header 1640 and data packets 1642 as shown in FIG. 85, at nominal FSK frequencies over the telephone to the instant programmer in step 1608. Using the frequency shift key (FSK) format, binary data is sent over the telephone by representing a binary "one" with a first frequency and a binary "zero" with a second frequency. The nominal frequencies of FSK transmission include: a center frequency of 2.2 kHz, which is known as a "training frequency" and the frequencies of 1.75 kHz and 2.65 kHz representing a binary "zero" and "one," respectively, as shown in FIG. 87. The download is performed multiple times to compensate for any noise during a single transmission. If the download is proper, as determined in step 1610, then the instant programmer stores the data and can send portions of the data to appliances controlled by the instant programmer for programming or initially setting up the appliance.

In step 1612 a message "DONE" is displayed on the display 1531 of instant programmer 1524, if in step 1610 it is determined that the data has been properly received.

Following the download of the data in step 1608 at nominal FSK frequencies over the telephone to the instant programmer, the computer sends test data including a header and a test packet at a number of different FSK test frequencies. Different phone systems and telephone electrical designs have different preferred combinations of the three FSK frequencies to obtain the best reception. (See FIG. 85) In particular the most important factor is the center or "training" frequency. It can be varied within a band of several hundred Hz to match the characteristics of a particular phone system and telephone electrical design. Based on this center frequency, the frequencies for "zero" and "one" can be set at −/+450 Hz, respectively, from the center frequency. The best center frequency is determined by transmitting a test pattern at a number of test frequencies.

In step 1614 of FIG. 84A the computer sends test data at FSK test frequencies No. 1. The FSK test frequencies include a training frequency, a binary "1" frequency, and a binary "0" frequency. The test data for FSK test frequency No. 1 includes a header 1644 and a test packet 1646, as shown in FIG. 85. The test packet includes an alternating "1"/"0" pattern. In step 1616 it is determined whether the test data has been properly received. If the test data has been properly received and if the download data was not properly received as determined in step 1610, then step 1618 is enabled and a "1" is displayed on the instant programmer display. Then in step 1620 the computer sends the test data at FSK test frequencies No. 2. FSK test frequencies No. 2 are different than FSK test frequencies No. 1. In particular the center frequency is different between the two test frequencies. The binary "0" and binary "1" test frequencies are preferably offset by plus or minus 450 Hz from the center frequencies. In step 1622 it is determined whether the test data has been properly received. If it has then step 1624 is enabled if the download data has not been properly received and if the test data for FSK test frequencies No. 1 has also not been received. If step 1624 is enabled then a "2" is shown on the display of the instant programmer. The computer can send the test data at many frequencies as shown by step 1626 through 1630 which includes the steps of sending the test data at test frequencies No. N and determining whether the test data was properly received at test frequencies N. If the download data and the test data were not received on any other test frequencies but was properly received at test frequencies N, then displaying the number "N" on the display of the instant programmer.

If the download data was not properly received and the test data was not properly received on any of the FSK test frequencies 1 to N, then in step 1632 a "0" is displayed on the instant programmer display. After the computer has sent the download data in step 1608 and the test data at the various FSK test frequencies in steps 1614, 1620 and 1626, then the user tells the representative the message that is displayed on the instant programmer display in step 1634. In step 1636 if a "0" is displayed and relayed to the messenger, then the representative asks the user to position the telephone nearer to the microphone on the instant programmer. If "1" through "N" is displayed on the instant programmer display, then in step 1638 the representative enters the number into the computer, which then sends the download data at the FSK frequencies corresponding to the number on the display. For example, if the instant programmer display shows a "1," then the computer sends the download data at the FSK test frequencies No. 1.

FIG. 85 is a diagram illustrating the download data and the test data sent in the method of FIGS. 84A and 84B. Download data consist of a header 1640 and data packets 1642. Test data at any of the FSK test frequencies consist of a header and a test packet, as shown in headers 1644, 1648 and 1652, and test packets 1646, 1650 and 1654, respectively. As shown the test packets contain an alternating "1" and "0" pattern, which can be used to test whether or not the FSK test frequency has been properly received.

Figure 86:
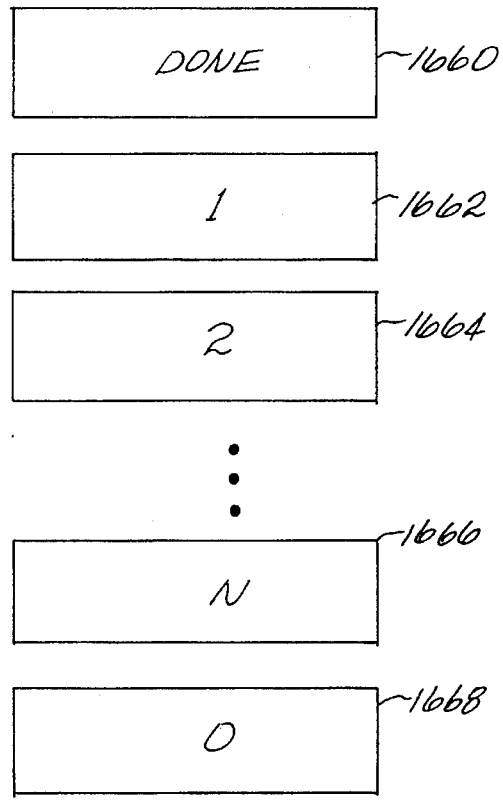
FIG. 86 is a diagram illustrating alternate contents on the display after the download data and the test data are sent in the method of FIGS. 84A and 84B.

FIG. 86 is a diagram illustrating alternate contents on the display after the download data and the test data are sent in the method of FIGS. 84A and 84B. If the data is properly received, then the display will show "done" as shown in display 1660 of FIG. 86. If test data is received at one of the test frequencies, then a number will be displayed as 1-N as shown in alternate displays 1662, 1664 and 1666. If neither the download data or the test data is received at any of the transmission frequencies, then a "0" will be displayed as shown in display 1668.

FIG. 87 is a diagram illustrating the frequencies for the nominal FSK frequencies and the test FSK frequencies. The nominal FSK frequencies are shown in spectrum 1670 showing a center frequency at 2.2 kHz and a lower frequency at the center frequency minus 450 Hz and a higher frequency at the center frequency plus 450 Hz. The FSK test frequency spectrums shown in spectrums 1672 through 1676 are similar, except that the center frequency has been offset by a percentage of the nominal center frequency of 2.2 kHz. The normal center frequency, as described above is 2.2 kHz and the center frequency can vary by about 200 Hz, which corresponds to about 10% of the center frequency. One embodiment of the invention is to vary the center frequency for each FSK test frequency in 2% increments.

FIG. 88 is a table illustrating possible frequencies for the nominal FSK frequencies and the test FSK frequencies. The table contains a column of training frequencies, a column of binary "1" frequencies and a column of "0" frequencies. For example, frequency "1" can have a center frequency 2% higher than the nominal center frequency. The binary "1" and binary "0" test No. 1 frequencies are higher by the same 2%. The test No. 2 FSK frequency can be offset from the nominal center frequency by minus 2% and the binary "1" and binary "0" frequencies for the FSK frequencies No. 2 would be lower by the same negative 2%. As shown in FIG. 88 test frequency 9 could be offset by up to 10% from the nominal center frequency.

In FIG. 88, the "1" and "0" frequencies are shown to be ±450 Hz from the training frequency; however, it is also possible to vary the "1" frequency and separately the "0" frequency to find the "sweet" band of the spectrum for a particular system. For example the "best" "1" frequency might be +550 Hz from the training frequency and the best "0" frequency might be −350 Hz from the training frequency. In another example, the "best" "1" frequency might be +400 Hz from the training frequency and the best "0" frequency might be −400 Hz from the training frequency.

In another embodiment a system and method are provided for counting and storing the number of error bits in the received test data, so that the number of errors can be displayed to the user who can relay this information to the representative. Based on the number of "one" or "zero" errors, the representative can either further adjust the high frequency component or the low frequency component of the FSK transmission to improve the chances of success in subsequent data downloads.

Figure 89:
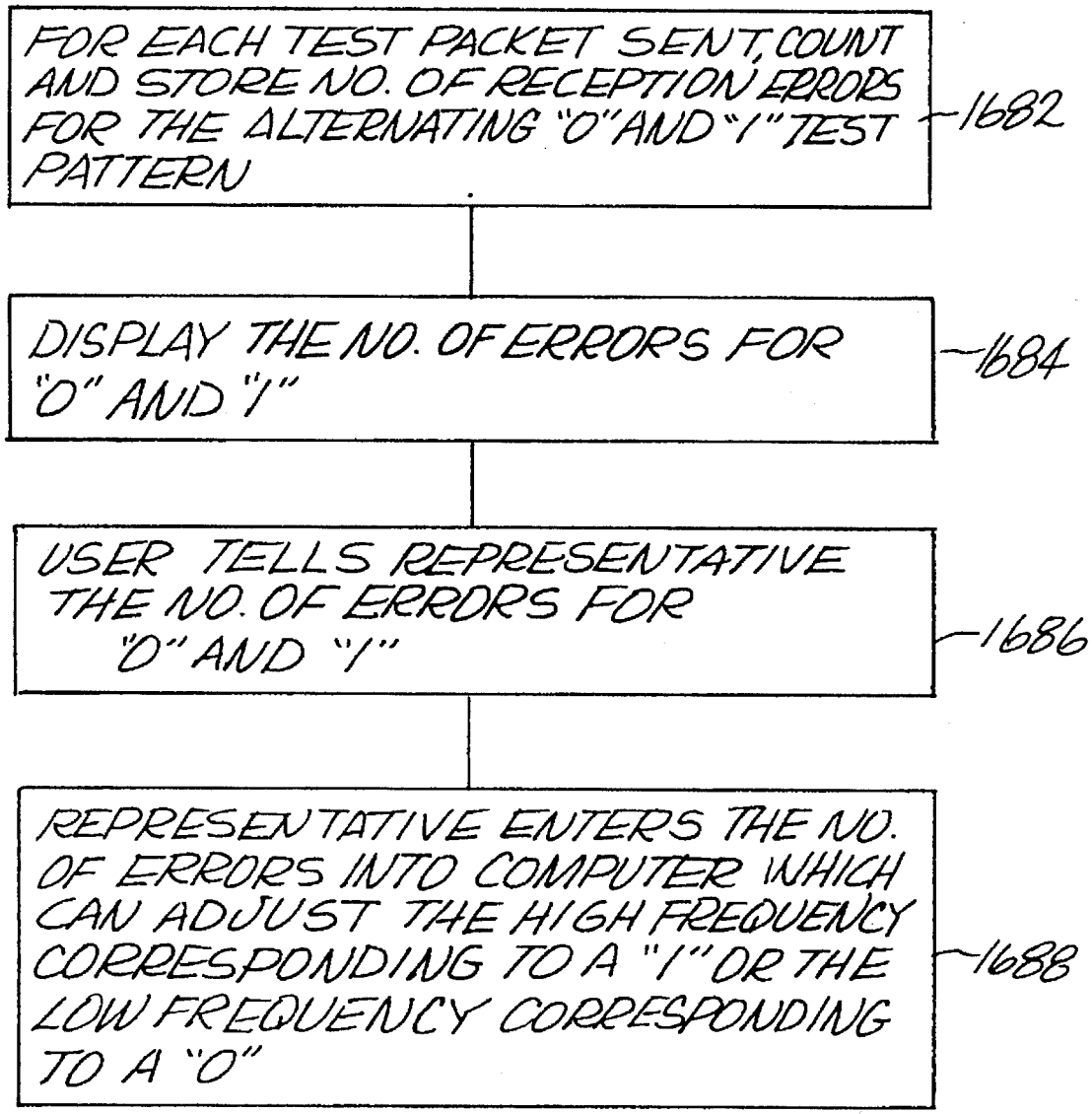
FIG. 89 is a flow diagram showing a method by which the number of errors in a received test pattern of alternating binary "ones" and "zeros" are determined and used to adjust the frequency representing a "one" in response to the number of errors in the received "ones" in the "one" and "zero" pattern or to adjust the frequency representing a "zero" in response to the number of errors in the received "zeros" in the "one" and "zero" pattern.

FIG. 89 is a flow diagram showing a method by which the number of errors in a received test pattern of alternating binary "ones" and "zeros" are determined and used to adjust the frequency representing a "one" in response to the number of errors in the received "ones" in the "one" and "zero" pattern or to adjust the frequency representing a "zero" in response to the number of errors in the received "zeros" in the "one" and "zero" pattern.

In step 1682 of FIG. 89, the instant programmer counts and stores the number of reception errors for the alternating "0" and "1" test patterns for each test frequency. For example, when FSK test frequencies No. 1 are sent the instant programmer expects to receive a predetermined alternating "1"/"0" test pattern. If the instant programmer receives a different test pattern, then by comparing the received test pattern with the expected test pattern the instant programmer can count and store the number of reception errors. In step 1684 the number of errors for the "0" and the "1" are shown on the instant programmer display. The number of errors could be displayed for each of the test frequencies or only for that test frequency that corresponds to the test frequency determined in the method of FIG. 84A and 84B on which the test data was properly received. The number of errors displayed can be the number of "0" errors and the number of "1" errors. In step 1686 the user informs the representative of the number of "0" and/or "1." In step 1688 the representative enters the number of errors into the computer which can adjust the high frequency corresponding to a "1" or the low frequency corresponding to a "0." The decision on whether to increase or lower the high frequency corresponding to a "1" or the low frequency corresponding to a "0," may be based on a prior knowledge of typical transmission problems encountered, or may be the result of repeating the transmission of the test data at various test frequencies after an adjustment is made of the frequency corresponding to a "1" or the frequency corresponding to a "0."

In the foregoing descriptions the methods include a representative at a remote site and a user communicating with the representative over a telephone. In another embodiment the representative can be replaced by automatic processing equipment, which queries the user and either accepts voice input via voice recognition equipment or accepts touch tone keypad inputs. For example, the automatic processing equipment could automatically ask the user for a model number and the user could input the number on the user's telephone touch tone keypad. This method of operation would eliminate the necessity of having an employee acting as the representative.

In a similar manner the actions of the user can be automated. In one embodiment the instant programmer can be directly connected to a telephone network as shown in FIG. 81. The user could dial the remote site and then all other operations of loading the data and adjusting transmission frequencies could be automatically performed. If a particular test frequency is not effective, then the instant programmer could automatically detect this and inform the equipment at the remote site via telephone touch tones generated by the instant programmer. The frequencies of the FSK transmissions from the remote site can be automatically adjusted in the same manner as described in the method of FIGS. 84A, 84B and 89, except that a representative is not needed and it is not necessary to display messages on a display, because the results of a test are sent directly over the telephone network from the instant programmer.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method of downloading initial setup data to an apparatus for controlling at least one appliance comprising the steps of:

a user initiating a telephone call on a telephone to a remote site having a computer;

the user communicating background information to the remote site;

the remote site converting the background information into data for downloading;

the remote site transmitting the download data at nominal frequencies to the telephone;

the remote site transmitting test data at each of a plurality of test frequencies to the telephone;

the apparatus for controlling at least one appliance receiving from the telephone via a microphone on the apparatus the transmitted download data at nominal frequencies and the test data at each of the plurality of test frequencies;

the apparatus for controlling at least one appliance displaying an indication that the download data was properly received at the nominal frequencies, if the download data was properly received, or an indication of which one of the plurality of test frequencies on which the test data was received, if the test data was properly received on one of the plurality of test frequencies and the download data was not properly received on the nominal frequencies, or an indication that no data was received, if neither the download data nor the test data were properly received; and the user communicating the displayed indication to the remote site.

2. The method of claim 1 further comprising the steps of:

the remote site adjusting the nominal frequencies for transmitting the download data to the one of the plurality of test frequencies on which the test data was properly received, if the download data was not properly received on the nominal frequencies and the test data was properly received on one of the plurality of test frequencies as communicated by the user to the remote site; and the remote site retransmitting the download data at the adjusted nominal frequencies.

3. The method of claim 1 wherein the step of the remote site transmitting the download data at nominal frequencies to the telephone comprises the step of transmitting the download data in a frequency shift key (FSK) format.

4. The method of claim 1 wherein the step of the remote site transmitting test data at each of a plurality of test frequencies to the telephone comprises the step of transmitting the test data in a frequency shift key (FSK) format.

5. The method of claim 1 wherein the test data comprises an alternating binary test "one" and "zero" pattern wherein the "one" is represented by transmitting at a first frequency and the "zero" is represented by transmitting at a second frequency.

6. The method of claim 5 further comprising the steps of:

counting the number of "one" errors in the received "one" and "zero" pattern for each of the transmitted plurality of test frequencies;

informing the remote site of the number of "one" errors in the received "one" and "zero" patterns; and adjusting the first frequency representing a "one" in response to the number of errors in the received "ones" in the "one" and "zero" pattern.

7. The method of claim 6 further comprising the steps of:

counting the number of "zero" errors in the received "one" and "zero" pattern for each of the transmitted plurality of test frequencies;

informing the remote site of the number of "zero" errors in the received "one" and "zero" patterns; and adjusting the second frequency representing a "zero" in response to the number of errors in the received "ones" in the "one" and "zero" pattern.

8. The method of claim 5 further comprising the steps of:

counting the number of "one" errors in the received "one" and "zero" pattern for each of the transmitted plurality of test frequencies;

counting the number of "zero" errors in the received "one" and "zero" pattern for each of the transmitted plurality of test frequencies;

informing the remote site of the number of "one" errors in the received "one" and "zero" pattern;

informing the remote site of the number of "zero" errors in the received "one" and "zero" pattern;

adjusting the first frequency representing a "one" in response to the number of errors in the received "ones" in the "one" and "zero" pattern; and adjusting the second frequency representing a "zero" in response to the number of errors in the received "ones" in the "one" and "zero" pattern.

9. The method of claim 1 further comprising the step of the remote site informing the user to hold the telephone closer to the microphone on the apparatus, if the user communicates an indication to the remote site that neither the download data nor the test data were properly received.

10. A system of downloading initial setup data to an apparatus for controlling at least one appliance, the system comprising:

means for a user to telephone a remote site having a computer and for the user to communicate background information to the remote site;

means for the remote site to convert the background information into data for downloading;

means for the remote site to transmit the download data at nominal frequencies to the telephone;

means for the remote site to transmit test data at each of a plurality of test frequencies to the telephone;

means for the apparatus to receive from the telephone via a microphone on the apparatus the transmitted download data at nominal frequencies and the test data at each of the plurality of test frequencies;

means for the apparatus to display an indication that the download data was properly received at the nominal frequencies, if the download data was properly received, or an indication of which one of the plurality of test frequencies on which the test data was received, if the test data was properly received on one of the plurality of test frequencies and the download data was not properly received on the nominal frequencies, or an indication that no data was received, if neither the download data nor the test data were properly received; and means for the user to communicate the displayed indication to the remote site.

11. The system of claim 10 further comprising:

means for the remote site to adjust the nominal frequencies for transmitting the download data to the one of the plurality of test frequencies on which the test data was properly received, if the download data was not properly received on the nominal frequencies and the test data was properly received on one of the plurality of test frequencies as communicated by the user to the remote site; and means for the remote site to retransmit the download data at the adjusted nominal frequencies.

12. The system of claim 10 wherein the means for the remote site to transmit the download data at nominal frequencies to the telephone comprises means for transmitting the download data in a frequency shift key (FSK) format.

13. The system of claim 10 wherein the means for the remote site to transmit test data at each of a plurality of test frequencies to the telephone comprises means for transmitting the test data in a frequency shift key (FSK) format.

14. The system of claim 10 wherein the test data comprises an alternating binary test "one" and "zero" pattern wherein the "one" is represented by transmitting at a first frequency and the "zero" is represented by transmitting at a second frequency.

15. The system of claim 14 further comprising:

means for counting the number of "one" errors in the received "one" and "zero" pattern for each of the transmitted plurality of test frequencies;

means for informing the remote site of the number of "one" errors in the received "one" and "zero" patterns; and means for adjusting the first frequency representing a "one" in response to the number of errors in the received "ones" in the "one" and "zero" pattern.

16. The system of claim 15 further comprising:

means for counting the number of "zero" errors in the received "one" and "zero" pattern for each of the transmitted plurality of test frequencies;

means for informing the remote site of the number of "zero" errors in the received "one" and "zero" patterns; and means for adjusting the second frequency representing a "zero" in response to the number of errors in the received "ones" in the "one" and "zero" pattern.

17. The system of claim 14 further comprising:

means for counting the number of "one" errors in the received "one" and "zero" pattern for each of the transmitted plurality of test frequencies;

means for counting the number of "zero" errors in the received "one" and "zero" pattern for each of the transmitted plurality of test frequencies;

means for informing the remote site of the number of "one" errors in the received "one" and "zero" pattern;

means for informing the remote site of the number of "zero" errors in the received "one" and "zero" pattern;

means for adjusting the first frequency representing a "one" in response to the number of errors in the received "ones" in the "one" and "zero" pattern; and means for adjusting the second frequency representing a "zero" in response to the number of errors in the received "ones" in the "one" and "zero" pattern.

18. The system of claim 10 further comprising means for the remote site to inform the user to hold the telephone closer to the microphone on the apparatus, if the user communicates an indication to the remote site that neither the download data nor the test data were properly received.

* * * * *